(12) United States Patent
Kamei et al.

(10) Patent No.: US 8,369,666 B2
(45) Date of Patent: Feb. 5, 2013

(54) OPTICAL WAVELENGTH MULTIPLEXING/ DE-MULTIPLEXING CIRCUIT

(75) Inventors: Shin Kamei, Atsugi (JP); Tsutomu Kitoh, Atsugi (JP); Masaki Kohtoku, Atsugi (JP); Tomohiro Shibata, Atsugi (JP); Takuya Tanaka, Atsugi (JP); Yasuyuki Inoue, Atsugi (JP); Mikitaka Itoh, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 245 days.

(21) Appl. No.: 13/054,158

(22) PCT Filed: Jun. 30, 2009

(86) PCT No.: PCT/JP2009/062010
§ 371 (c)(1),
(2), (4) Date: Jan. 14, 2011

(87) PCT Pub. No.: WO2010/007888
PCT Pub. Date: Jan. 21, 2010

(65) Prior Publication Data
US 2011/0116802 A1 May 19, 2011

(30) Foreign Application Priority Data

Jul. 14, 2008 (JP) ................................. 2008-182989
Dec. 2, 2008 (JP) ................................. 2008-307602

(51) Int. Cl.
*G02B 6/34* (2006.01)
*H04J 14/02* (2006.01)
(52) U.S. Cl. .................. 385/37; 385/1; 385/42; 385/31; 385/24; 385/129; 385/130; 398/79; 398/87
(58) Field of Classification Search .................. 385/42, 385/31, 129, 130, 131, 132, 14, 37, 24, 1, 385/2, 3; 398/79, 82, 84, 87
See application file for complete search history.

(56) References Cited

U.S. PATENT DOCUMENTS

| 5,488,680 A | 1/1996 | Dragone |
| 6,304,687 B1 | 10/2001 | Inoue et al. |
| 6,377,723 B1 * | 4/2002 | Saito et al. ...................... 385/15 |

(Continued)

FOREIGN PATENT DOCUMENTS

| CN | 1508997 | 6/2004 |
| JP | 8-69021 | 3/1996 |

(Continued)

OTHER PUBLICATIONS

Juerg Leuthold, et al., *Multimode Interference Couplers for the Conversion and Combining of Zero- and First-Order Modes*, Journal of Lightwave Technology, vol. 16, No. 7, Jul. 1998, pp. 1228-1239.

(Continued)

*Primary Examiner* — Brian Healy
(74) *Attorney, Agent, or Firm* — Workman Nydegger

(57) ABSTRACT

An optical wavelength multiplexing/de-multiplexing circuit having a low loss and a flat transmission spectrum is provided. The optical wavelength multiplexing/de-multiplexing circuit compensates a temperature dependence of a center transmission wavelength which remains in an athermal AWG, and has an excellent accuracy of the center transmission wavelength in a whole operating temperature range or has a comparatively wide operable temperature range. The temperature dependence of the transmission wavelength in the athermal MZI is modulated and set so as to cancel the temperature dependence of the center wavelength which remains in the athermal AWG. The present invention focuses particularly on an optical coupler in the MZI and modulates the temperature dependence of the transmission wavelength in the MZI by providing the optical coupler itself with a mechanism which changes a phase difference between two outputs by temperature.

16 Claims, 53 Drawing Sheets

U.S. PATENT DOCUMENTS

| | | | |
|---|---|---|---|
| 6,728,446 | B2 | 4/2004 | Doerr |
| 7,061,610 | B2* | 6/2006 | Mittelstein et al. ............ 356/328 |
| 7,194,176 | B2* | 3/2007 | Takahashi et al. ............ 385/132 |
| 2003/0128926 | A1 | 7/2003 | Doerr |
| 2003/0223694 | A1 | 12/2003 | Nikonov et al. |
| 2004/0136647 | A1 | 7/2004 | Mizuno et al. |
| 2006/0198579 | A1 | 9/2006 | Bulthuis et al. |
| 2011/0116802 | A1* | 5/2011 | Kamei et al. ..................... 398/87 |

FOREIGN PATENT DOCUMENTS

| | | |
|---|---|---|
| JP | 2001-116937 | 4/2001 |
| JP | 2003-149474 | 5/2003 |
| JP | 2004-199046 | 7/2004 |
| JP | 2006-284632 | 10/2006 |
| JP | 2007-316335 | 12/2007 |
| WO | WO98/36299 | 8/1998 |
| WO | WO2004/001470 | 12/2003 |

OTHER PUBLICATIONS

Zhiyi Zhang et al., *Planar Waveguide-based Silica-polymer Hybrid Variable Optical Attenuator and its Associated Polymers*, Applied Optics, vol. 44, No. 12, Apr. 20, 2005, pp. 2402-2408.

Takayuki Mizuno et al., *Uniform Wavelength Spacing Mach-Zehnder Interferometer Using Phase-Generating Couplers*, Journal of Lightwave Technology, vol. 24, No. 8, Aug. 2006, pp. 3217-3226.

S. Kamei et al., *Athermal Mach-Zehnder Interferometer—Synchronised Arrayed Waveguide Grating Multi/Demultiplexer with Low Loss and Wide Passband*, Electronics Letters, vol. 44, No. 3, Jan. 31, 2008, pp. 201-202.

J.B.D. Soole et al., *Athermalisation of Silica Arrayed Waveguide Grating Multiplexers*, Electronics Letters, vol. 39, No. 16, Aug. 7, 2003, pp. 1182-1184.

PCT/JP2009/062010, Aug. 4, 2009, International Search Report.

Office Action issued on Jul. 24, 2012 in Chinese Application No. 2009580127636.X.

Koichi Maru et al., *Demonstration of Flat-Passband Multi/Demultiplexer Using Multi-Input Arrayed Waveguide Grating Combined with Cascaded Mach-Zehnder Interferometers*, Journal of Lightwave Technology, vol. 25, No. 8, Aug. 2007, pp. 2187-2197.

Koichi Maru at al., *Low-loss, Flat-passband and Athermal Arrayed-Waveguide Grating Multi/Demultiplexer*, Optics Express, vol. 15, No. 26, Dec. 24, 2007, pp. 18351-18356.

EP 09797816.7, Jun. 10, 2011, Supplementary European Search Report.

PCT/JP2009/062010, Jan. 27, 2011, International Preliminary Report.

* cited by examiner

OPTICAL WAVELENGTH MULTIPLEXING/DE-MULTIPLEXING CIRCUIT

TECHNICAL FIELD

The present invention relates to an optical wavelength multiplexing/de-multiplexing circuit which is configured with an arrayed waveguide grating (AWG) and a Mach-Zehnder interferometer circuit (MZI), and which has a high flatness of a transmission spectrum and also a low loss, and, specifically, relates to an above configured optical wavelength multiplexing/de-multiplexing circuit in which the temperature dependence of a transmission wavelength is compensated.

BACKGROUND ART

Research development is energetically promoted for a planer light wave circuit (PLC) configured with a silica glass waveguide which is formed on a silicon substrate. An arrayed waveguide grating (AWG) utilizing this PLC technology is a circuit realizing optical wavelength multiplexing/de-multiplexing and plays an important role as an optical communication component.

The AWG has a temperature dependence of a transmission wavelength for light to be multiplexed/de-multiplexed. This is because the effective refractive index of the silica glass waveguide configuring the AWG has a temperature dependence. Therefore, a typical AWG is required to have a temperature adjustment apparatus added for keeping constant wavelength transmission properties.

For omitting the temperature adjustment apparatus required to be added to the AWG, a method has been developed for reducing the temperature dependence of the transmission wavelength in the AWG. Details of this method are disclosed in Patent documents 1 and 2. The AWG having the reduced temperature dependence of the transmission wavelength is referred to as a temperature independent AWG or athermal AWG. The athermal AWG disclosed in Patent documents 1 and 2 is realized by means of forming a groove which is disposed so as to intersect with the propagation axis of a lightwave in each waveguide (arrayed waveguide or slab waveguide) within the AWG and by inserting material having a refractive index temperature coefficient different from that of the effective refractive index of the waveguide (hereinafter described as "temperature compensation material") in the groove.

FIG. 40 is a plan view showing an exemplary configuration 4000 of an athermal AWG type optical wavelength multiplexing/de-multiplexing circuit of the conventional art which has a groove formed in a slab waveguide. The athermal AWG type optical wavelength multiplexing/de-multiplexing circuit 4000 is provided with a first input/output waveguide 4001, a first slab waveguide 4002, an arrayed waveguide 4003, a second slab waveguide 4004, a second input/output waveguide 4005, and a groove 4006 which is formed in the first slab waveguide 4002 and which is filled with the temperature compensation material.

Further, FIG. 41 is a diagram showing a cross-sectional structure of a part along the line XLI-XLI in the athermal AWG type optical wavelength multiplexing/de-multiplexing circuit 4000 shown in FIG. 40. The cross-sectional structure of a part along the line XLI-XLI includes a groove 4006, a silicon substrate 4007, a waveguide core 4008, and a clad 4009. The groove 4006 is formed by the removal of a part of the waveguide core 4008 and a part of the clad 4009 to divide waveguide core 4008.

The athermal AWG 4000 has a function of causing wavelength-multiplexed signal light input into the first input/output waveguide 4001 to be de-multiplexed into the second input/output waveguide 4005 for an output as signal light of each wavelength channel, and a function of causing signal light of each wavelength channel input into each waveguide of the second input/output waveguide 4005 to be multiplexed into the first input/output circuit 4001 for an output as wavelength-multiplexed signal light, resulting in operating as the optical wavelength multiplexing/de-multiplexing circuit.

Further, the groove 4006 is divided into plural grooves in FIG. 40, and this is because the plural grooves can reduce a radiation loss more than a single groove. In FIG. 40, the length Li of the i-th arrayed waveguide is expressed as $L_i = L_1 + (i-1)\cdot\Delta L$ and is designed so as to become sequentially longer by a certain amount $\Delta L$. In correspondence with this design, in the first slab waveguide 4002, the sum of the lengths $L_i'$ in which the light wave to be input into each of the arrayed waveguides is divided by the grooves 4006 is expressed as $L_i' = L_1' + (i-1)\cdot\Delta L'$ and formed so as to become sequentially longer by an amount $\Delta L'$ proportional to $\Delta L$. At this time, a center transmission wavelength $\lambda_c$ from a center waveguide of the first input/output waveguide 4001 to a center waveguide of the second input/output waveguide 4005 in the AWG is expressed as follows.

$$\lambda_c = \{n_a \Delta L' - n_s \Delta L' + n' \Delta L'\}/M \quad \text{Formula 1}$$

Here, $n_a$ is an effective refractive index of the arrayed waveguide, $n_s$ is an effective refractive index of the slab waveguide, n' is an refractive index of the temperature compensation material, M is a diffraction order of the AWG, and $n_a \Delta L - n_s \Delta L' + n' \Delta L'$ indicates a distance difference between neighboring optical paths, that is, an optical path length difference in the AWG. At this time, it is assumed that n' is close to $n_s$ and the refraction angle of light wave in the groove is sufficiently small. Here, the optical path length is a distance felt by the light wave and is obtained as a product of the refractive index of the material and a physical path distance. Also here, when α is an effective refractive index temperature coefficient of the arrayed waveguide and the slab waveguide ($\alpha = dn_a/dT = dn_s/dT$, T: temperature) and α' is a refractive index temperature coefficient of the temperature compensation material ($\alpha' = dn'/dT$), the athermal AWG is configured as $\Delta L'/(\Delta L - \Delta L') = -\alpha/\alpha'$, that is, $\Delta L' = \Delta L/(1-\alpha'/\alpha)$. Therefore, the temperature-induced change of the optical path length difference in the arrayed waveguide and the slab waveguide is cancelled by the temperature-induced change of the optical path length difference of the temperature compensation material filled in the groove, and the temperature dependence of the center transmission wavelength is compensated. The temperature compensation material may be any material having α' which satisfies the above condition for α of the waveguide, but it is particularly preferable to use a material in which α' and α have signs opposite to each other and also |α'| is sufficiently larger than |α|. This is because $\Delta L$ can be set to be smaller and excessive loss by the groove can be suppressed. The material satisfying such conditions includes, for example, a silicone resin which is an optical resin having α' of approximately −35×α. Further, it is preferable to use the optical resin in that the optical resin has an excellent long-term reliability as an optical component material.

As another method for reducing the temperature dependence of the transmission wavelength in AWG, there is a method of cutting an AWG chip in an arc along a circuit, bonding a metal rod for connecting both ends of the chip, and causing the AWG chip to be deformed by the thermal expansion or contraction of the metal rod to cancel the temperature-induced change of the optical path length difference between the neighboring arrayed waveguides. Details of this method are disclosed by Non-patent document 1.

In addition, as still another method for reducing the temperature dependence of the transmission wavelength in the AWG, there is a method of dividing the input side or output side slab waveguide in an AWG chip, bonding the divided chips and a metal plate, and changing the relative position between the divided slab waveguides by the thermal expansion or contraction of the metal plate, to cancel the temperature-induced change of the optical path length difference in the arrayed waveguide.

Meanwhile, with the progress of the optical communication system, a system such as a ring network or a mesh network has started to be built for connecting multi points and switching a communication line flexibly. In such a high level network, light signal is required to pass through the multi points without being demodulated into an electric signal, and the optical wavelength multiplexing/de-multiplexing circuit to be used is required to have a high flatness of a transmission spectrum and a low loss. As the optical wavelength multiplexing/de-multiplexing circuit having such excellent transmission properties, a MZI-synchronized AWG type optical wavelength multiplexing/de-multiplexing circuit combining the Mach-Zehnder interferometer circuit (MZI) and the AWG is proposed. Details of this circuit are disclosed by Patent documents 3 and 4. By this MZI-synchronized AWG having a low loss and also a flat transmission spectrum, it is possible to obtain an optical wavelength multiplexing/de-multiplexing circuit in which an optical signal has a small deterioration even when passing therethrough many times or a loss variation is small for the wavelength fluctuation of the optical signal.

Further, for reducing (athermalizing) the temperature dependence of the transmission wavelength in the MZI-synchronized AWG, it is necessary to reduce the temperature dependence of the transmission wavelength in each of the MZI and the AWG. Non-patent document 2 discloses the athermal MZI-synchronized AWG by employing the method disclosed by Patent document 1 to each of the MZI and the AWG.

FIG. 42 is a plan view showing an exemplary configuration 4200 of the athermal MZI-synchronized AWG type optical wavelength multiplexing/de-multiplexing circuit. The athermal MZI-synchronized AWG type optical wavelength multiplexing/de-multiplexing circuit 4200 is configured with an AWG part 4200a and an MZI part 4200b. The AWG part is provided with a first slab waveguide 4201, an arrayed waveguide 4202, a second slab waveguide 4203, a second input/output waveguide 4204, and a groove 4205 which is formed in the first slab waveguide 4201 and which is filled with the temperature compensation material. The MZI part 4200b is provided with a first input/output waveguide 4206, an optical coupler 4207, a first arm waveguide 4208, a second arm waveguide 4209, a directional coupler 4210, and a groove 4211 which is formed in the first arm waveguide 4208 and which is filled with the temperature compensation material. Further, each of the grooves 4205 and 4211 is divided into plural grooves and this is because the plural grooves can reduce a radiation loss more than a single groove.

A light wave having plural wavelengths is input into the first input/output waveguide 4206 of the MZI 4200 and branches into the first and second arm waveguides 4208 and 4209 by the optical coupler 4207, in which an optical path length difference causes a phase difference according to the wavelength. This light wave has interference between two waveguides disposed closely in the directional coupler 4210 and power is distributed between the two waveguides according to the phase difference (i.e., wavelength). Therefore, the position of the light wave collected at a terminal, where the directional coupler 4210 is connected to the first slab waveguide 4201 of the AWG 4200, is caused to vary periodically between the two waveguides according to the phase difference (wavelength). Meanwhile, the light wave input into the AWG 4200a from the directional coupler 4210 is provided with a phase difference according to the wavelength by the optical path length difference between the neighboring waveguides in the arrayed waveguide 4202, and the position of the light wave collected at a terminal of the second slab waveguide 4203 changes according to the phase difference (i.e., wavelength), and then the light wave having a desired wavelength is de-multiplexed into each of the input/output waveguides 4204.

Here, when the position of the collected light wave is changed between the two waveguides in the directional coupler 4210, the input position of the light wave into the first slab waveguide 4201 changes and also the optical path length to each of the arrayed waveguides changes. Therefore, without the change of the optical path length difference between the two waveguides in the arrayed waveguide 4202, the optical path length difference in the whole optical wavelength multiplexing/de-multiplexing circuit changes and the position of the light wave collected at the terminal of the second slab waveguide 4203 changes. This means that the position of the light wave collected at the terminal of the second slab waveguide 4203 can be adjusted by the optical path length difference between the first and second arm waveguides 4208 and 4209 in the MZI 4200b. That is, when the position change of the light collected at the terminal of the directional coupler 4210 of the MZI 4200b and the position change of the light collected at the terminal of the second slab waveguide 4203 of the MZI 4200a are set to be synchronized in a certain wavelength region, the position of the light collected at the terminal of the second slab waveguide 4203 does not change and accordingly it is possible to obtain a flat transmission spectrum characteristic in this wavelength region.

In the athermal MZI-synchronized AWG of FIG. 42, the AWG part 4200a is athermalized by the same method as in the athermal AWG of FIG. 40. Further, in the MZI part 4200b, when a length difference in the first arm waveguide from the second arm waveguide 4209 is set to be $\Delta l$, the sum of the lengths divided by the groove 4211 in the first arm waveguide is designed so as to become an amount $\Delta l'$ proportional to $\Delta l$. At this time, the transmission wavelength $\lambda_c^{MZI}$ of the MZI 4200b is expressed by the following formula.

$$\lambda_c^{MZI} = \{n_r \Delta l' + n' \Delta l'\}/m \qquad \text{Formula 2}$$

Here, $n_r$ is an effective refractive index in the first and second arm waveguides 4208 and 4209, n' is a refractive index of the temperature compensation material, m is a diffraction order of the MZI 4200b, and $n_r \Delta l' + n' \Delta l'$ indicates an optical path length difference in the first arm waveguide from the second arm waveguide 4209. Here, the effective refractive index temperature coefficient of the arm waveguide is a which is the same as that of the arrayed waveguide and the slab waveguide, and the athermalized MZI 4200b is designed as $\Delta l'/(\Delta l - \Delta l') = -\alpha/\alpha'$, that is, $\Delta l' = \Delta l/(1-\alpha'/\alpha)$. Therefore, the temperature-induced change of the optical path length difference in the first arm waveguide 4208 from the second arm waveguide 4209 is cancelled by the temperature-induced change of an optical path length difference in the temperature compensation material filled in the groove and the temperature dependence of the transmission wavelength is compensated. For the temperature compensation material, it is preferable to use a material in which α' and α have different sign and also |α'| is sufficiently larger than |α|, as in the example of FIG. 40, and the material satisfying such conditions includes, for example, a silicone resin of an optical resin.

The center transmission wavelength of the MZI-synchronized AWG has approximately an average value of the transmission wavelength of the MZI and the center transmission wavelength of the AWG. In the MZI-synchronized AWG of FIG. 42, since the transmission wavelength of the MZI 4200*b* and the center transmission wavelength of the AWG 4200*a* are athermalized, the center transmission wavelength of the MZI-synchronized AWG is athermalized. Further, a method disclosed by following Non-patent document 1 also can be applied to the method athermalizing the AWG part of the athermal MZI-synchronized AWG.

CITATION LIST

Patent Literature

PTL 1: International Publication Pamphlet No. WO98/36299
PTL 2: Japanese Patent Laid-Open No. 2001-116937
PTL 3: Japanese Patent Laid-Open No. H08-69021 (1996)
PTL 4: U.S. Pat. No. 6,728,446
PTL 5: Japanese Patent Laid-Open No. 2003-149474

Non-Patent Literature

NPL 1: J. B. D. Soole, et. al., "Athermalisation of silica arrayed waveguide grating multiplexers", ELECTRONICS LETTERS, Vol. 39, pp. 1182-1184, 2003.
NPL 2: S. Kamei, et. al., "Athermal Mach-Zehnder interferometer-synchronised arrayed waveguide grating multi/de-multiplexer with low loss and wide passband", ELECTRONICS LETTERS, Vol. 44, pp. 201-202, 2008.
NPL 3: T. Mizuno, et. al., "Uniform wavelength spacing Mach-Zehnder interferometer using phase-generating couplers", JOURNAL OF LIGHTWAVE TECHNOLOGY, Vol. 24, pp. 3217-3226, 2006.
NPL 4: I. Zhang, et. al., "Planer waveguide-based silica-polymer hybrid variable optical attenuator and its associated polymers", APPLIED OPTICS, Vol. 44, pp. 2402-2408, 2005.
NPL 5: L. Leuthold, et. al., "Multimode Interference Couplers for the Conversion and Combining of Zero- and First-Oder Modes", JOURNAL OF LIGHTWAVE TECHNOLOGY, Vol. 16, pp. 1228-1238, 1998.

SUMMARY OF INVENTION

The athermal MZI-synchronized AWG by the above design cannot always compensate the temperature dependence of the center transmission wavelength perfectly. This is because the effective refractive index temperature coefficient of the silica glass waveguide or the temperature compensation material, or the thermal expansion coefficient of the metal, has not only the first component but also the second component, and the ratio of the first and second components is different depending on the material, and thereby the temperature dependences of both of the order components cannot be balanced out at the same time. For the case of the silica glass waveguide, $\alpha=\alpha_1+\alpha_2 T$, $\alpha_1=1.0\times10^{-5}$, $\alpha_2=1.9\times10^{-8}$ (unit of T is ° C.), approximately. For the case of the silicone resin, $\alpha'=\alpha'_1+\alpha'_2 T$, $\alpha'_1=-3.5\times10^{-4}$, $\alpha'_2=1.5\times10^{-7}$, approximately. In the conventional athermal AWG, compensation is designed to be performed for this first order temperature dependence at the center of an operating temperature range. Although the second order coefficient is smaller than the first order coefficient, a slight temperature dependence remains across the whole operating temperature range.

Here, as an example of the athermal MZI-synchronized AWG of FIG. 42, a case where the number of wavelength channels is 40 and a channel wavelength spacing is 0.4 nm (50 GHz) will be explained. A relative refractive index difference (Δ) of the waveguide is 1.5%, a core thickness is 4.5 μm, a core width in the arrayed waveguide 4202, the second input/output waveguide 4204, the first input/output waveguide 4206, and the first and second arm waveguides 4208 and 4209 is 4.4 μm, and a length in the first slab waveguide 4201 and the second slab waveguide 4203 is 8400 μm. The second input/output waveguides 4204 are disposed in the number of the wavelength channels with a spacing of 15 μm at the part connected to the second slab waveguide 4203, and a linearly tapered waveguide is provided to each terminal thereof having an opening width of 11.0 μm. Further, a branching ratio of the optical coupler 4207 is set to be 50:50%, a core width in the two waveguides in the directional coupler is set to be 4.0 μm, a waveguide spacing is set to be 6.0 μm, a coupling rate is set to be 50%, and the temperature compensation material is set to be silicone resin. At this time, the number of the arrayed waveguides is 250, ΔL is 62.5 μm, and ΔI is 4040 μm. Here, ΔL' and ΔI' to be provided by the temperature compensation material filled in the groove 4205 are as follows; $\Delta L'=\Delta L/(1-\alpha'/\alpha)=\Delta L/(1-(\alpha'_1+\alpha'_2 T)/(\alpha_1+\alpha_2 T))$, $\Delta I'=\Delta I/(1-\alpha'/\alpha)=\Delta I/(1-(\alpha'_1+\alpha'_2 T)/(\alpha_1+\alpha_2 T))$. Here, when the operating temperature range is set to be T=−5 to 65° C., ΔL' becomes 1.79 μm and ΔI' becomes 15.4 μm under the condition of T=30° C. which is the center of the operating temperature range.

FIG. 43 shows a relative temperature dependence of the transmission wavelength in the MZI part, a relative temperature dependence of the center transmission wavelength in the center wavelength channel in the AWG part, and a relative temperature dependence of the center transmission wavelength in the center wavelength channel in the whole MZI-synchronized AWG, in this athermal MZI-synchronized AWG. Further, FIG. 44 is a diagram showing transmission waveforms at temperatures of −5, 30, 65° C. in this athermal MZI-synchronized AWG, in this athermal MZI-synchronized AWG. As apparent from FIGS. 43 and 44, while a transmission waveform having a low loss and also a high spectrum flatness is realized, a slight temperature dependence which shows a quadratic function curve having a minimum at T=30° C. remains in the same way as in the MZI and the AWG, and accordingly a similar temperature dependence remains also in the whole MZI-synchronized AWG. In the operating temperature range of T=−5 to 65° C., this wavelength variation width becomes 0.03 nm and amounts to 8% of the wavelength channel spacing.

In this manner, the second order temperature dependence of the center transmission wavelength remains, even slightly, in the athermal MZI-synchronized AWG of the conventional art. Therefore, there is a problem that a performance required by a transmission system cannot be obtained satisfactorily depending on a case, for a narrow wavelength channel spacing requiring a high accuracy of the center transmission wavelength or for an optical wavelength multiplexing/de-multiplexing circuit having a wide operating temperature range.

The present invention has been achieved in view of such a problem, and aims for providing an optical wavelength multiplexing/de-multiplexing circuit having a low loss and also a flat transmission spectrum, in which the temperature dependence of the center transmission wavelength remaining in the athermal AWG is compensated and an excellent accuracy in the center transmission wavelength across the whole operating temperature range or a comparatively wide operating temperature range is obtained.

For achieving the above object, an optical wavelength multiplexing/de-multiplexing circuit of the present invention focuses on the fact that the center transmission wavelength of the MZI-synchronized AWG has approximately an average value of the transmission wavelength in the MZI and the center transmission wavelength of the AWG. If the temperature dependence of the transmission wavelength in the athermal MZI is modulated and can be set so as to cancel the temperature dependence of the center transmission wavelength remaining in the athermal AWG, it is possible to compensate the temperature dependence remaining in the athermal MZI-synchronized AWG. Here, the present invention especially focuses on the optical coupler. By providing the optical coupler itself with a mechanism changing a phase difference between the two outputs by temperature, it is possible to modulate the temperature dependence of the transmission wavelength in the MZI.

An optical wavelength multiplexing/de-multiplexing circuit of the present invention based on the above consideration is configured with an arrayed waveguide grating and a Mach-Zehnder interferometer circuit, the arrayed waveguide grating comprising: an arrayed waveguide including a waveguide having a length sequentially increased by a certain optical path length difference; first and second slab waveguides connected to both end parts of the arrayed waveguide, respectively; and temperature compensation means for compensating a main temperature dependence at a transmission wavelength, and the Mach-Zehnder interferometer circuit comprising: first and second arm waveguides having a certain optical path length difference therebetween; a latter stage optical coupler connected between one end in each of the first and second arm waveguides and an end part of the first slab waveguide; a former stage optical coupler connected to the other end in each of the first and second arm waveguides; and temperature compensation means for compensating a main temperature dependence at a transmission wavelength, wherein the former stage optical coupler is a phase difference generation coupler configured with: a first optical coupler causing light to branch in a specific intensity ratio; a third arm waveguide and a fourth arm waveguide further connected to the first optical coupler and having a certain optical path length difference therebetween; and a second coupler further connected to each of the third and fourth arm waveguides, the former stage optical coupler including a mechanism which changes the optical path length difference between the third arm waveguide and the fourth arm waveguide by temperature and is configured so as to cause a temperature dependence of the transmission wavelength in the Mach-Zehnder interferometer circuit, the temperature dependence being modulated by a temperature-induced change of a phase difference between two outputs of the phase difference generation coupler, to compensate a remaining temperature dependence of the transmission wavelength in the arrayed waveguide grating.

Further, the mechanism may be a groove which is formed so as to divide at least one of the third and fourth arm waveguides and in which material having a refractive index temperature coefficient different from a temperature coefficient of an effective refractive index of the third and fourth arm waveguides is inserted.

Further, the groove may be configured with plural grooves.

Further, the mechanism may be a groove formed by removal of a clad on a side surface, an upper surface, or both the surfaces of a waveguide core at a part of at least one of the third and fourth arm waveguides.

Further, in the first optical coupler, a light intensity branching ratio to the third arm waveguide may be made smaller than 50% and also the groove to be formed in at least one of the third and fourth arm waveguides may be formed only in the third arm waveguide.

Further, the second optical coupler may be configured to be a directional coupler.

Further, the second optical coupler may be configured to be a multimode coupler.

Further, the first optical coupler may be configured to be a directional coupler.

Further, the first optical coupler may be configured to be a wavelength independent coupler (WINC) made of two arm waveguides and optical couplers connected to both ends thereof.

Further, the arrayed waveguide grating and the Mach-Zehnder interferometer circuit may be made up of silica-based glass, and the material to be inserted in the groove may be optical resin such as silicone resin, epoxy resin, or fluorine resin.

Further, the temperature compensation means in the arrayed waveguide grating may be configured to be means formed by a method of forming a groove which divides the waveguide so as to intersect with a light wave propagation direction in at least one of the arrayed waveguides and the first and second slab waveguides and inserting material which has a refractive index temperature coefficient different from a temperature coefficient of an effective refractive index of the waveguide in the groove, and the temperature compensation means in the Mach-Zehnder interferometer circuit may be configured to be means formed by a method of forming a groove dividing at least one of the first and second arm waveguides and inserting material having a refractive index temperature coefficient different from a temperature dependence of an effective refractive index of the first and second arm waveguides.

Further, the material to be inserted in the groove formed in at least one of the arrayed waveguide and the first and second slab waveguides, the material to be inserted in the groove formed in at least one of the first and second arm waveguides, and the material to be inserted in the groove formed in at least one of the third and fourth arm waveguides may be configured to be the same.

Further, the temperature compensation means in the arrayed waveguide grating may be configured to be means for bonding a metal rod for connecting both ends of a chip which is cut in an arc along a circuit, and for causing the chip to be deformed by thermal expansion or contraction of the metal rod to cancel the temperature-induced change of the optical path length difference in the arrayed waveguide, and the temperature compensation means in the Mach-Zehnder interferometer circuit is configured to be means formed by a method of forming a groove which divides at least one of the first and second arm waveguides and inserting material which has a refractive index temperature coefficient different from a temperature dependence of an effective refractive index of the first and second arm waveguides.

Further, the temperature compensation means in the arrayed waveguide grating may be configured to be means for dividing the first or second slab waveguide, bonding the divided chips and a metal plate, and canceling an optical path change caused by a temperature-induced change of the optical path length difference in the arrayed waveguide by changing a relative position between the divided slab waveguides by thermal expansion or contraction of the metal plate, and the temperature compensation means in the Mach-Zehnder interferometer circuit is configured to be means formed by a method of forming a groove which divides at least one of the first and second arm waveguides and inserting material which has a refractive index temperature coefficient different from the temperature dependence of an effective refractive index of the first and second arm waveguides.

Further, the material to be inserted in the groove formed in at least one of the first and second arm waveguides and the material to be inserted in the groove formed in at least one of the third and fourth arm waveguides may be configured to be the same.

As described above, the present invention can compensate the second order temperature dependence of the center transmission wavelength which remains in the athermal AWG and MZI-synchronized athermal AWG of the conventional art and thus can provide an optical wavelength multiplexing/de-multiplexing circuit having a low loss and a high flatness of the transmission spectrum and having an excellent accuracy of the center transmission wavelength across the whole temperature range or a wide operating temperature range.

DESCRIPTION OF EMBODIMENTS

Figure 42:
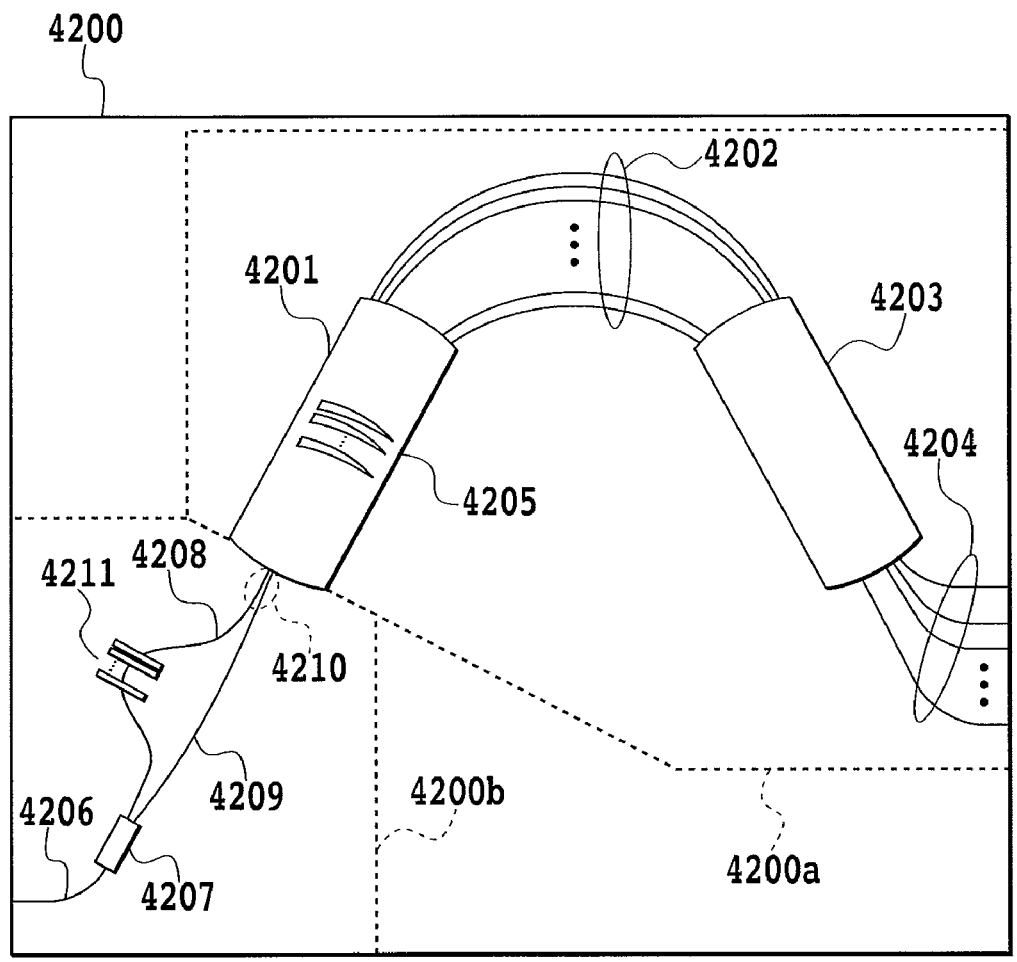
FIG. 42 is a plan view showing a configuration of an athermal MZI in a conventional art.
Figure 43:
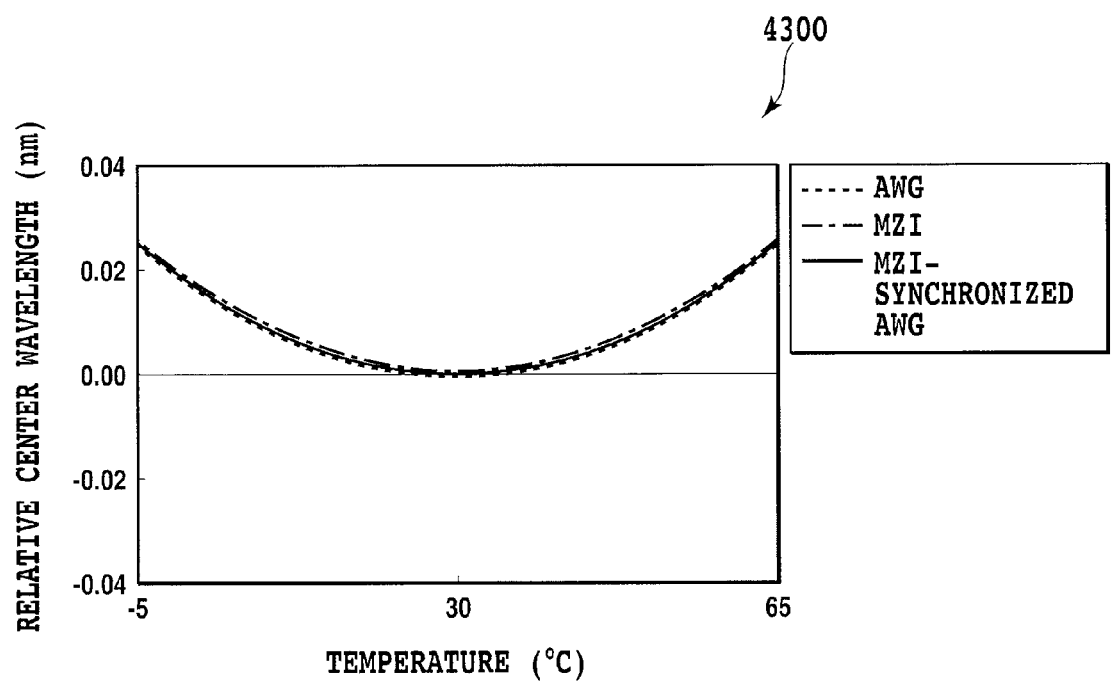
FIG. 43 is a diagram showing a temperature-induced variation of a center transmission wavelength in an athermal MZI-synchronized AWG of a conventional art.
Figure 44:
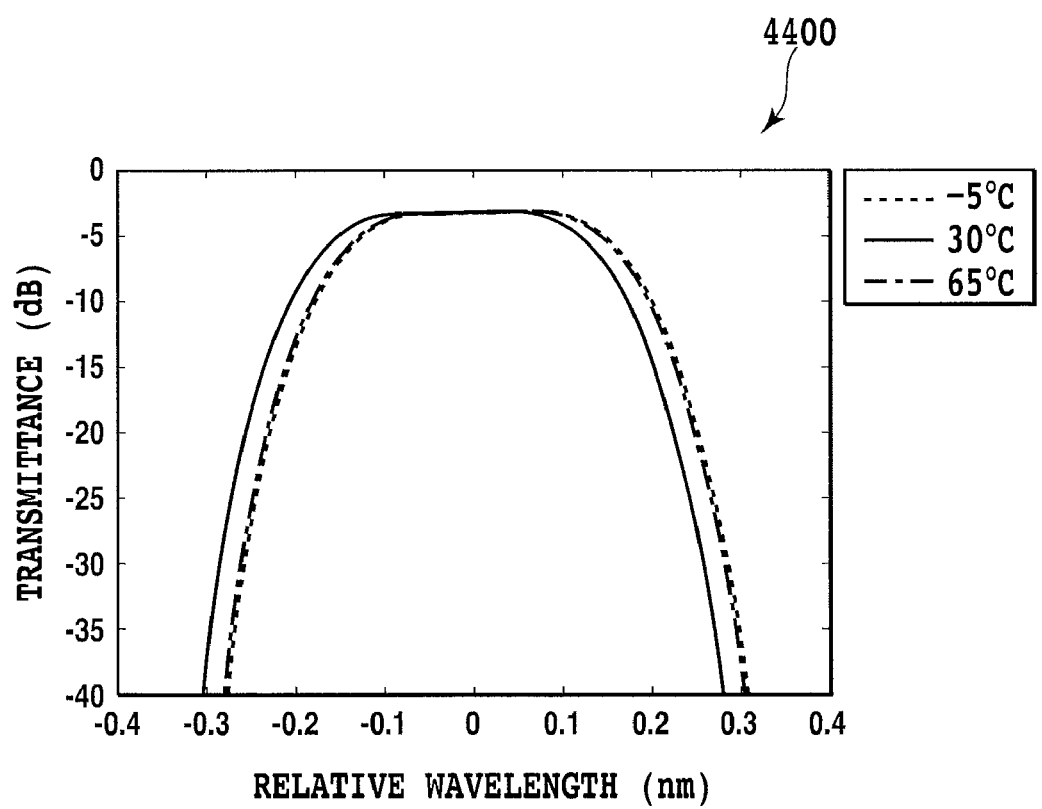
FIG. 44 is a diagram showing a temperature-induced variation of a transmission spectrum in an athermal MZI-synchronized AWG of a conventional art.

In the athermal MZI-synchronized AWG of a conventional art, as shown in the example of FIG. 43, a similar second order component remains in each of the temperature dependence of the center transmission wavelength in the AWG part and the temperature dependence of the transmission wavelength in the MZI part, and thus a similar second order component remains also in the temperature dependence of the center transmission wavelength in the MZI-synchronized AWG. This is because a similar second order component remains in the temperature dependence of the optical path length difference between the neighboring arrayed waveguides in the AWG and the temperature dependence of the optical path length difference between the arm waveguides in the MZI. Here, when a mechanism is provided to the optical coupler 4207 of FIG. 42 for changing a phase difference between the two outputs by temperature, the optical path length difference between the arm waveguide in the MZI is modulated in a pseudo manner and it is possible to modulate the temperature dependence of the transmission wavelength in the MZI part. A phase difference generation coupler is proposed for the coupler providing the phase difference between the two outputs. Details of the phase difference generation coupler are disclosed in Non-patent document 3.

Figure 1:
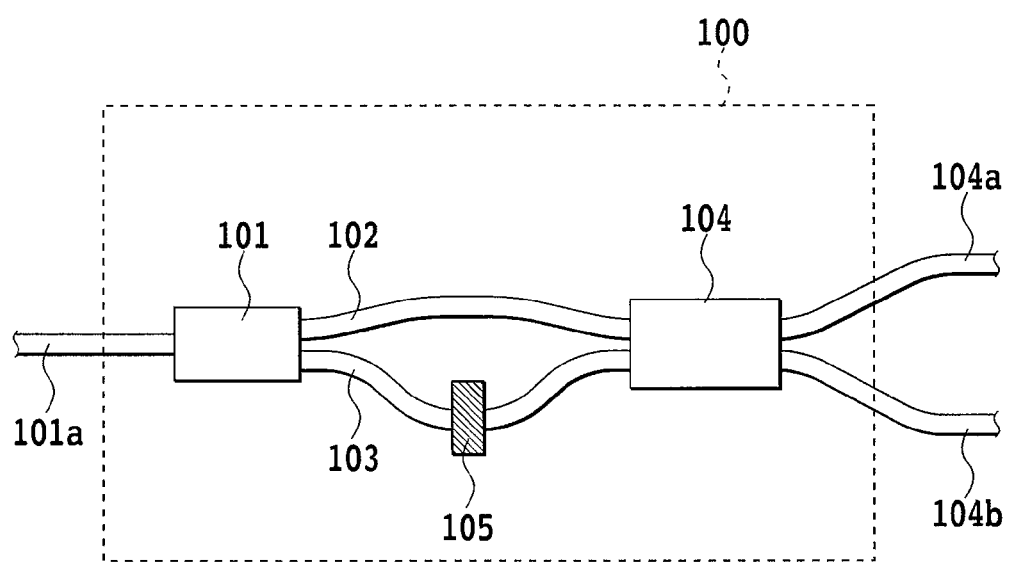
FIG. 1 is a configuration diagram of a temperature dependent type phase difference generation coupler in an optical wavelength multiplexing/de-multiplexing circuit according to an embodiment of the present invention.

In order to solve the problem of the present invention, a phase difference provided by the phase difference generation coupler needs to be changed by temperature and also needs to be changed little across an operating wavelength range. A new temperature dependent type phase difference generation coupler has been devised as a phase difference generation coupler satisfying this condition. FIG. 1 shows a basic configuration thereof. In FIG. 1, a temperature dependent type phase difference generation coupler 100 is provided with a first optical coupler 101, an input waveguide 101a for the first optical coupler, arm waveguides 102 and 103, a second optical coupler 104, two output waveguides 104a and 104b for the second optical coupler, and a groove 105 which divides one of the arm waveguides and in which the temperature compensation material is inserted. In the principle of the temperature dependent type phase difference generation coupler, it is only necessary to be able to provide the optical path length difference between the arm waveguides with a temperature dependence, and the configuration of this temperature dependent type phase difference generation coupler 100 has an advantage that this coupler can be fabricated at the same time as the conventional MZI-synchronized athermal AWG with no change of a fabrication process. Further, when the same material as the material to be used for temperature compensation means in the AWG and the MZI is used for the temperature compensation material, it is also preferable that the temperature dependent type phase difference generation coupler 100 can be fabricated without the addition of a new material.

Hereinafter, an operation example will be shown for the temperature dependent type phase difference generation coupler 100. Design examples are as follows; Δ of a waveguide is 1.5%, a core thickness is 4.5 μm, a core width in the arm waveguides 102 and 103 is 4.5 μm, an optical power branching ratio from the first optical coupler 101 to the arm waveguides 102 and 103 is 6:94%, a branching ratio of the second optical coupler is 50:50%, a length difference between the arm waveguide 102 and the arm waveguide 103 is −2.5 μm, a width of the groove 105 is 52.5 μm, and the temperature compensation material is silicone resin.

Figure 2:
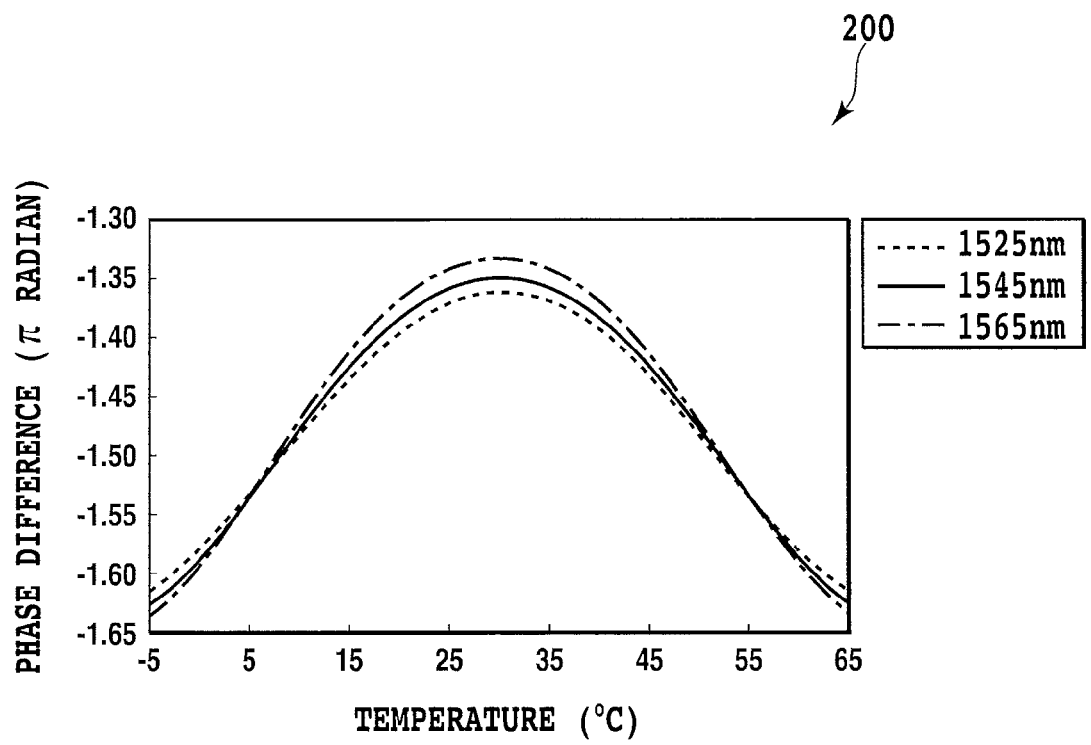
FIG. 2 is an example of a temperature-induced change of a phase difference between output waveguide 104a and output waveguide 104b provided by the temperature dependent type phase difference generation coupler of FIG. 1.

FIG. 2 is a diagram showing a temperature dependence of the phase difference provided between the two output waveguides of the second optical coupler 104 across −5 to 65° C., when a light wave having wavelengths of 1525, 1545, and 1565 nm is input from the input waveguide 101a of the first coupler into the temperature dependent type phase difference generation coupler 100. Here, the phase difference is defined to be a phase difference between the output waveguide 104a and the output waveguide 104b. From FIG. 2, it is apparent that the phase difference changes between −1.62π and −1.35π in a temperature range of −5 to 65° C. and the phase difference depends little on the wavelength.

In the light of the above, embodiments of the present invention will be specifically explained hereinafter.

First Embodiment

Figure 3:
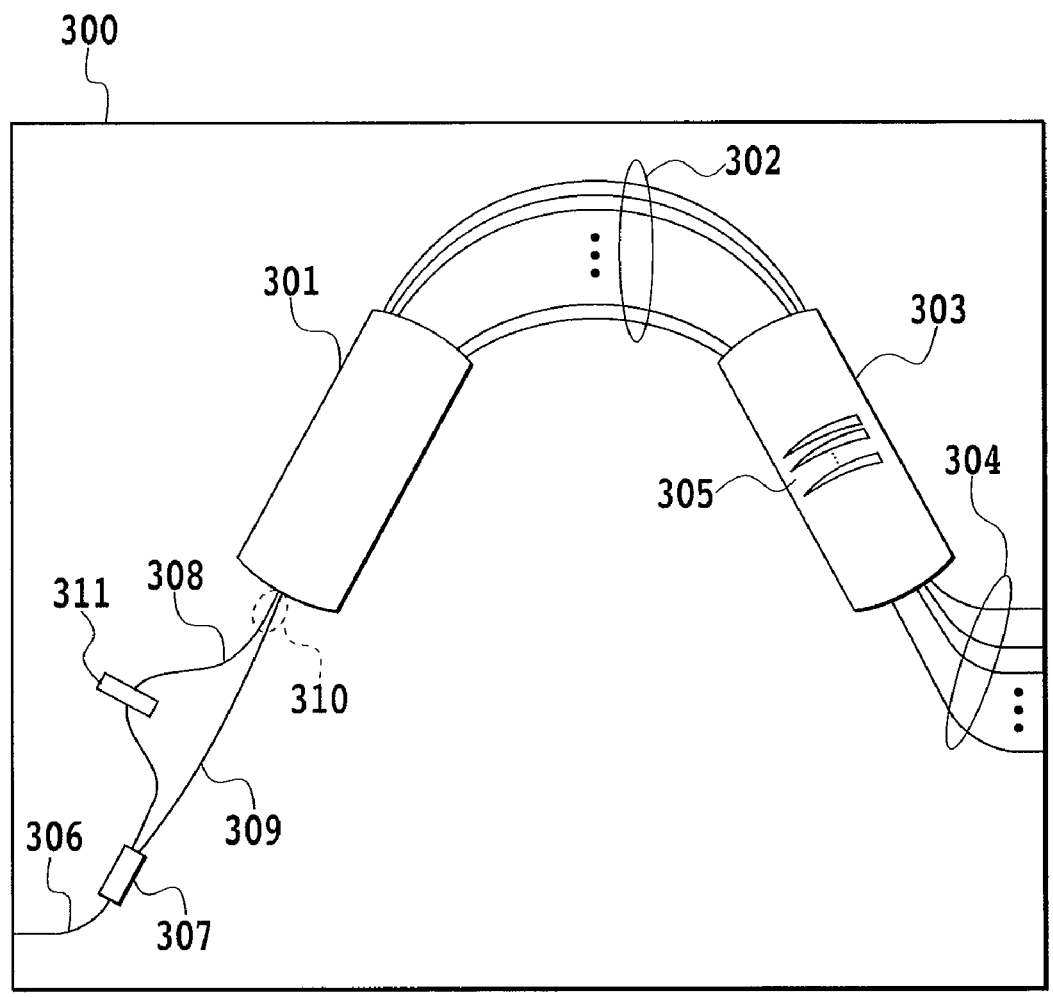
FIG. 3 is a configuration diagram of an optical wavelength multiplexing/de-multiplexing circuit according to a first embodiment of the present invention.

An optical wavelength multiplexing/de-multiplexing circuit according to a first embodiment of the present invention will be explained. FIG. 3 is a plan view showing a configuration of an athermal MZI-synchronized AWG type optical wavelength multiplexing/de-multiplexing circuit 300 of the present embodiment. The optical wavelength multiplexing/de-multiplexing circuit 300 is provided with a first slab waveguide 301, an arrayed waveguide 302, a second slab waveguide 303, a second input/output waveguide 304, a groove 305 which is formed in the second slab waveguide 303 and which is filled with the temperature compensation material, a first input/output waveguide 306, a temperature dependent type phase difference generation coupler 307, a first arm waveguide 308, a second arm waveguide 309, a directional coupler 310, and a groove 311 which is formed in the first arm waveguide 308 and which is filled with the above temperature compensation material.

In FIG. 3, the length of the i-th arrayed waveguide Li is expressed as $L_i = L_1 + (i-1) \cdot \Delta L$, and is designed so as to become sequentially longer by a certain amount $\Delta L$. In response to this design, a length Li' in which a light wave passing through a center wavelength channel is divided by the groove 305 in the second slab waveguide 303, after having passed through each of the arrayed waveguides, is expressed as $L_i' = L_1' + (i-1) \cdot \Delta L'$, and formed so as to become sequentially longer by an amount $\Delta L'$ proportional to $\Delta L$. Further, the length difference between the first arm waveguide 308 and the second arm waveguide 309 is designed so as to be ΔI, and a length divided by the groove 311 in the first arm waveguide is designed so as to be ΔI' proportional to ΔI.

In the optical wavelength multiplexing/de-multiplexing circuit 300, Δ of the waveguide is 1.5%, a core thickness is 4.5 μm, an effective refractive index temperature coefficient α is $1.0 \times 10^{-5} + 1.9 \times 10^{-8} \times T$, a core width in the arrayed waveguide 302, the second input/output waveguide 304, the first input/output waveguide 306, the first arm waveguide 308, and the second arm waveguide 309 is 4.5 μm, and a length in the first slab waveguide 301 and the second slab waveguide 303 is 8200 μm. The second input/output waveguides 304 are disposed at a part connected to the second slab waveguide 303 in the number of the wavelength channels with a spacing of 15 μm, and a linearly tapered waveguide is provided to each terminal thereof having an opening width of 11.0 μm. A core width in the two waveguides of the directional coupler 310 is 4.0 μm, a waveguide spacing is 6.0 μm, a coupling rate is 50%, and the temperature compensation material is silicone resin (refractive index temperature coefficient $\alpha' = -3.5 \times 10^{-4} + 1.5 \times 10^{-7} \times T$). Further, the optical wavelength multiplexing/de-multiplexing circuit 300 is designed as follows; the number of the wavelength channels is 40, a wavelength channel spacing is 0.4 nm (50 GHz), and a transmission wavelength of the center wavelength channel (21st wavelength channel) is 1544.53 nm (194.1 THz). At this time, the number of the arrayed waveguides 302 is 250, ΔL is 62.6 μm, and ΔI is 4040 μm. Here, ΔL' and ΔI' to be provided by the temperature compensation material filled in the grooves 305 and 311 become, respectively, $\Delta L' = \Delta L/(1-\alpha'/\alpha) = \Delta L/(1-(\alpha'_1+\alpha'_2 T)/(\alpha_1+\alpha_2 T))$, and $\Delta I' = \Delta I/(1-\alpha'/\alpha) = \Delta I/(1-(\alpha'_1+\alpha'_2 T)/(\alpha_1+\alpha_2 T))$. Here, the operating temperature range of the optical wavelength multiplexing/de-multiplexing circuit 300 is set to be T=−5 to 65° C. At this time, the design is done so as to satisfy the above condition at the center temperature T of 30° C., and ΔL' and ΔI' become ΔL'=1.79 μm and ΔI'=115.4 μm. This design compensates the first order temperature dependence of the optical path length difference between the neighboring waveguides in the arrayed waveguides 302 and the first order temperature dependence of the optical path length difference between the first and second arm waveguides 308 and 309.

Figure 4:
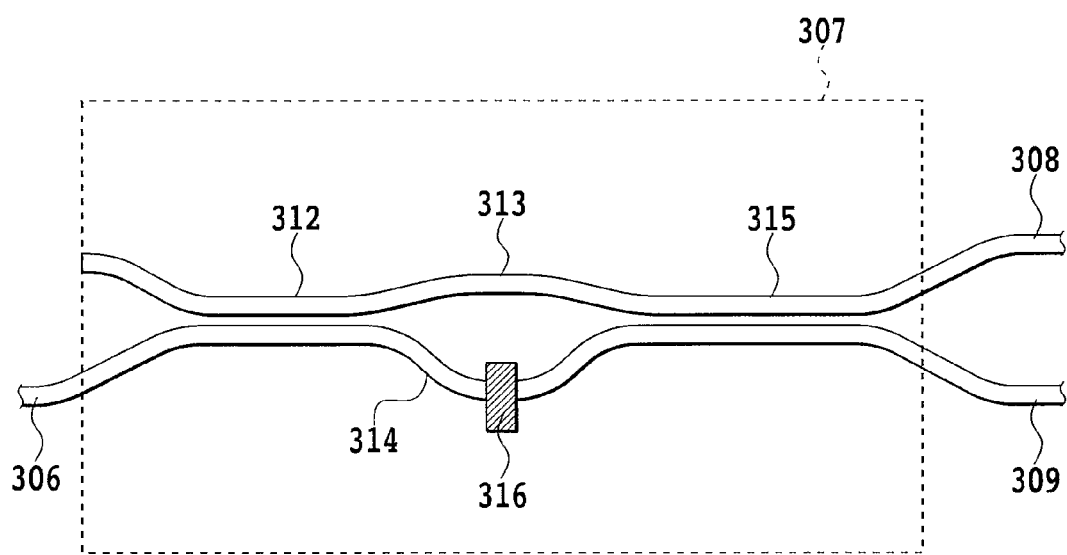
FIG. 4 is a configuration diagram of a temperature dependent type phase difference generation coupler 307 in an optical wavelength multiplexing/de-multiplexing circuit according to a first embodiment of the present invention.

FIG. 4 is a plan view of the temperature dependent type phase difference generation coupler 307 in the optical wavelength multiplexing/de-multiplexing circuit 300 of the present embodiment. The temperature dependent type phase difference generation coupler 307 is provided with a first optical coupler 312 formed with a directional coupler, a third arm waveguide 313, a fourth arm waveguide 314, a second optical coupler 315 formed with a directional coupler, and a groove 316 which is formed in the fourth arm waveguide 314 and in which silicone resin of the temperature compensation material is inserted. Here, a core width in the third and fourth arm waveguides 313 and 314 is set to be 4.5 μm, an optical power branching ratio from the first optical coupler 312 to the third and fourth arm waveguides 313 and 314 is set to be 6:94%, a branching ratio of the second optical coupler 315 is set to be 50:50%, a length difference between the third arm waveguide 313 and the fourth arm waveguide 314 is set to be −2.5 µm, and a width of the groove 316 dividing the fourth arm waveguide 314 is set to be 52.5 µm. By this configuration, the whole temperature dependent type phase difference generation coupler 307 operates as a coupler having a branching ratio of approximately 50:50%. While the optical couplers 312 and 315 of the temperature dependent type phase difference generation coupler can have any configuration in principle, the directional coupler is employed in this example. The directional coupler has an advantage of having a relatively low loss and a high design freedom of the branching ratio.

Figure 5:
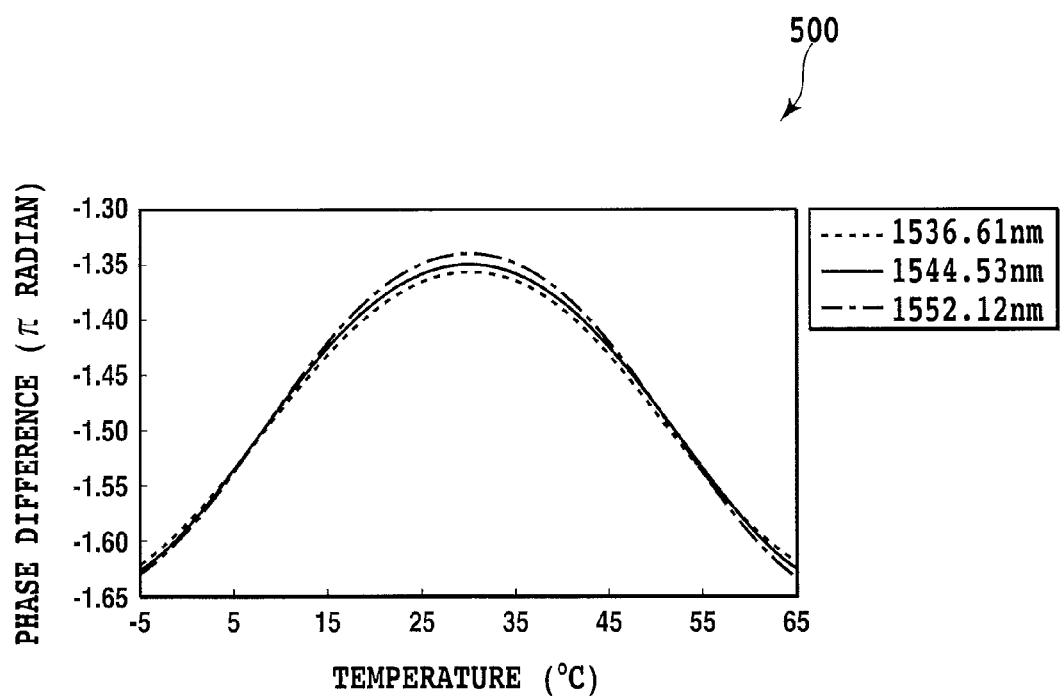
FIG. 5 is a diagram showing a temperature dependence of a phase difference generated by a temperature dependent type phase difference generation coupler 307 in an optical wavelength multiplexing/de-multiplexing circuit according to a first embodiment of the present invention.

FIG. 5 shows a temperature dependence of the phase difference provided between the two outputs of the second optical coupler 315 across −5 to 65° C., when a light wave having a wavelength of 1536.61 nm (wavelength of the first wavelength channel), 1544.53 nm (wavelength of the center 21st wavelength channel), 1552.12 nm (wavelength of the 40th wavelength channel) is input from the first input/output waveguide 306 into the temperature dependent type phase difference generation coupler 307. Here, the phase difference is defined to be a phase difference between the output connected to the first arm waveguide 308 and the output connected to the second arm waveguide 309. From FIG. 5, the phase difference changes between −1.62π and −1.35π in a temperature range of −5 to 65° C., and the phase difference depends little on the wavelength in a wavelength range of the wavelength channel to be used.

Figure 6:
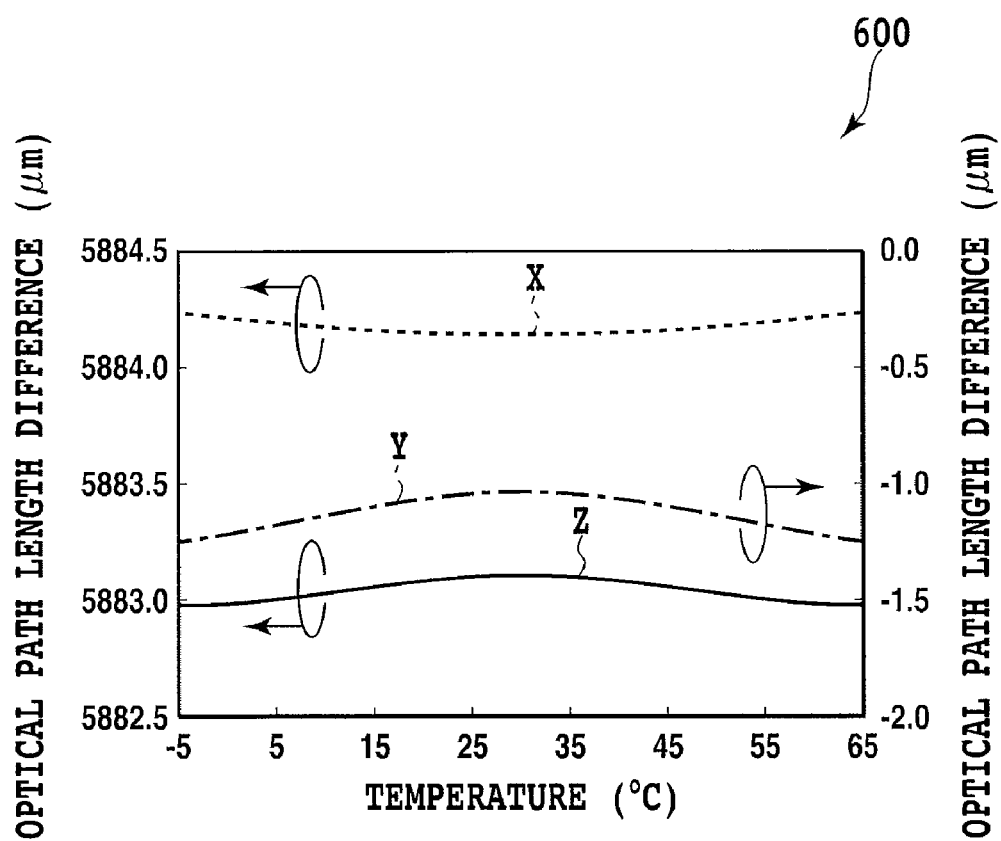
FIG. 6 is a diagram showing a temperature dependence of an optical path length difference in an MZI of an optical wavelength multiplexing/de-multiplexing circuit according to a first embodiment of the present invention.

FIG. 6 is a diagram showing a temperature dependence (line Z) of the optical path length difference across −5 to 65° C. in the MZI configured with the temperature dependent type phase difference generation coupler 307 to the directional coupler 310 in the optical wavelength multiplexing/de-multiplexing circuit 300 of the present embodiment. Here, the optical path length difference is defined to be a difference between the optical path length via the first arm waveguide 308 and the optical path length via the second arm waveguide 309, and the wavelength of the light wave is set to be 1544.53 nm. For comparison, a temperature dependence (line X) of the optical path length difference between the first and second arm waveguides 308 and 309 and a temperature dependence (line Y) of the optical path length difference generated between the two outputs of the temperature dependent type phase difference generation coupler 307 are shown together at the same wavelength. From FIG. 6, while a second order temperature dependence remains in the line X, the optical path length difference (line Z) of the whole MZI becomes the sum of the optical path length difference of the line X and the optical path length difference (line Y) provided by the temperature dependent type phase difference generation coupler 307, and thus, in this case, has a second order temperature dependence having a sign opposite to that of the line X.

Figure 7:
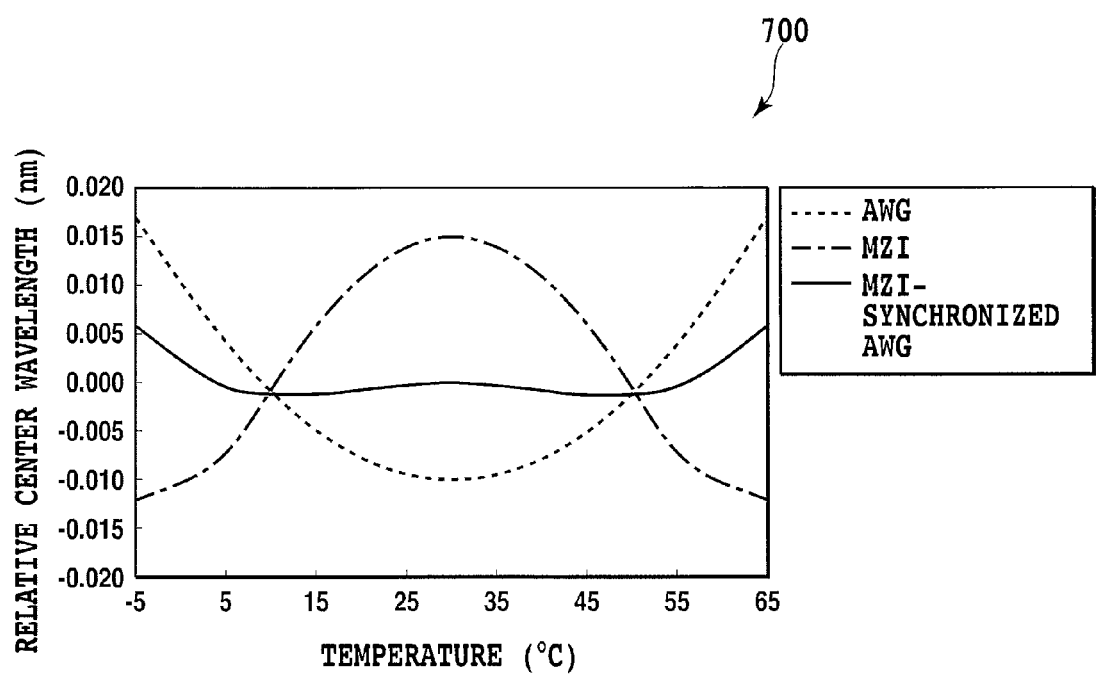
FIG. 7 is a diagram showing a temperature dependence of a center transmission wavelength in an optical wavelength multiplexing/de-multiplexing circuit according to a first embodiment of the present invention.
Figure 8:
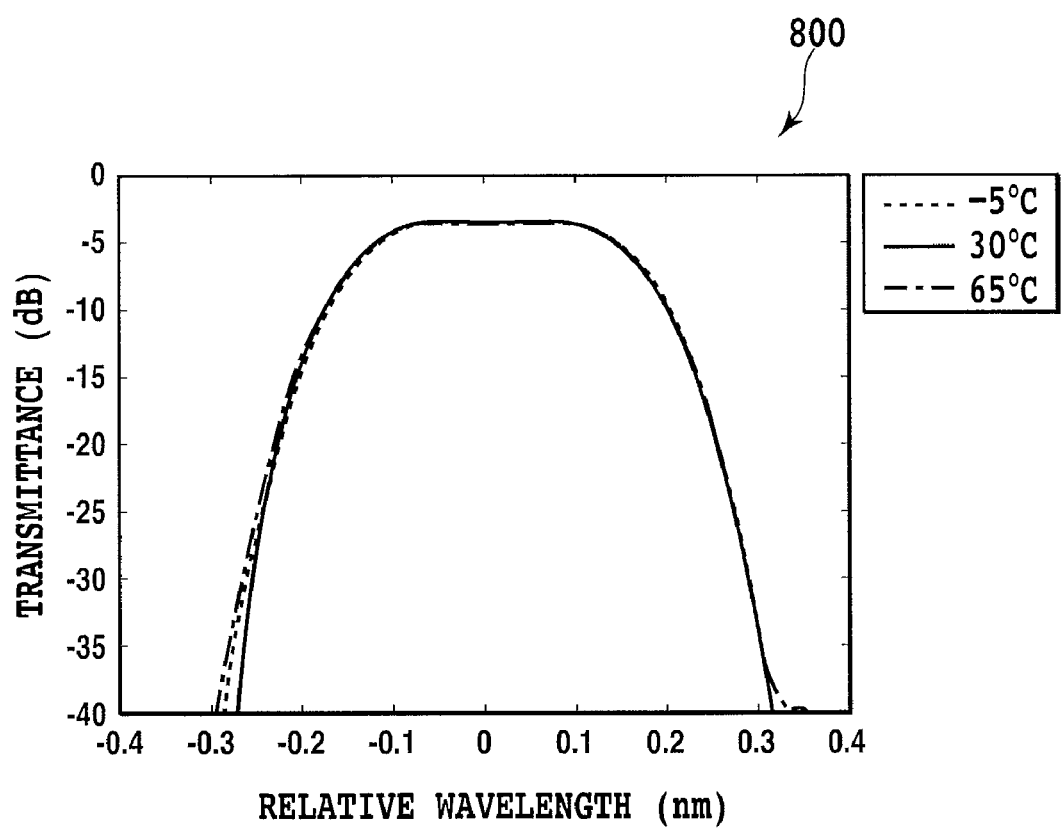
FIG. 8 is a diagram showing a temperature dependence of a transmission spectrum in an optical wavelength multiplexing/de-multiplexing circuit according to a first embodiment of the present invention.

FIG. 7 is a diagram showing a relative temperature dependence of the transmission wavelength in the MZI part, a relative temperature dependence of the center transmission wavelength in the center wavelength channel of the AWG part, and a relative temperature dependence of the center transmission wavelength in the center wavelength channel of the whole MZI-synchronized AWG, in the optical wavelength multiplexing/de-multiplexing circuit 300 of the present embodiment. Further, FIG. 8 is a diagram showing transmission waveforms of the center wavelength channel at temperatures of −5, 30, and 65° C. in the optical wavelength multi-plexing/de-multiplexing circuit 300. From FIGS. 7 and 8, it is apparent that a transmission waveform having a low loss and also a high spectrum flatness is realized and the second order temperature dependence remaining in the AWG part is compensated by the second order temperature dependence having an opposite sign in the MZI part. The temperature dependence of the center transmission wavelength remaining in 0.03 nm across an operating temperature range, T=−5 to 65° C., in the athermal MZI-synchronized AWG of the conventional art can be reduced to have a variation amount of 0.007 nm, that is, 2% of the wavelength channel spacing.

Figure 9:
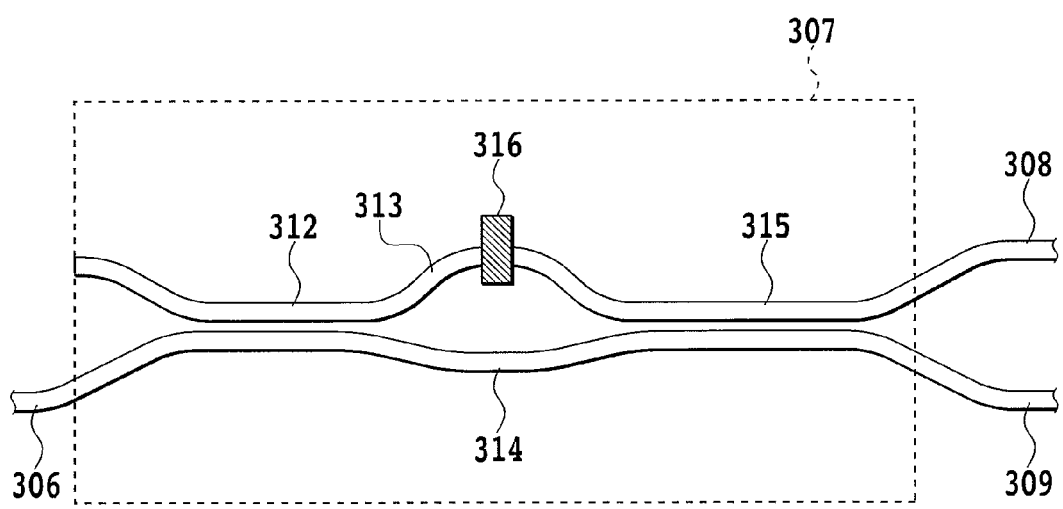
FIG. 9 is a diagram showing another configuration of a temperature dependent type phase difference generation coupler 307 in an optical wavelength multiplexing/de-multiplexing circuit according to a first embodiment of the present invention.
Figure 10:
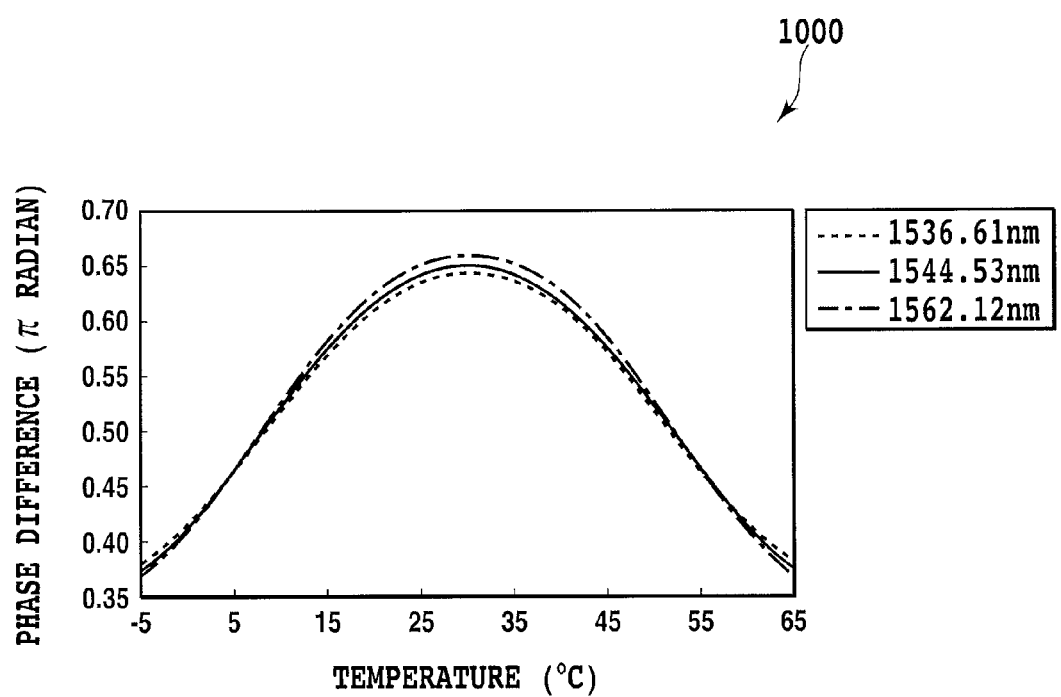
FIG. 10 is a diagram showing a temperature dependence of a phase difference generated by a temperature dependent type phase difference generation coupler 307 having the configuration of FIG. 9 in an optical wavelength multiplexing/de-multiplexing circuit according to a first embodiment of the present invention.

In the temperature dependent type phase difference generation coupler 307 of the present embodiment, while the groove 316 is formed so as to divide the arm waveguide 314 and the temperature compensation material is filled therein in FIG. 4, the shape and disposition of the groove is not limited to this configuration. FIG. 9 is a plan view showing another configuration of the temperature dependent type phase difference generation coupler 307. Here, each symbol is the same as that in FIG. 4. In FIG. 9, the groove 316 is formed in the third arm waveguide 313. An optical power branching ratio from the first optical coupler 312 to the third and fourth arm waveguides 313 and 314 is set to be 6:94%, a branching ratio of the second optical coupler 315 set to be 50:50%, a length difference between the third arm waveguide 313 and the fourth arm waveguide 314 set to be 2.5 µm, and a width of the groove 316 dividing the third arm waveguide 314 set to be 52.5 µm. The temperature dependent type phase difference generation coupler having the configuration of FIG. 9 can generate a phase difference between the two outputs as shown in FIG. 10 in the same way as the temperature dependent type phase difference generation coupler having the configuration of FIG. 4. Further, since the optical power branching ratio to the third arm waveguide in which the groove 316 is formed is smaller than 50%, the configuration of FIG. 9 has an advantage that a loss in the whole temperature dependent type phase difference generation coupler 307 is small compared with the configuration of FIG. 4.

Figure 11:
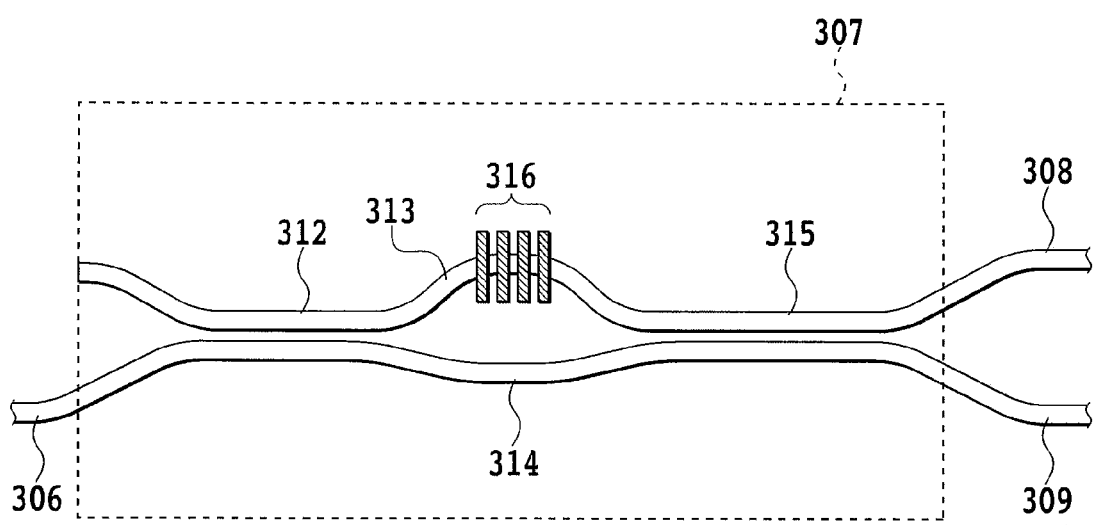
FIG. 11 is a diagram showing another configuration of a temperature dependent type phase difference generation coupler 307 in an optical wavelength multiplexing/de-multiplexing circuit according to a first embodiment of the present invention.

FIG. 11 is a plan view showing yet another configuration of the temperature dependent type phase difference generation coupler 307. Here, each symbol is the same as that in FIG. 4 and FIG. 9. In a configuration of FIG. 11, the groove 316 is formed in the third arm waveguide 313 and also divided into four parts. A branching ratio of the first optical coupler 312, a branching ratio of the second optical coupler 315, and a length difference between the third arm waveguide 313 and the fourth arm waveguide 314 are the same as those in the temperature dependent type phase difference generation coupler of FIG. 9. Further, the sum of the widths in the groove 316 dividing the arm waveguide 314 is set to be 52.5 µm, and a spacing between the end surfaces of the neighboring divided grooves is set to be 15 µm. The temperature dependent type phase difference generation coupler of FIG. 11 can generate a phase difference between the two outputs as shown in FIG. 10 in the same way as the temperature dependent type phase difference generation coupler having the configuration of FIG. 9. Further, by dividing the groove 316, the configuration of FIG. 11 can reduce a radiation loss caused in the groove 316 itself compared with the configuration of FIG. 9 and resultantly has an advantage that the loss in the whole temperature dependent type phase difference generation coupler 307 is further smaller.

Figure 12:
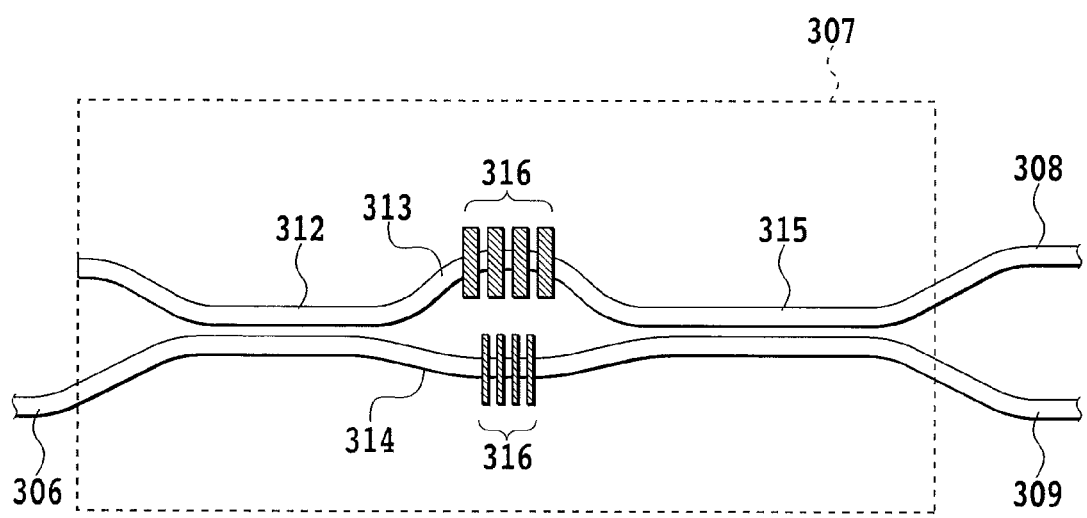
FIG. 12 is a diagram showing another configuration of a temperature dependent type phase difference generation coupler 307 in an optical wavelength multiplexing/de-multiplexing circuit according to a first embodiment of the present invention.

FIG. 12 is a plan view showing yet another configuration of the temperature dependent type phase difference generation coupler 307. Here, each symbol is the same as that in FIG. 4 and FIG. 9. In the configuration of FIG. 12, the groove 316 is formed in the third arm waveguide 313 and the fourth arm waveguide 314, and also each of the grooves 316 is divided into four parts. A branching ratio of the first optical coupler 312, a branching ratio of the second optical coupler 315, and a length difference between the third arm waveguide 313 and the fourth arm waveguide 314 are the same as those in the temperature dependent type phase difference generation coupler of FIG. 9. Further, a difference between the sum of the widths in the divided grooves 316 dividing the third arm waveguide 313 and the sum of the widths in the divided grooves 316 dividing the fourth arm waveguide 314 is set to be 52.5 μm, and a spacing between the end surfaces of the neighboring divided grooves is set to be 15 μm. The temperature dependent type phase difference generation coupler of FIG. 12 can generate a phase difference between the two outputs as shown in FIG. 10 in the same way as the temperature dependent type phase difference generation coupler having the configuration of FIG. 9 or FIG. 11. Further, by forming the divided grooves 316 in both of the third arm waveguide 313 and the fourth arm waveguide 314, temperature dependent type phase difference generation coupler of FIG. 12 has an advantage of having a better fabrication tolerance since a fabrication error of the width of the groove 316, even if it occurs, exerts little influence on the optical path length difference between the third arm waveguide 313 and the fourth arm waveguide 314, while the radiation loss caused in the groove 316 itself is being suppressed.

Figure 13:
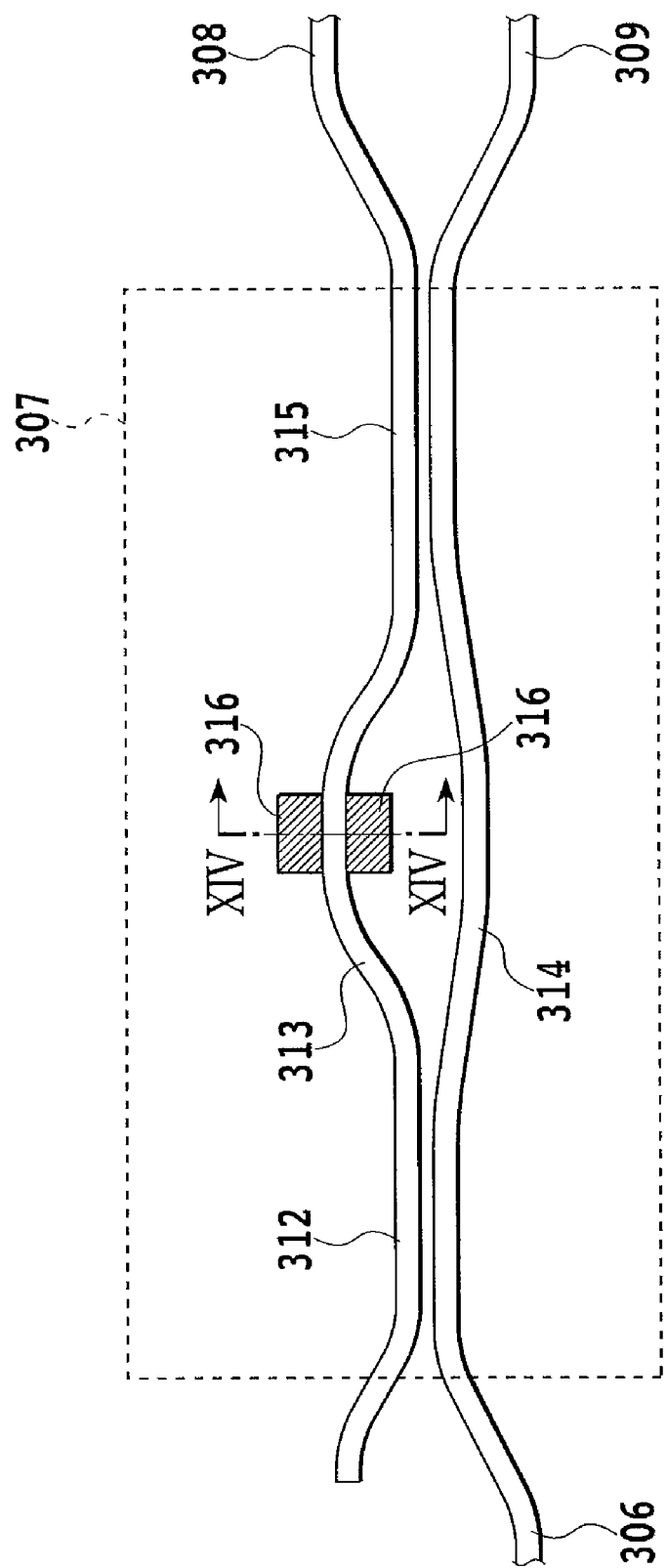
FIG. 13 is a diagram showing another configuration of a temperature dependent type phase difference generation coupler 307 in an optical wavelength multiplexing/de-multiplexing circuit according to a first embodiment of the present invention.
Figure 14:
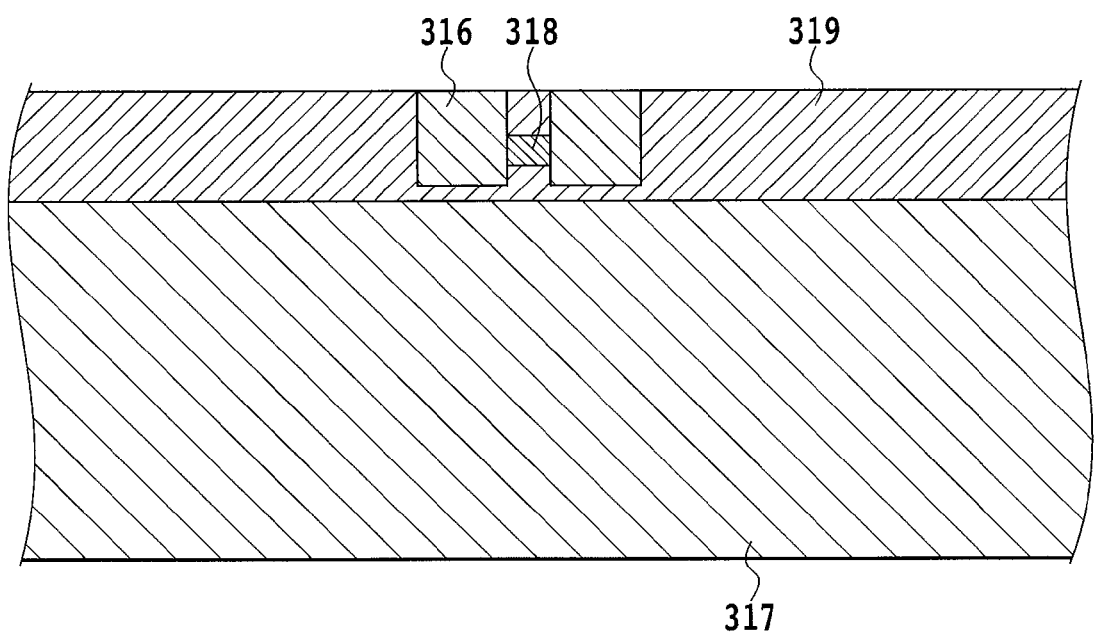
FIG. 14 is a diagram showing a cross-sectional structure of a part along the line XIV-XIV of FIG. 13.

FIG. 13 is a plan view showing still another configuration of the temperature dependent type phase difference generation coupler 307, and FIG. 14 is a cross-sectional view of a part along the line XIV-XIV of FIG. 13. The waveguide having a configuration such as one shown in FIGS. 13 and 14 is disclosed in Non-patent document 4. In FIGS. 13 and 14, the cross-section of the part along the line XIV-XIV includes a silicon substrate 317, a waveguide core 318, a clad 319, and the like. In the configuration of FIGS. 13 and 14, the groove 316 is formed so as to contact both side surfaces of the waveguide core 318 which is a part of the third arm waveguide 313, and the temperature compensation material is inserted therein. At this time, the length of the groove 316 contacting the side surface of the waveguide core is set to be 550 μm. By the configuration of FIGS. 13 and 14, it is possible to generate a phase difference between the two outputs as shown in FIG. 10 in the same way as in the temperature dependent type phase difference generation coupler 307 having the configuration of FIG. 9, FIG. 11, or FIG. 12. Further, the configuration of FIGS. 13 and 14 has an advantage of being able to suppress a loss caused in the groove 316 to thereby have a better loss characteristic since the groove 316 does not divide the waveguide core 318, when compared to the configuration of FIG. 9, FIG. 11, or FIG. 12.

Figure 15:
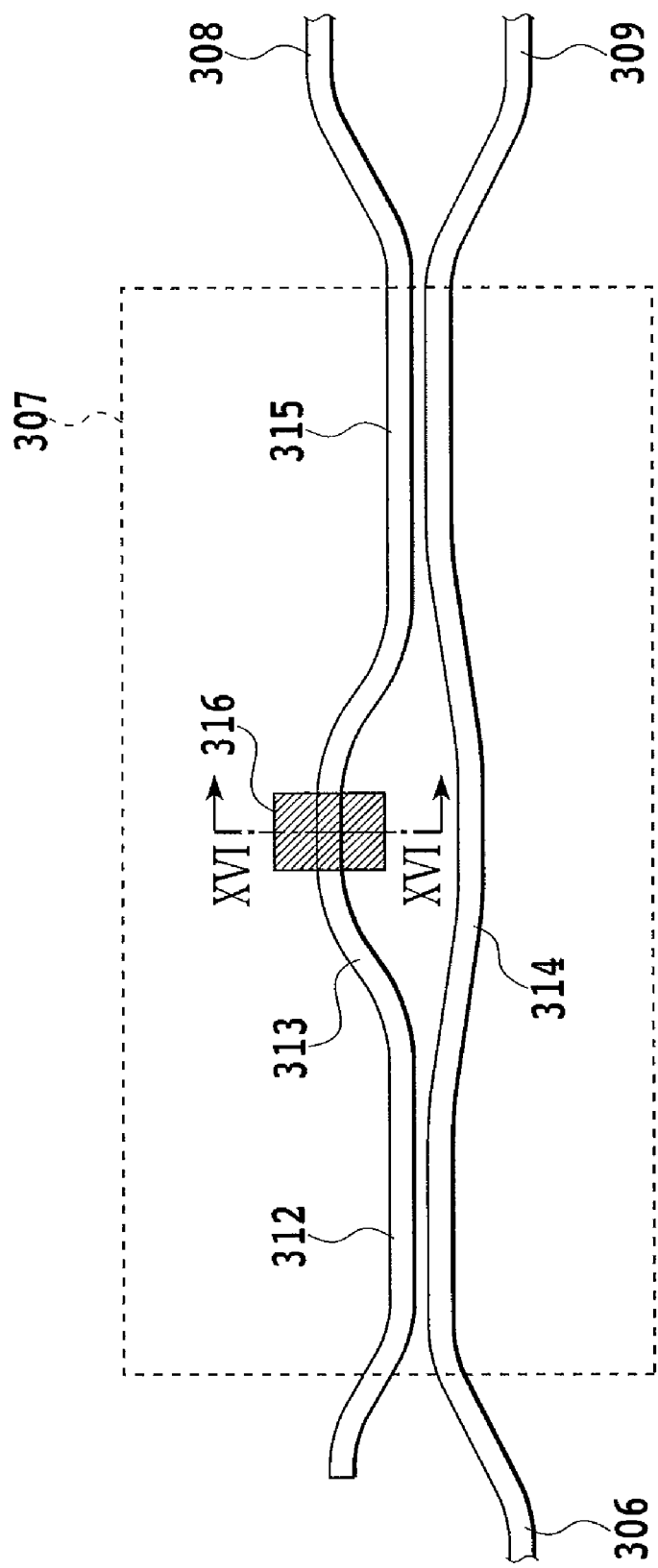
FIG. 15 is a diagram showing another configuration of a temperature dependent type phase difference generation coupler 307 in an optical wavelength multiplexing/de-multiplexing circuit according to a first embodiment of the present invention.
Figure 16:
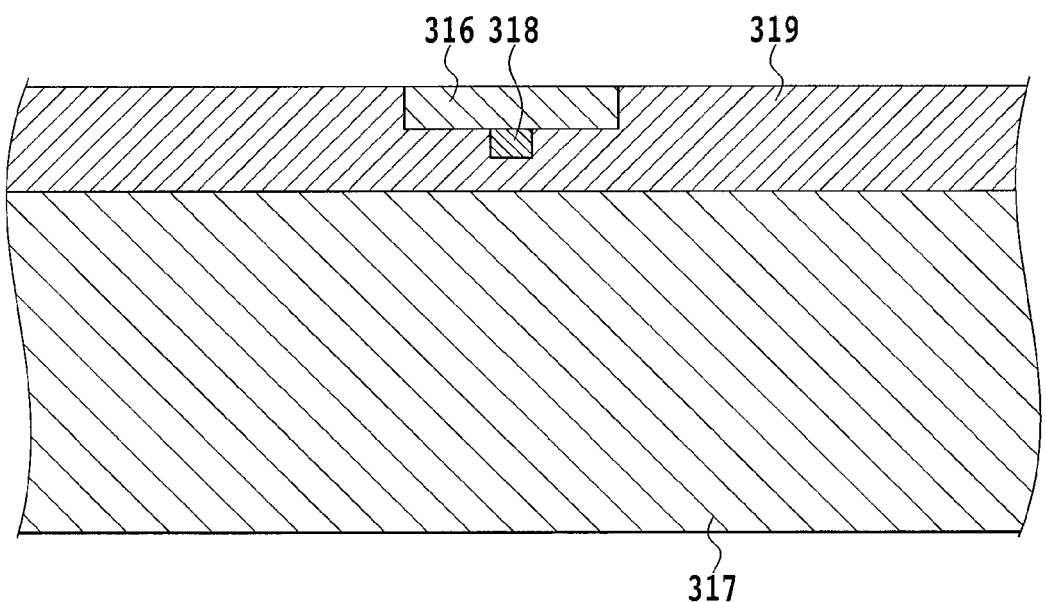
FIG. 16 is a diagram showing a cross-sectional structure of a part along the line XVI-XVI of FIG. 15.

FIG. 15 is a plan view showing still another configuration of the temperature dependent type phase difference generation coupler 307, and FIG. 16 is a cross-sectional view of a part along the line XVI-XVI. Here, each symbol is the same as that in FIG. 13 and FIG. 14. In the configuration of FIGS. 15 and 16, the groove 316 is formed so as to contact the upper surface of the waveguide core 318 which is a part of the third arm waveguide 313, and the temperature compensation material is inserted therein. At this time, the length of the groove 316 contacting the upper surface of the waveguide core is set to be 1400 μm. By the configuration of FIGS. 15 and 16, it is possible to generate a phase difference between the two outputs as shown in FIG. 10 in the same way as in the temperature dependent type phase difference generation coupler 307 having the configuration of FIG. 9, FIG. 11, or FIG. 12. Further, the configuration of FIGS. 13 and 14 has an advantage of being able to suppress a loss caused in the groove 316 to have a better loss characteristic, since the groove 316 does not divide the waveguide core, when compared with the configuration of FIG. 9, FIG. 11, or FIG. 12.

Figure 17:
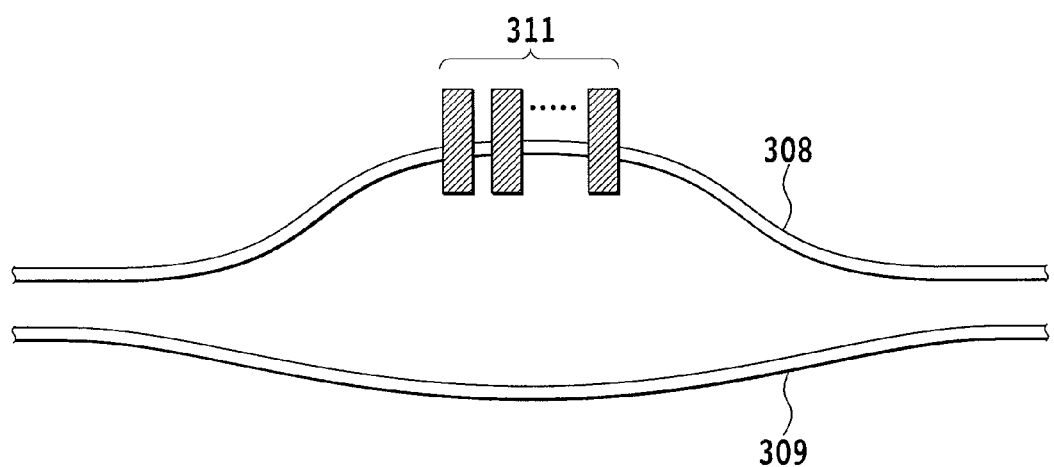
FIG. 17 is a diagram showing another configuration of first and second arm waveguides 308 and 309 and a groove 311 in an optical wavelength multiplexing/de-multiplexing circuit according to a first embodiment of the present invention.

While, for the MZI part of the present embodiment, the single groove 311 is formed so as to divide the first arm waveguide 308 and the temperature compensation material is filled therein in FIG. 3, the shape and disposition of the groove is not limited to this configuration. FIG. 17 is a plan view showing another configuration of the first and second arm waveguides 308 and 309 and the groove 311. Here, each symbol is the same as that in FIG. 3. In FIG. 17, the groove 311 is formed in the first waveguide 308 and also divided into four parts. A length difference ΔI of the first arm waveguide 308 from the second arm waveguide 309 is set to be ΔI=4040 μm in the same way as in the configuration of FIG. 3, the sum of the width ΔI' in the groove 311 dividing the first arm waveguide 308 is set to be ΔI' 115.4 μm, and a spacing between the end surfaces of the neighboring divided grooves is set to be 15 μm. By dividing the groove 311, the configuration of FIG. 17 has an advantage of being able to reduce the radiation loss caused in the groove 311 itself and resultantly causing the whole optical wavelength multiplexing/de-multiplexing circuit to have a small loss when compared with the configuration of FIG. 3.

Figure 18:
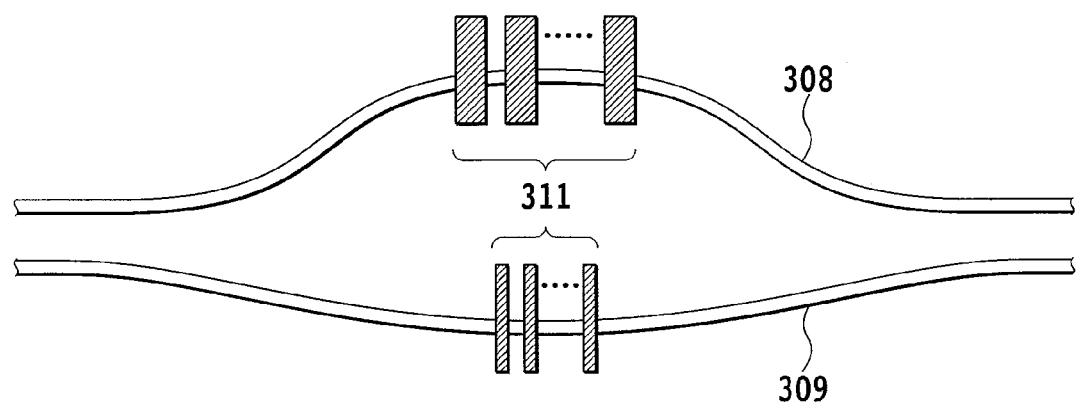
FIG. 18 is a diagram showing another configuration of first and second arm waveguides 308 and 309 and a groove 311 in an optical wavelength multiplexing/de-multiplexing circuit according to a first embodiment of the present invention.

FIG. 18 is a plan view showing still another configuration of the first and second arm waveguides 308 and 309 and the groove 311. Here, each symbol is the same as that in FIG. 3 and FIG. 15. In the configuration of FIG. 18, the groove 311 is formed in both of the first arm waveguide 308 and the second arm waveguide 309, and also each of the grooves 311 is divided into four parts. A length difference ΔI of the first arm waveguide 308 from the second arm waveguide 309 is set to be ΔI=4040 μm in the same way as in the configuration of FIG. 3, a difference ΔI' between the sum of widths in the grooves 311 dividing the first arm waveguide 308 and the sum of the widths in the grooves 311 dividing the second arm waveguide 309 is set to be ΔI'=115.4 μm, and a distance between the end surfaces of the neighboring divided grooves is set to be 15 μm. By forming the divided groove 311 in both of the first arm waveguide 308 and the second arm waveguide 309, the configuration of FIG. 18 has an advantage of having a better fabrication tolerance than the configuration of FIG. 3, since a fabrication error of the width of the groove 311, even if it occurs, exerts little influence on the optical path length difference between the first arm waveguide 308 and the second arm waveguide 309, while the radiation loss caused in the groove 311 itself is being suppressed.

Figure 19:
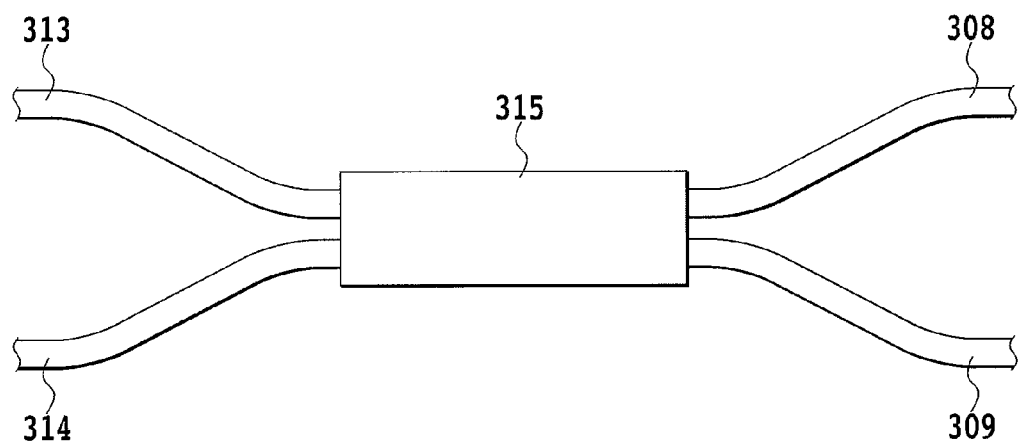
FIG. 19 is a diagram showing another configuration of a second optical coupler 315 in an optical wavelength multiplexing/de-multiplexing circuit according to a first embodiment of the present invention.

Further, while, for the second optical coupler 315, the directional coupler is applied to the configurations of FIG. 4, FIG. 9, FIG. 11, FIG. 12, FIG. 13, and FIG. 15, the second optical coupler 315 can be realized by a configuration not limited to this configuration. FIG. 19 is an enlarged view of a vicinity of the second optical coupler 315 in another configuration. The configuration of FIG. 19 employs a multimode interferometer (MMI) having two inputs and two outputs. Here, the MMI 315 has a width of 18 μm, a length of 740 μm, a spacing between the input/output waveguides of 12 μm, and a branching ratio of 50:50%. By the application of the multimode coupler (MMI), a fabrication error in the waveguide width, even if it occurs, exerts little influence on the branching ratio of the coupler as compared with the directional coupler, and thereby it is possible to realize an optical wavelength multiplexing/de-multiplexing circuit having a better fabrication tolerance.

Figure 20:
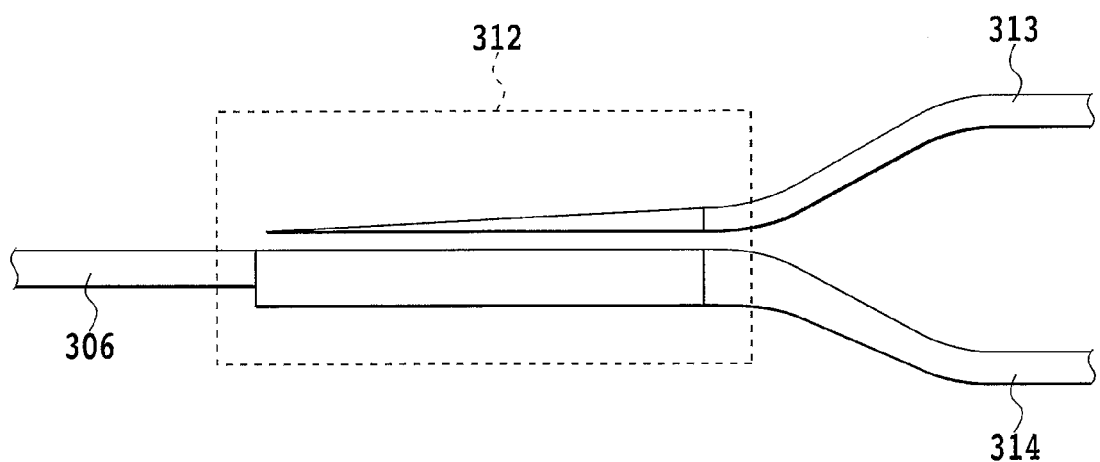
FIG. 20 is a diagram showing another configuration of a first optical coupler 312 in an optical wavelength multiplexing/de-multiplexing circuit according to a first embodiment of the present invention.

Further, while, for the first optical coupler 312, the directional coupler is applied to the configurations of FIG. 4, FIG. 9, FIG. 11, FIG. 12, FIG. 13, and FIG. 15, the first optical coupler 312 can be realized by a configuration not limited to this configuration. FIG. 20 is an enlarged view of a vicinity of the first optical coupler 312 in another configuration. The configuration of FIG. 20 employs an adiabatic coupler configured with two asymmetric waveguides. Here, a length of the coupler is 1000 µm, a waveguide on the side connected to the third arm waveguide 313 is linearly changed from zero to 2.5 µm, and a waveguide on the side connected to the fourth arm waveguide 314 has a constant width of 8 µm and also is connected to the first input/output waveguide 306 having a center axis offset of 0.6 µm. In this adiabatic coupler, the power of a part of a light wave input from the first input/output waveguide 306 is converted into a first order mode at the offset connection part and only the power converted into the first order mode is coupled to a base mode of the neighboring waveguide to realize an optical power branching operation, and then the adiabatic coupler has a branching ratio of 6:94% in the same way as the directional coupler having the configuration of FIG. 9. By the application of the adiabatic coupler, it is possible to realize an optical wavelength multiplexing/de-multiplexing circuit having a better fabrication tolerance, since a fabrication error, even if it occurs, exerts little influence on the branching ratio of the coupler as compared with the directional coupler.

Figure 21:
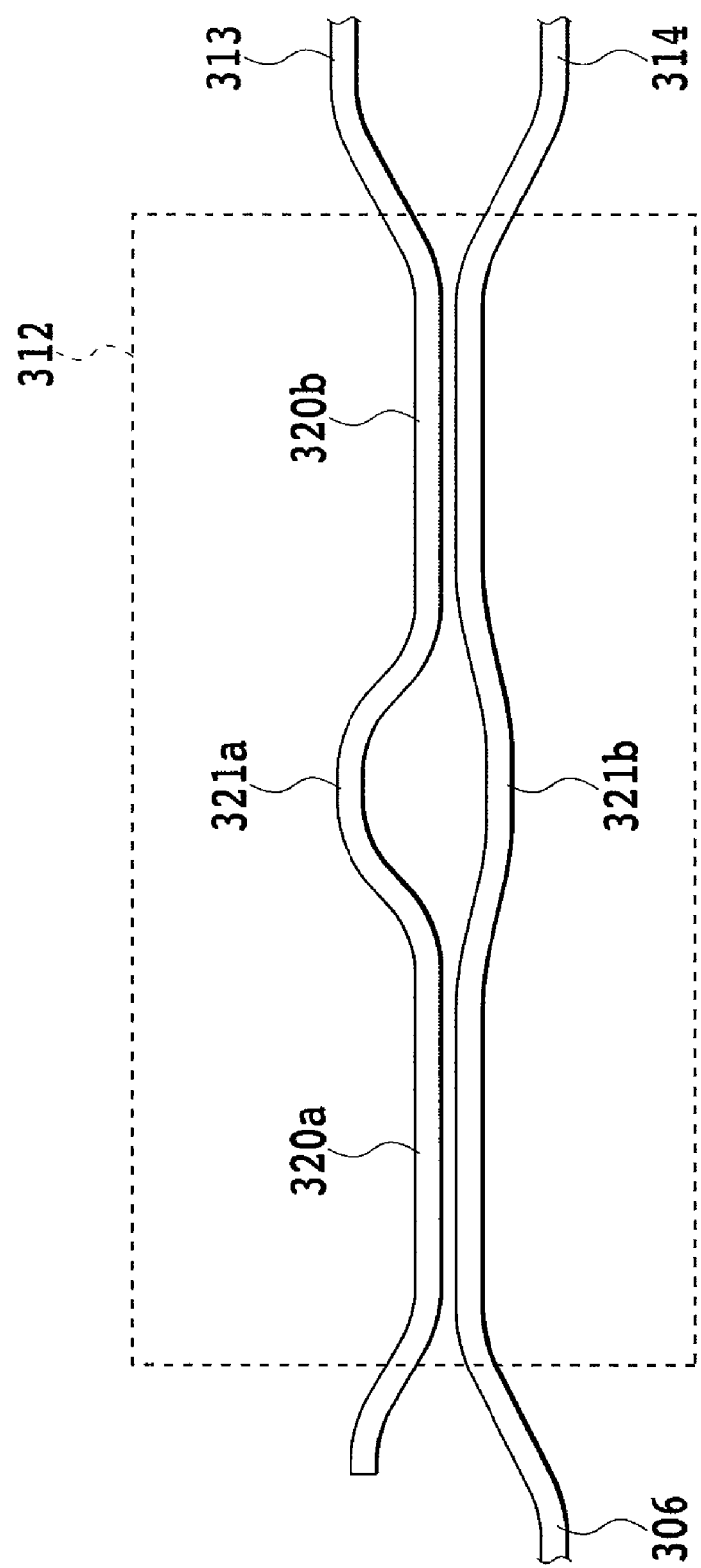
FIG. 21 is a diagram showing another configuration of a first optical coupler 312 in an optical wavelength multiplexing/de-multiplexing circuit according to a first embodiment of the present invention.

FIG. 21 is an enlarged view of a vicinity of the first optical coupler 312 in yet another configuration. The configuration of the FIG. 21 employs a wavelength insensitive coupler (WINC). Here, the WINC is further configured with two directional couplers 320a and 320b, and two arm waveguides 321a and 321b, coupling rates of the directional couplers 320a and 320b are 80% and 85%, respectively, an optical path length difference between the arm waveguide 321a and the arm waveguide 321b is 0.7 µm, and the WINC has a branching ratio of 6:94% in the same way as the directional coupler having the configuration of FIG. 9. By the application of the WINC, the wavelength dependence of the branching ratio is small compared to the single directional coupler, and thus it is possible to realize an optical wavelength multiplexing/de-multiplexing circuit which operates in a wider wavelength range.

Second Embodiment

Figure 22:
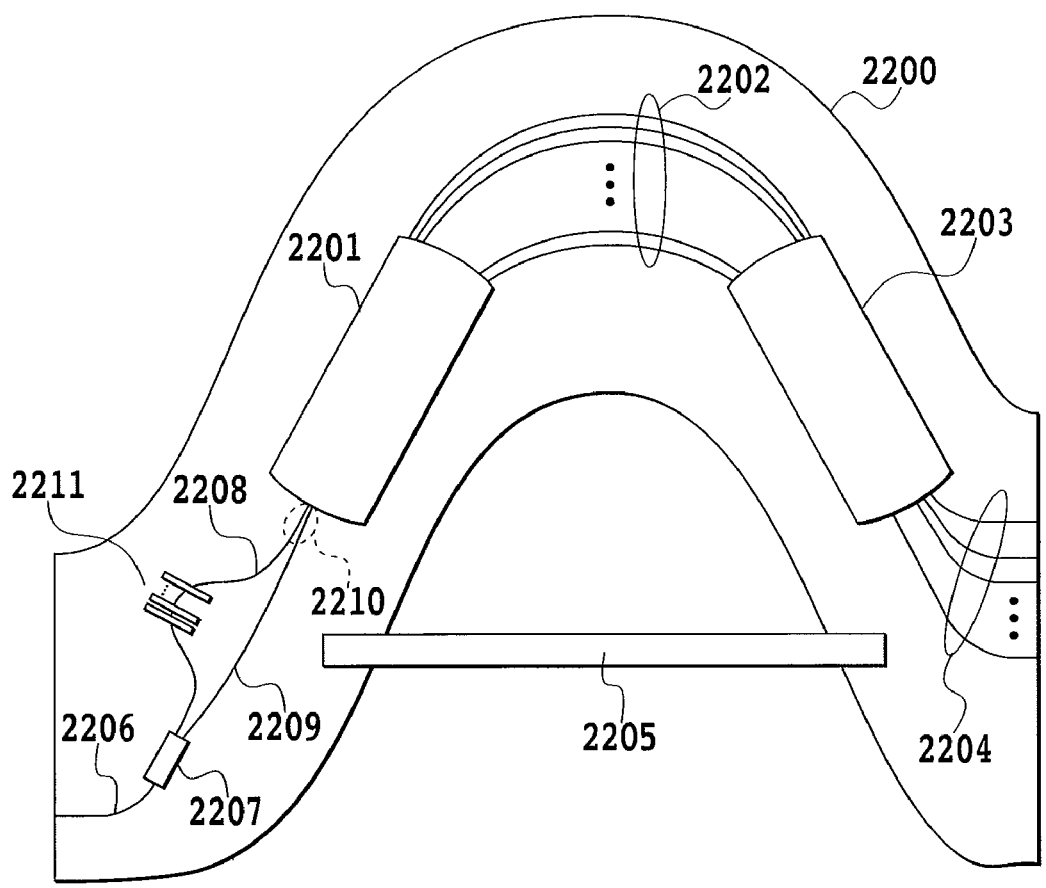
FIG. 22 is a configuration diagram of an optical wavelength multiplexing/de-multiplexing circuit according to a second embodiment of the present invention.

An optical wavelength multiplexing/de-multiplexing circuit according to a second embodiment of the present invention will be explained. FIG. 22 is a plan view showing a configuration of an athermal MZI-synchronized AWG type optical wavelength multiplexing/de-multiplexing circuit 2200 of the present embodiment. The optical wavelength multiplexing/de-multiplexing circuit 2200 is provided with a first slab waveguide 2201, an arrayed waveguide 2202, a second slab waveguide 2203, a second input/output waveguide 2204, a metal rod 2205, a first input/output waveguide 2206, a temperature dependent type phase difference generation coupler 2207, a first arm waveguide 2808, a second arm waveguide 2209, a directional coupler 2210, and a groove 2211 which is divided into eight parts and formed in the first arm waveguide 2208 and in which the temperature compensation material is inserted. The chip of an optical wavelength multiplexing/de-multiplexing circuit 2200 is cut in an arc along a circuit. Both ends of the metal rod 2205 are bonded to both ends in the vicinity of the arc AWG chip, respectively. Further, a material of the metal is aluminum in the present embodiment. In FIG. 22, the arrayed waveguide 2202 is designed to become sequentially longer by a certain amount $\Delta L$. Further, a length difference $\Delta I$ of the first arm waveguide 2208 from the second arm waveguide 2209 is designed to be $\Delta I$, and the sum of lengths separated by the divided grooves 2211 in the first arm waveguide is designed to be $\Delta I'$ proportional to $\Delta I$.

In the optical wavelength multiplexing/de-multiplexing circuit 2200, $\Delta$ of the waveguide is 1.5%, a core thickness is 4.5 µm, an effective refractive index temperature coefficient $\alpha$ is $1.0 \times 10^{-5} + 1.9 \times 10^{-8} \times T$, a core width in the arrayed waveguide 2202, the second input/output waveguide 2204, the first input/output waveguide 2206, the first arm waveguide 2208, and the second arm waveguide 2209 is 4.5 µm, and a length in the first slab waveguide 2201 and the second slab waveguide 2203 is 8400 µm. The second input/output waveguides 2204 are disposed at a part connected to the second slab waveguide 2203 in the number of the wavelength channels with a spacing of 15 µm, and a linearly tapered waveguide is provided to each terminal thereof having an opening width of 11.0 µm. A core width in the two waveguides of the directional coupler 2210 is 4.0 µm, a waveguide spacing is 6.0 µm, a coupling rate is 50%, and the temperature compensation material is silicone resin (refractive index temperature coefficient $\alpha' = -3.5 \times 10^{-4} + 1.5 \times 10^{-7} \times T$). Furthermore, the optical wavelength multiplexing/de-multiplexing circuit 2200 is designed as follows; the number of the wavelength channels is 40, a wavelength channel spacing is 0.4 nm (50 GHz), and a transmission wavelength of the center wavelength channel (21st wavelength channel) is 1544.53 nm (194.1 THz). At this time, the number of the arrayed waveguides 2202 is 250, $\Delta L$ is 62.5 µm, and $\Delta I$ is 4040 µm.

Here, the metal rod 2205 expands or contracts by temperature according to the thermal expansion coefficient of a material. At this time, the shape of the bonded AWG chip is also deformed so as to reduce $\Delta L$ by the metal rod which expands at a high temperature and is deformed so as to increase $\Delta L$ by the metal rod which contracts at a low temperature. Accordingly, by an appropriate setting of the metal rod length, the temperature-induced variation of the optical path length difference between the neighboring arrayed waveguides (product of the effective refractive index of the waveguide and $\Delta L$) is suppressed and the first order temperature dependence of the center transmission wavelength in the AWG part is compensated. Further, $\Delta I'$ to be provided by the temperature compensation material filled in the grooves 2211 become $\Delta I' = \Delta I/(1-\alpha'/\alpha) = \Delta I/(1-(\alpha'_1 + \alpha'_2 T)/(\alpha_1 + \alpha_2 T))$. Here, the operating temperature range of the optical wavelength multiplexing/de-multiplexing circuit 2200 is set to be T=−5 to 65° C. At this time, the design is done so as to satisfy the above condition at the center temperature T of 30° C., and $\Delta I'$ becomes $\Delta I' = 115.4$ µm. This design compensates the first order temperature dependence of the optical path length difference between the first and second arm waveguides 2208 and 2209 in the MZI part.

Figure 23:
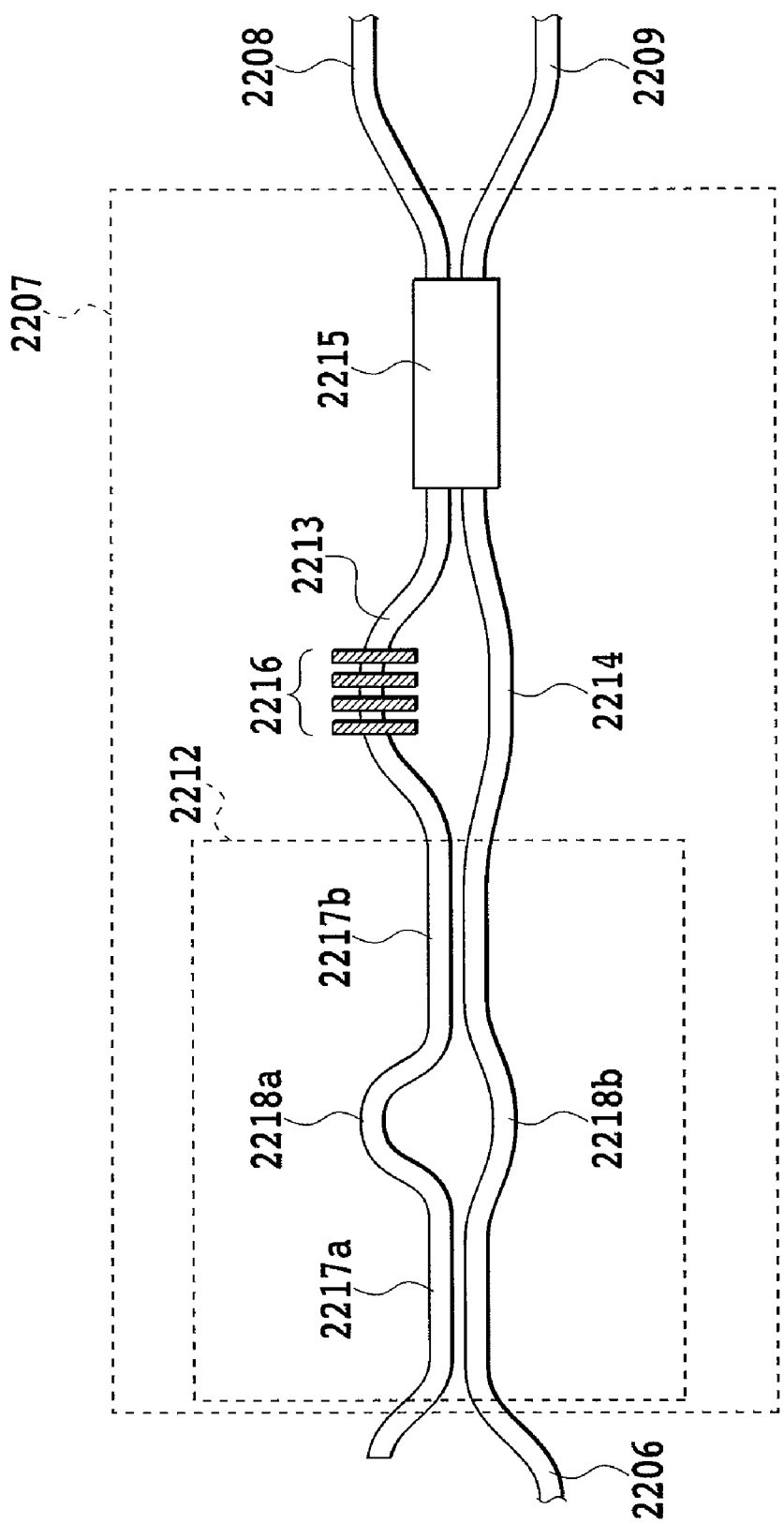
FIG. 23 is a configuration diagram of a temperature dependent type phase difference generation coupler 2207 in an optical wavelength multiplexing/de-multiplexing circuit according to a second embodiment of the present invention.

FIG. 23 is a plan view showing a configuration of the temperature dependent type phase difference generation coupler 2207 in the optical wavelength multiplexing/de-multiplexing circuit 2200 of the present embodiment. The temperature dependent type phase difference generation coupler 2207 is provided with a first optical coupler 2212 formed with a WINC, a third arm waveguide 2213, a fourth arm waveguide 2214, a second optical coupler 2215 formed with an MMI, and a groove 2216 which is divided into four parts and formed in the third arm waveguide 2214 and in which silicone resin of the temperature compensation material is inserted, and the first optical coupler 2212 is provided with directional couplers 2217a and 2217b and two arm waveguides 2218a and 2218b. Here, a core width in the third and fourth arm waveguides 2213 and 2214 is set to be 4.5 µm, an optical power branching ratio from the first optical coupler 2212 to the third and fourth arm waveguides 2213 and 2214 is set to be 6:94%, a branching ratio of the second optical coupler 2215 is set to be 50:50%, a length difference between the third arm waveguide 2213 and the fourth arm waveguide 2214 is set to be 2.0 µm, and the sum of widths in the divided grooves 2216 dividing the third arm waveguide 2213 is set to be 40.6 µm. By this configuration, the whole temperature dependent type phase difference generation coupler 2207 operates as a coupler having a branching ratio of approximately 50:50%.

Figure 24:
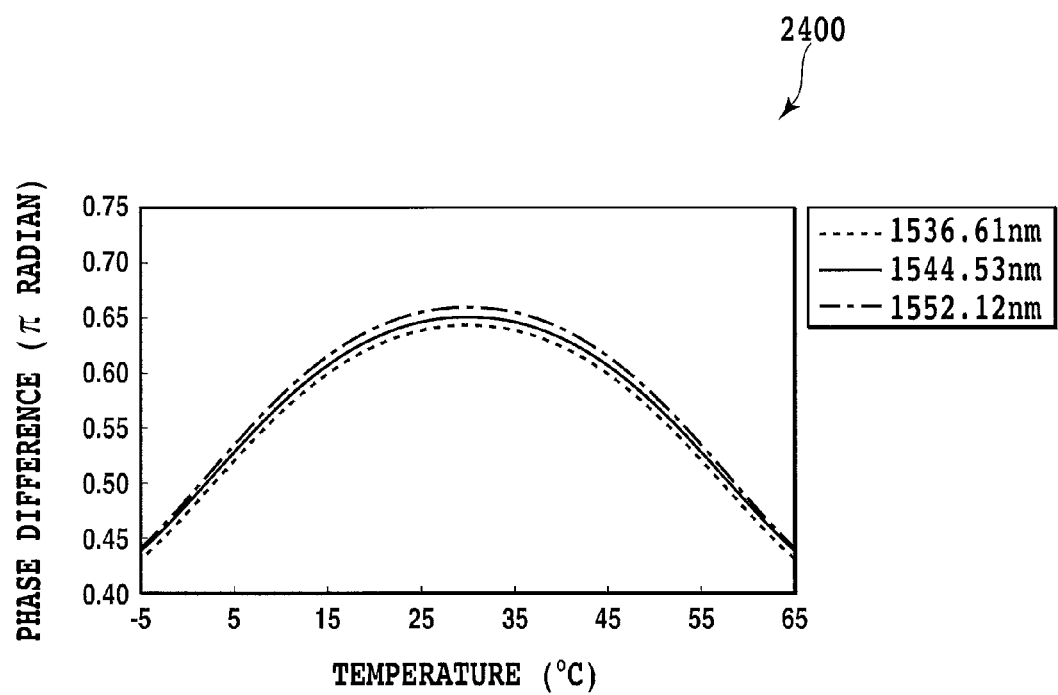
FIG. 24 is a diagram showing a temperature dependence of a phase difference generated by a temperature dependent type phase difference generation coupler 2207 in an optical wavelength multiplexing/de-multiplexing circuit according to a second embodiment of the present invention.

FIG. 24 is a diagram showing a temperature dependence of the phase difference provided between the two output waveguides of the second optical coupler 2215 across −5 to 65° C., when a light wave having wavelengths of 1536.61 nm (wavelength of the first wavelength channel), 1544.53 nm (wavelength of the center 21st wavelength channel), and 1552.12 nm (wavelength of the 40th wavelength channel) is input from the input waveguide 2206 into the temperature dependent type phase difference generation coupler 2207. Here, the phase difference is defined to be a phase difference between the output connected to the first arm waveguide 2208 and the output connected to the second arm waveguide 2209. From FIG. 24, it is apparent that the phase difference changes between $0.44\pi$ and $0.65\pi$ in a temperature range of −5 to 65° C. and the phase difference depends little on the wavelength in a wavelength range of a wavelength channel to be used.

Figure 25:
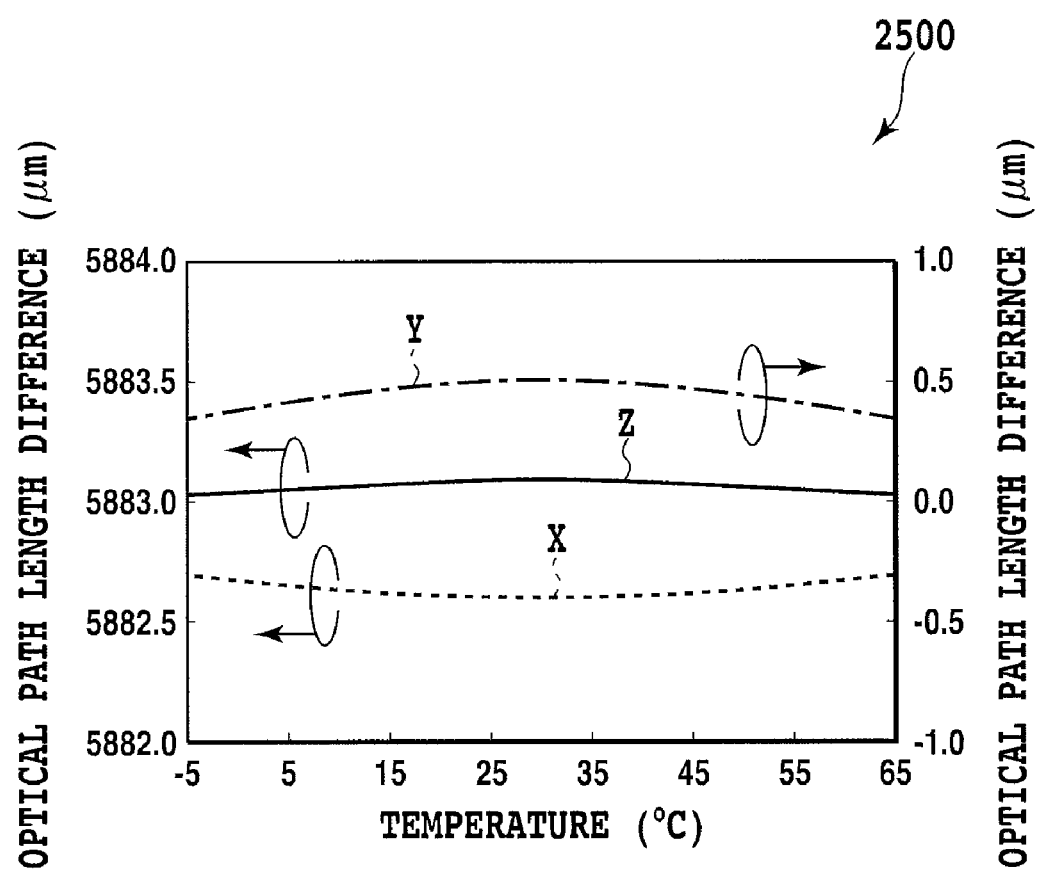
FIG. 25 is a diagram showing a temperature dependence of an optical path length difference in an MZI of an optical wavelength multiplexing/de-multiplexing circuit according to a second embodiment of the present invention.

FIG. 25 is a diagram showing a temperature dependence (line Z) of the optical path length difference across −5 to 65° C. in the MZI configured with the temperature dependent type phase difference generation coupler 2207 to the directional coupler 2210 in the optical wavelength multiplexing/de-multiplexing circuit 2200 of the present embodiment. Here, the optical path length difference is defined to be a difference between the optical path length via the first arm waveguide 2208 and the optical path length via the second arm waveguide 2209, and the wavelength of the light wave is set to be 1544.53 nm. For comparison, a temperature dependence (line X) of the optical path length difference between the first and second arm waveguides 2208 and 2209 and a temperature dependence (line Y) of the optical path length difference generated between the two outputs of the temperature dependent type phase difference generation coupler 2207 are shown together at the same wavelength. From FIG. 25, while a second order temperature dependence remains in the line X, the optical path length difference (line Z) of the whole MZI becomes the sum of the optical path length difference of the line X and the optical path length difference (line Y) provided by the temperature dependent type phase difference generation coupler 2207, and thus, in this case, has a second order temperature dependence having a sign opposite to that of the line X.

Figure 26:
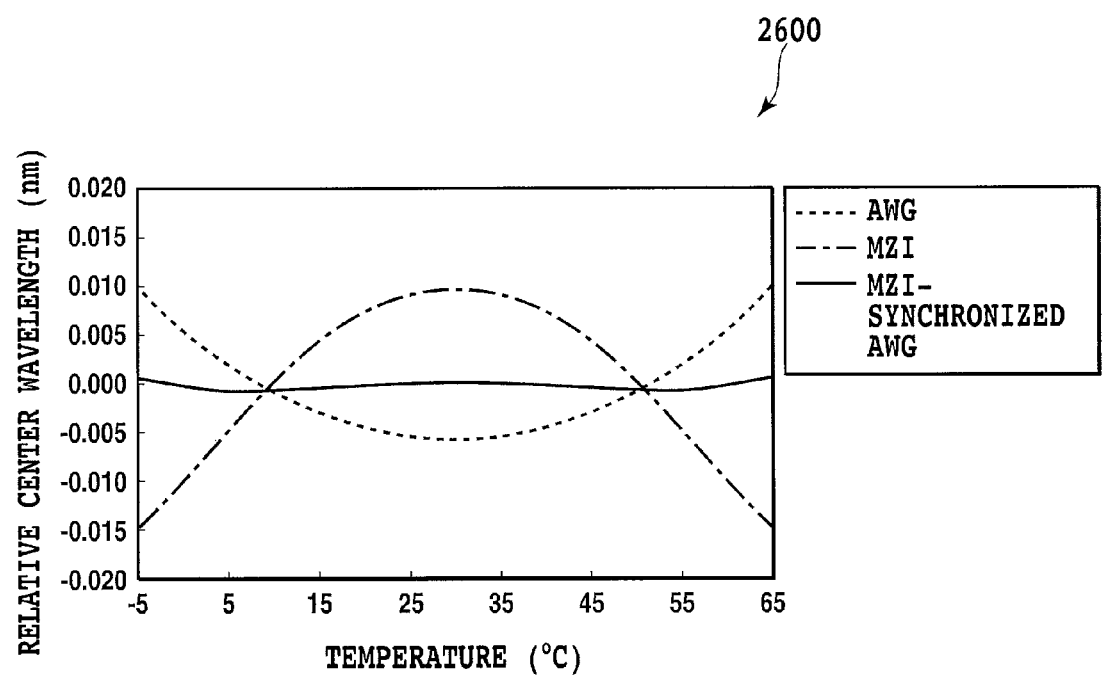
FIG. 26 is a diagram showing a temperature dependence of a center transmission wavelength in an optical wavelength multiplexing/de-multiplexing circuit according to a second embodiment of the present invention.
Figure 27:
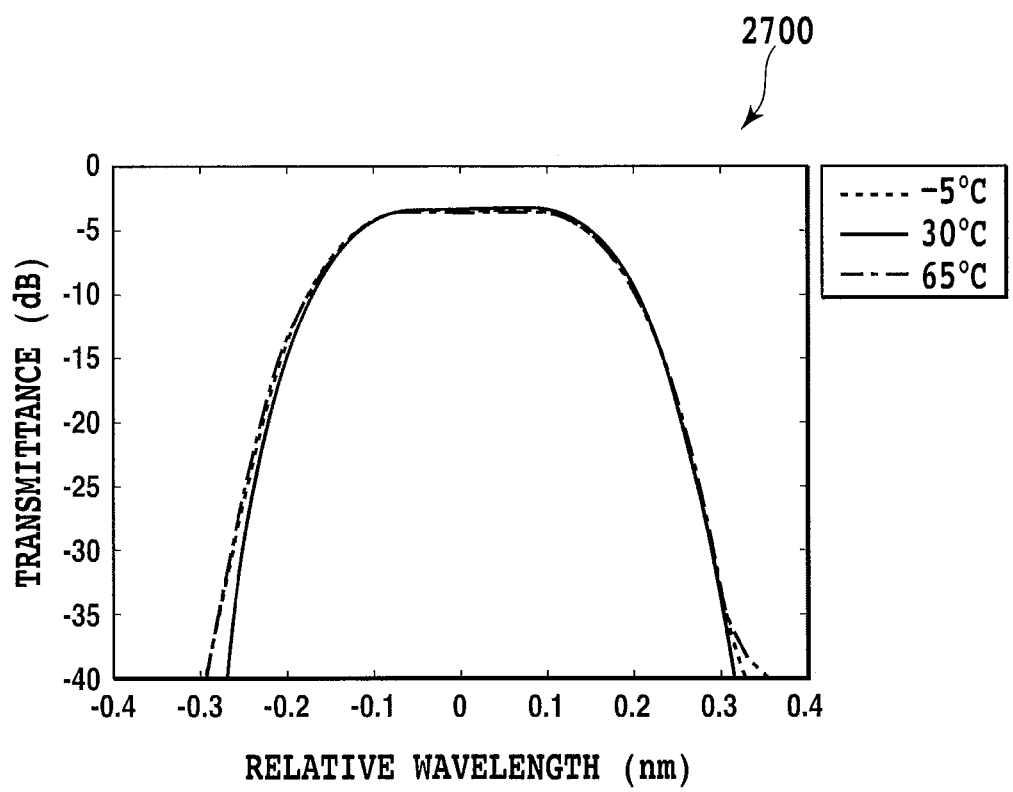
FIG. 27 is a diagram showing a temperature dependence of a transmission spectrum in an optical wavelength multiplexing/de-multiplexing circuit according to a second embodiment of the present invention.

FIG. 26 is a diagram showing a relative temperature dependence of the transmission wavelength in the MZI part, a relative temperature dependence of the center transmission wavelength in the center wavelength channel of the AWG part, and a relative temperature dependence of the center transmission wavelength in the center wavelength channel of the whole MZI-synchronized AWG, in the optical wavelength multiplexing/de-multiplexing circuit 2200 of the present embodiment. Further, FIG. 27 is a diagram showing transmission waveforms of the center wavelength channel at temperatures of −5, 30, and 65° C. in the optical wavelength multiplexing/de-multiplexing circuit 2200. From FIGS. 26 and 27, it is apparent that a transmission waveform having a low loss and also a high spectrum flatness is realized and the second order temperature dependence remaining in the AWG part is compensated by the second order temperature dependence having an opposite sign in the MZI part. The temperature dependence of the center transmission wavelength remaining in 0.02 nm across an operating temperature range, T=−5 to 65° C., in the athermal MZI-synchronized AWG of the conventional art can be reduced to a variation amount of 0.002 nm, that is, 0.5% of the wavelength channel spacing.

Third Embodiment

Figure 28:
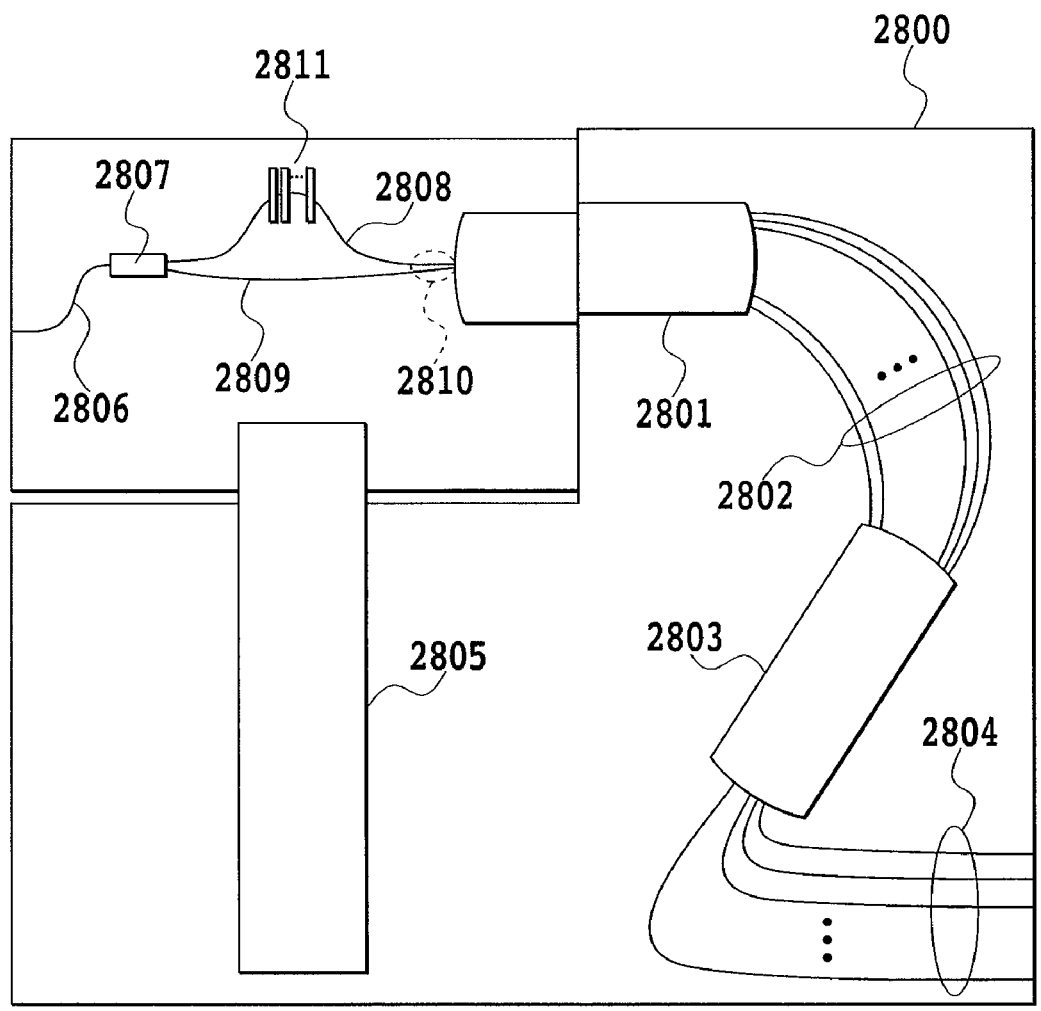
FIG. 28 is a configuration diagram of an optical wavelength multiplexing/de-multiplexing circuit according to a third embodiment of the present invention.

An optical wavelength multiplexing/de-multiplexing circuit according to a third embodiment of the present invention will be explained. FIG. 28 is a plan view showing a configuration of an athermal MZI-synchronized AWG type optical wavelength multiplexing/de-multiplexing circuit 2800 of the present embodiment. The optical wavelength multiplexing/de-multiplexing circuit 2800 is provided with a first slab waveguide 2801, an arrayed waveguide 2802, a second slab waveguide 2803, a second input/output waveguide 2804, a metal plate 2805, a first input/output waveguide 2806, a temperature dependent type phase difference generation coupler 2807, a first arm waveguide 2808, a second arm waveguide 2809, a directional coupler 2810, and a groove 2811 which is divided into eight parts and formed in the first arm waveguide 2808 and in which the temperature compensation material is inserted. The chip of an optical wavelength multiplexing/de-multiplexing circuit 2800 is cut into two chips so as to divide the first slab waveguide 2801. Here, the metal plate 2805 is bonded to each of the two cut chips. Further, a material of the metal is aluminum in the present embodiment. In FIG. 28, the arrayed waveguide 2802 is designed to become sequentially longer by a certain amount ΔL. Further, a length difference between the first arm waveguide 2808 and the second arm waveguide 2809 is designed so as to be Δl, and the sum of lengths separated by the divided grooves 2811 in the first arm waveguide is designed so as to be Δl' proportional to Δl.

In the optical wavelength multiplexing/de-multiplexing circuit 2800, Δ of the waveguide is 1.5%, a core thickness is 4.5 µm, an effective refractive index temperature coefficient α is $1.0\times10^{-5}+1.9\times10^{-8}\times T$, a core width in the arrayed waveguide 2802, the second input/output waveguide 2804, the first input/output waveguide 2806, the first arm waveguide 2808, and the second arm waveguide 2809 is 4.5 µm, and a length in the first slab waveguide 2801 and the second slab waveguide 2803 is 8400 µm. The second input/output waveguides 2804 are disposed at a part connected to the second slab waveguide 2803 in the number of the wavelength channels with a spacing of 15 µm, and a linearly tapered waveguide is provided to each terminal thereof having an opening width of 11.0 µm. A core width in the two waveguides of the directional coupler 2810 is 4.0 µm, a waveguide spacing is 6.0 µm, a coupling rate is 50%, and the temperature compensation material is silicone resin (refractive index temperature coefficient $\alpha'=-3.5\times10^{-4}+1.5\times10^{-7}\times T$). Further, the optical wavelength multiplexing/de-multiplexing circuit 2800 is designed as follows; the number of the wavelength channels is 40, a wavelength channel spacing is 0.4 nm (50 GHz), and a transmission wavelength of the center wavelength channel (21st wavelength channel) is 1544.53 nm (194.1 THz). At this time, the number of the arrayed waveguides 2802 is 250, ΔL is 62.5 µm, and Δl is 4040 µm.

Here, the metal plate 2805 expands or contracts by temperature according to the thermal expansion coefficient of a material. The relative distance between the bonded two chips is changed at this time, and the chip including the MZI part is moved in the upper direction of the drawing by expanding metal plate 2805 at a high temperature and moved in the lower direction of the drawing by the contracting metal plate 2805 at a low temperature, against a reference position of the chip including the arrayed waveguide 2802. Accordingly, by setting the metal plate length appropriately, it is possible to change the position of the chip including this MZI part so as to compensate the temperature-induced variation of the optical path length difference between the arrayed waveguides 2802, and the first order temperature dependence of the center transmission wavelength in the AWG part is compensated by this structure. Further, ΔI' to be provided by the temperature compensation material filled in the grooves 3112811 become ΔI'=ΔI/(1−α'/')=ΔI/(1−(α'$_1$+α'$_2$T)/(α$_1$+α$_2$T). Here, the operating temperature range of the optical wavelength multiplexing/de-multiplexing circuit 2800 is assumed as T=−5 to 65° C. At this time, the design is done so as to satisfy the above condition at the center temperature T of 30° C., and ΔI' becomes ΔI'=115.4 μm. This design compensates the first order temperature dependence of the optical path length difference between the first and second arm waveguides 2808 and 2809 in the MZI part.

Figure 29:
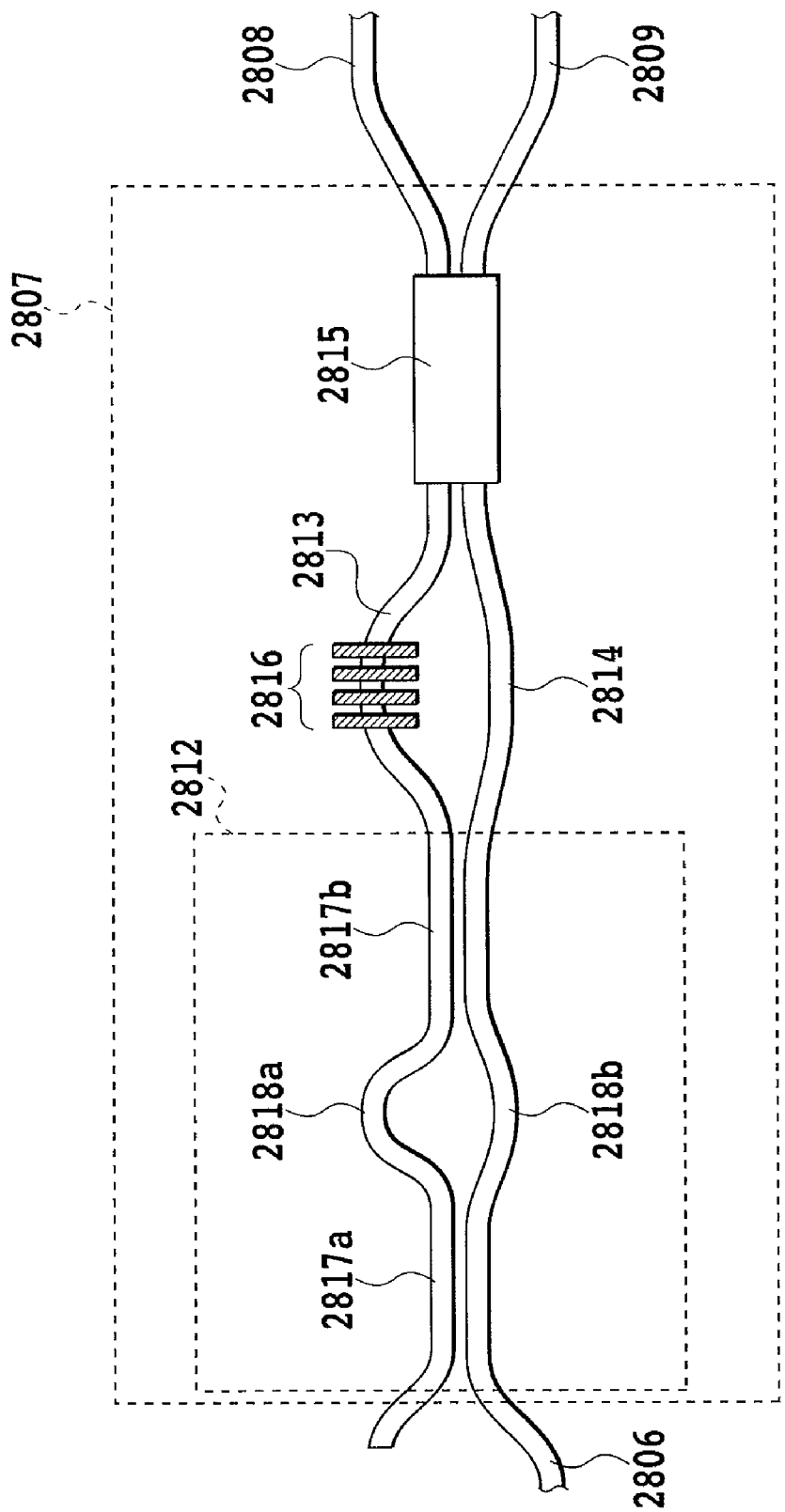
FIG. 29 is a configuration diagram of a temperature dependent type phase difference generation coupler 2807 in an optical wavelength multiplexing/de-multiplexing circuit according to a third embodiment of the present invention.

FIG. 29 is a plan view showing a configuration of the temperature dependent type phase difference generation coupler 2807 in the optical wavelength multiplexing/de-multiplexing circuit 2800 of the present embodiment. The temperature dependent type phase difference generation coupler 2807 is provided with a first optical coupler 2812 formed with a WINC, a third arm waveguide 2813, a fourth arm waveguide 2814, a second optical coupler 2815 formed with an MMI, and a groove 2816 which is divided into four parts and formed in the third arm waveguide 2814 and in which silicone resin of the temperature compensation material is inserted, and the first optical coupler 2812 is provided with directional couplers 2817a and 2817b and two arm waveguides 2818a and 2818b. Here, a core width in the third and fourth arm waveguides 2813 and 2814 is set to be 4.5 μm, an optical power branching ratio from the first optical coupler 2812 to the third and fourth arm waveguides 2813 and 2814 is set to be 6:94%, a branching ratio of the second optical coupler 2815 is set to be 50:50%, a length difference between the third arm waveguide 2813 and the fourth arm waveguide 2814 is set to be 2.0 μm, and the sum of widths in the divided grooves 2816 separating the third arm waveguide 2813 is set to be 40.6 μm. The whole temperature dependent type phase difference generation coupler 2807 operates as a coupler having a branching ratio of approximately 50:50%.

Figure 30:
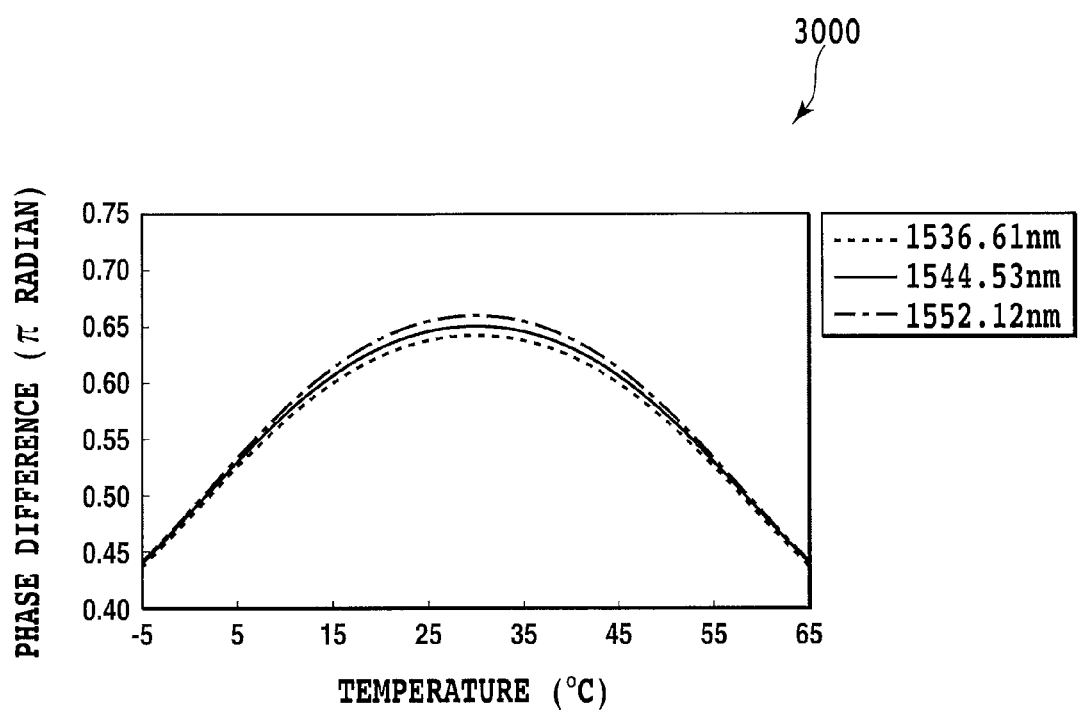
FIG. 30 is a diagram showing a temperature dependence of a phase difference generated by a temperature dependent type phase difference generation coupler 2807 in an optical wavelength multiplexing/de-multiplexing circuit according to a third embodiment of the present invention.

FIG. 30 is a diagram showing a temperature dependence of the phase difference provided between the two output waveguides of the second optical coupler 2815 across −5 to 65° C., when a light wave having wavelengths of 1536.61 nm (wavelength of the first wavelength channel), 1544.53 nm (wavelength of the center 21st wavelength channel), and 1552.12 nm (wavelength of the 40th wavelength channel) is input from the input waveguide 2806 into the temperature dependent type phase difference generation coupler 2807. Here, the phase difference is defined to be a phase difference between the output connected to the first arm waveguide 2808 and the output connected to the second arm waveguide 2809. From FIG. 30, it is apparent that the phase difference changes between 0.44π and 0.65π in a temperature range of −5 to 65° C. and the phase difference depends little on the wavelength in a wavelength range of a wavelength channel to be used.

Figure 31:
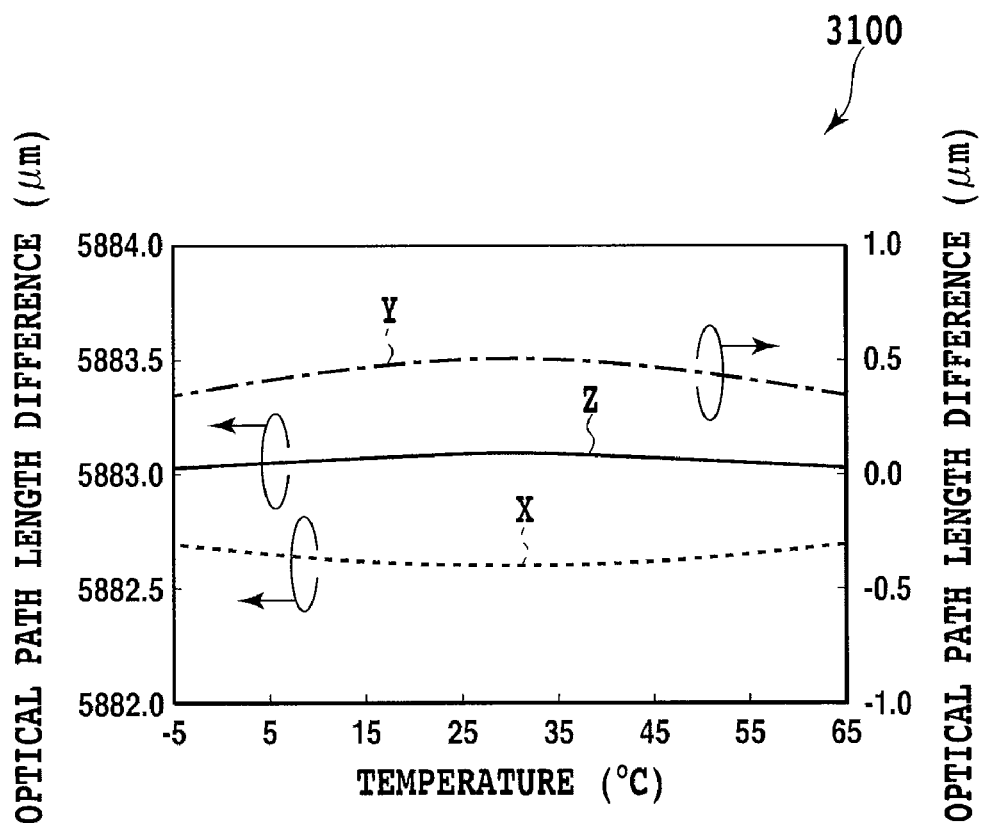
FIG. 31 is a diagram showing a temperature dependence of an optical path length difference in an MZI of an optical wavelength multiplexing/de-multiplexing circuit according to a third embodiment of the present invention.

FIG. 31 is a diagram showing a temperature dependence (line Z) of the optical path length difference across −5 to 65° C. in the MZI configured with the temperature dependent type phase difference generation coupler 2807 to the directional coupler 2810 in the optical wavelength multiplexing/de-multiplexing circuit 2800 of the present embodiment. Here, the optical path length difference is defined to be a difference between the optical path length via the first arm waveguide 2808 and the optical path length via the second arm waveguide 2809, and the wavelength of the light wave is set to be 1544.53 nm. For comparison, a temperature dependence (line X) of the optical path length difference between the first and second arm waveguides 2808 and 2809 and a temperature dependence (line Y) of the optical path length difference generated between the two outputs of the temperature dependent type phase difference generation coupler 2807 are shown together at the same wavelength. From FIG. 31, while a second order temperature dependence remains in the line X, the optical path length difference (line Z) of the whole MZI becomes the sum of the optical path length difference of the line X and the optical path length difference (line Y) provided by the temperature dependent type phase difference generation coupler 2807, and thus, in this case, has a second order temperature dependence having a sign opposite to that of the line X.

Figure 32:
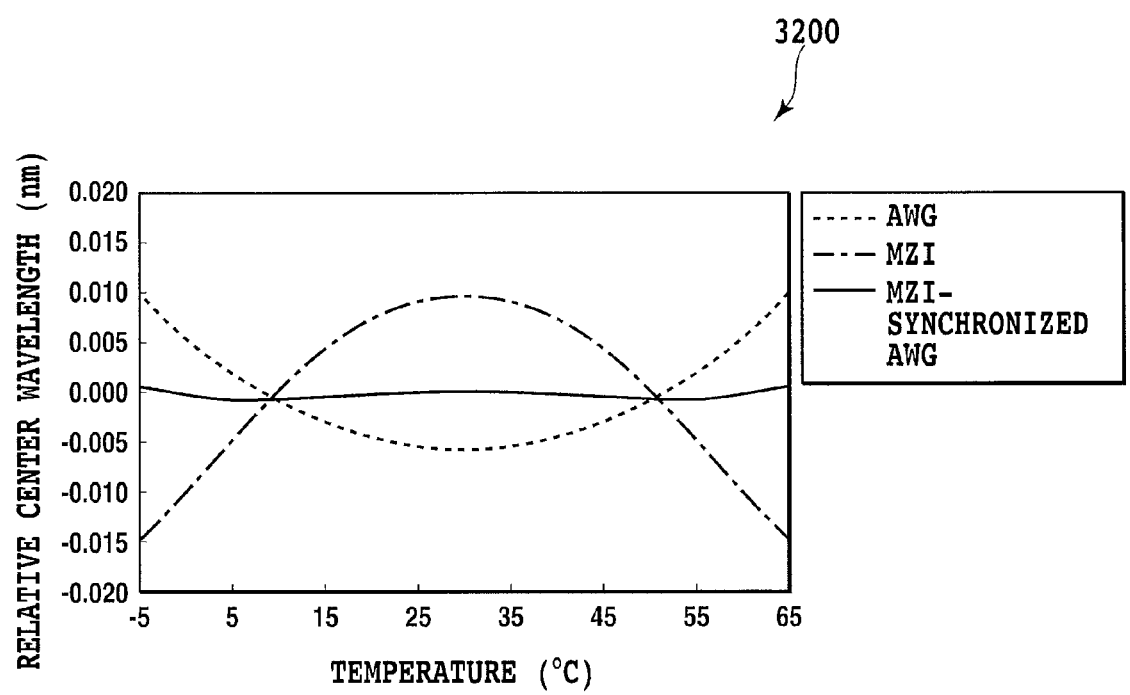
FIG. 32 is a diagram showing a temperature dependence of a center transmission wavelength in an optical wavelength multiplexing/de-multiplexing circuit according to a third embodiment of the present invention.
Figure 33:
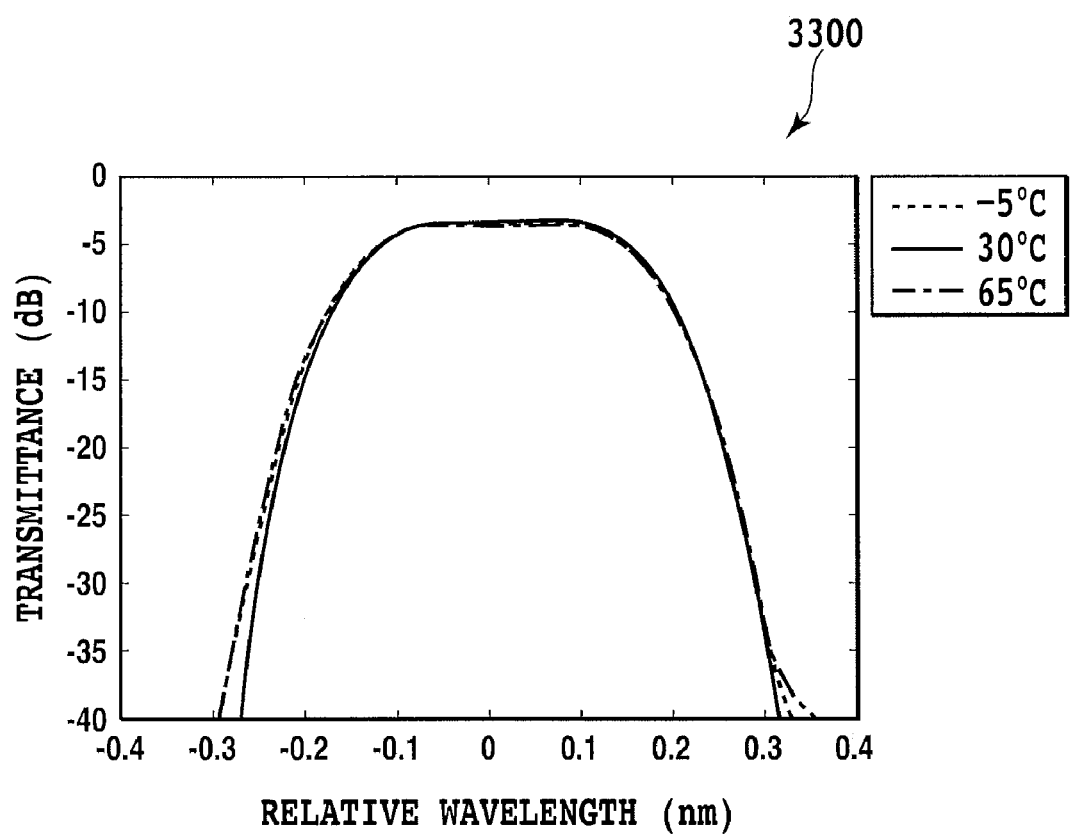
FIG. 33 is a diagram showing a temperature dependence of a transmission spectrum in an optical wavelength multiplexing/de-multiplexing circuit according to a third embodiment of the present invention.

FIG. 32 is a diagram showing a relative temperature dependence of the transmission wavelength in the MZI part, a relative temperature dependence of the center transmission wavelength in the center wavelength channel of the AWG part, and a relative temperature dependence of the center transmission wavelength in the center wavelength channel of the whole MZI-synchronized AWG, in the optical wavelength multiplexing/de-multiplexing circuit 2800 of the present embodiment. Further, FIG. 33 is a diagram showing transmission waveforms of the center wavelength channel at temperatures of −5, 30, 65° C. in the optical wavelength multiplexing/de-multiplexing circuit 2800. From FIGS. 32 and 33, it is apparent that a transmission waveform having a low loss and also a high spectrum flatness is realized and the second order temperature dependence remaining in the AWG part is compensated by the second order temperature dependence having an opposite sign in the MZI part. The temperature dependence of the center transmission wavelength remaining in 0.02 nm across an operating temperature range, T=−5 to 65° C., in the athermal MZI-synchronized AWG of the conventional art can be reduced to a variation amount of 0.002 nm, that is, 0.5% of the wavelength channel spacing.

Fourth Embodiment

Figure 34:
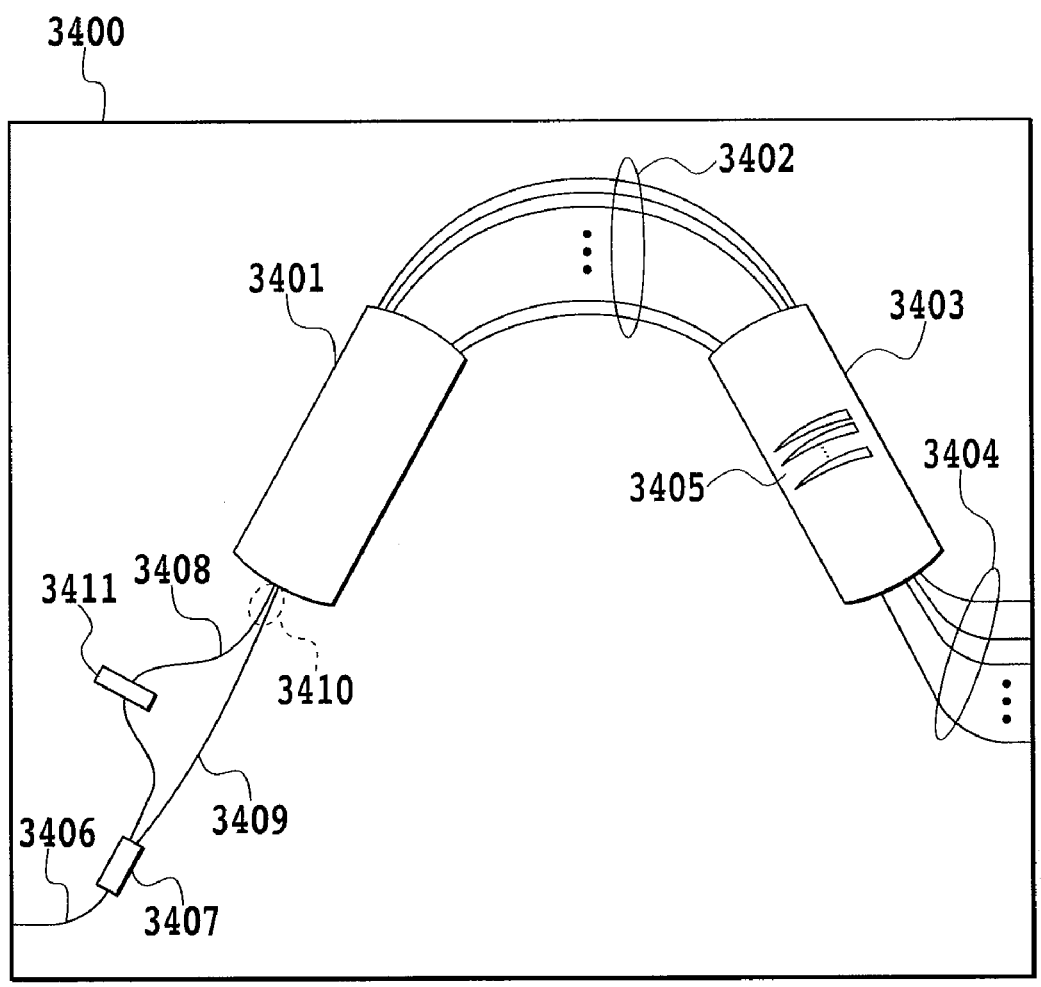
FIG. 34 is a configuration diagram of an optical wavelength multiplexing/de-multiplexing circuit according to a fourth embodiment of the present invention.

An optical wavelength multiplexing/de-multiplexing circuit according to a fourth embodiment of the present invention will be explained. The present embodiment shows an example of having a comparatively wide channel spacing and also a comparatively wide operating temperature range, while having almost the same configuration as that of the optical wavelength multiplexing/de-multiplexing circuit according to the first embodiment. FIG. 34 is a plan view of a configuration of an athermal MZI-synchronized AWG type optical wavelength multiplexing/de-multiplexing circuit 3400 of the present embodiment. The optical wavelength multiplexing/de-multiplexing circuit 3400 is provided with a first slab waveguide 3401, an arrayed waveguide 3402, a second slab waveguide 3403, a second input/output waveguide 3404, a groove 3405 which is formed in the second slab waveguide 3403 and which is filled with the temperature compensation material, a first input/output waveguide 3406, a temperature dependent type phase difference generation coupler 3407, a first arm waveguide 3408, a second arm waveguide 3409, a directional coupler 3410, and a groove 3411 which is divided into four parts and formed in the first arm waveguide 3408 and which is filled with the temperature compensation material. In FIG. 34, the length of the arrayed waveguide 3402 is designed so as to become sequentially longer by a certain amount ΔL. In response to this design, a length in which a light wave passing through a center wavelength channel is divided by the groove 3405 in the second slab waveguide 3403, after having passed through each of the arrayed waveguides, is formed so as to become sequentially longer by an amount ΔL' proportional to ΔL. Further, the length difference between the first arm waveguide 3408 and the second arm waveguide 3409 is designed so as to be ΔI, and a length divided by the groove 3411 in the first arm waveguide is designed so as to be ΔI' proportional to ΔI.

In the optical wavelength multiplexing/de-multiplexing circuit 3400, Δ of the waveguide is 1.5%, a core thickness is 4.5 μm, an effective refractive index temperature coefficient α is $1.0 \times 10^{-5} + 1.9 \times 10^{-8} \times T$, a core width in the arrayed waveguide 302, the second input/output waveguide 3404, the first input/output waveguide 3406, the first arm waveguide 3408, and the second arm waveguide 3409 is 4.5 μm, and a length in the first slab waveguide 3401 and the second slab waveguide 3403 is 8100 μm. The second input/output waveguides 3404 are disposed at a part connected to the second slab waveguide 3403 in the number of the wavelength channels with a spacing of 15 μm, and a linearly tapered waveguide is provided to each terminal thereof having an opening width of 11.0 μm. A core width in the two waveguides of the directional coupler 3410 is 4.0 μm, a waveguide spacing is 6.0 μm, a coupling rate is 50%, and the temperature compensation material is silicone resin (refractive index temperature coefficient $\alpha' = -3.5 \times 10^{-4} + 1.5 \times 10^{-7} \times T$). Further, the optical wavelength multiplexing/de-multiplexing circuit 3400 is designed as follows; the number of the wavelength channels is 40, a wavelength channel spacing is 0.8 nm (100 GHz), and a transmission wavelength of the center wavelength channel (21st wavelength channel) is 1544.53 nm (194.1 THz). At this time, the number of the arrayed waveguides 3402 is 250, ΔL is 31.8 μm, and ΔI is 2020 μm. Here, ΔL' and ΔI' to be provided by the temperature compensation material filled in the grooves 3405 and 3411 become, respectively, $\Delta L' = \Delta L/(1-\alpha'/\alpha) = \Delta L/(1-(\alpha'_1+\alpha'_2 T)/(\alpha_1+\alpha_2 T))$, and $\Delta I' = \Delta I/(1-\alpha'/\alpha) = \Delta I/(1-(\alpha'_1+\alpha'_2 T)/(\alpha_1+\alpha_2 T))$. Here, the operating temperature range of the optical wavelength multiplexing/de-multiplexing circuit 3400 is assumed as T=−40 to 80° C. At this time, the design is done so as to satisfy the above condition at the center temperature T of 20° C., and ΔL' and ΔI' becomes as ΔL'=0.91 μm and ΔI'=57.7 μm. This design compensates the first order temperature dependence of the optical path length difference between the neighboring waveguides in the arrayed waveguides 3402 and the first order temperature dependence of the optical path length difference between the first and second arm waveguides 3408 and 3409.

Figure 35:
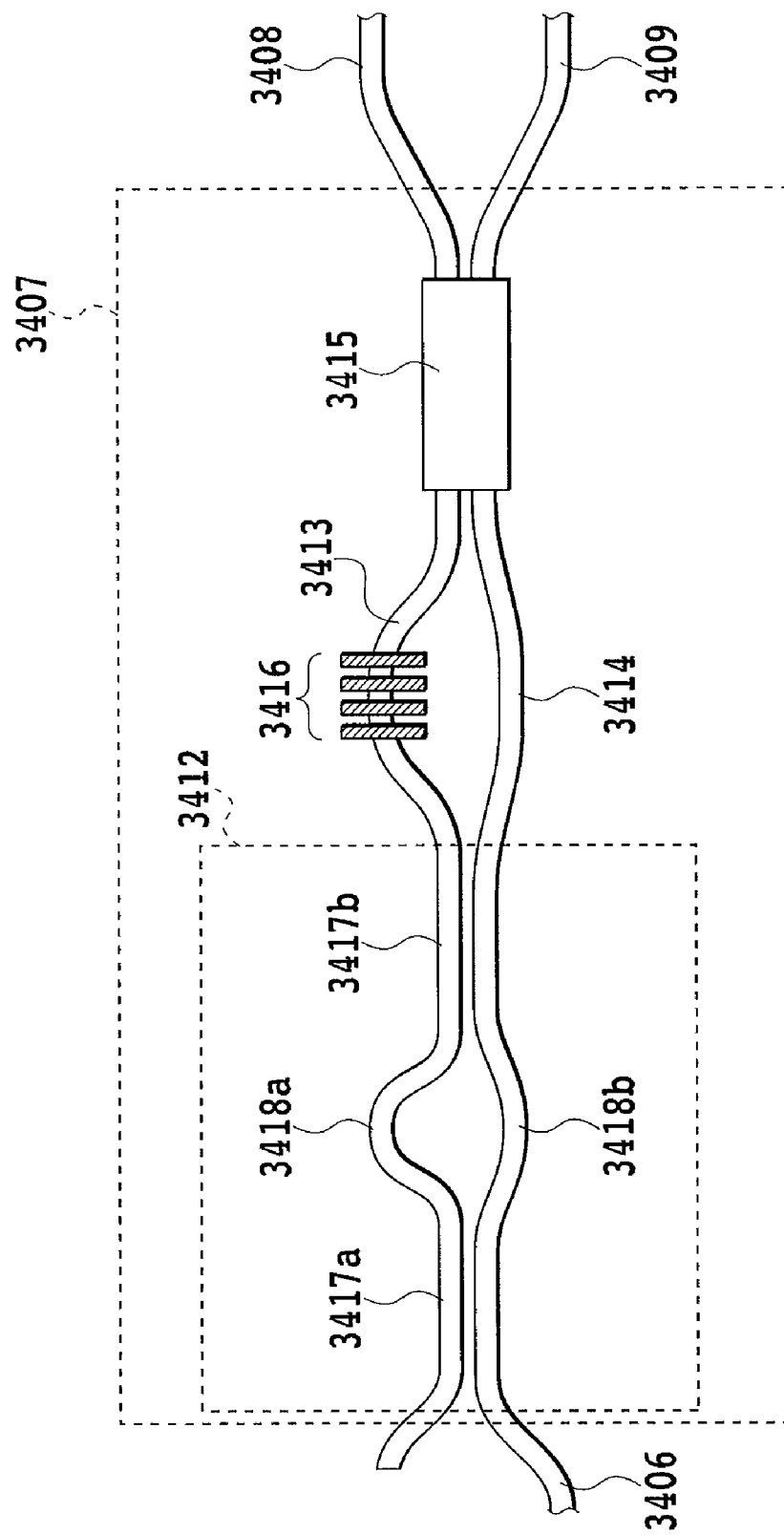
FIG. 35 is a configuration diagram of a temperature dependent type phase difference generation coupler 3407 in an optical wavelength multiplexing/de-multiplexing circuit according to a fourth embodiment of the present invention.

FIG. 35 is a plan view showing a configuration of the temperature dependent type phase difference generation coupler 3407 in the optical wavelength multiplexing/de-multiplexing circuit 3400 of the present embodiment. The temperature dependent type phase difference generation coupler 3407 is provided with a first optical coupler 3412 formed with a WINC, a third arm waveguide 3413, a fourth arm waveguide 3414, a second optical coupler 3415 formed with a WINC, and a groove 3416 which is divided into four parts and formed in the third arm waveguide 3413 and in which silicone resin of the temperature compensation material is inserted, and the first optical coupler 3412 is provided with directional couplers 3417a and 3417b (coupling rate: 85% and 95%) and two arm waveguides 3418a and 3418b (optical path length difference: 0.65 μm). Here, a core width in the third and fourth arm waveguides 3413 and 3414 is set to be 4.5 μm, an optical power branching ratio from the first optical coupler 3412 to the third and fourth arm waveguides 3413 and 3414 is set to be 10:90%, a branching ratio of the second optical coupler 3415 is set to be 50:50%, a length difference between the third arm waveguide 3413 and the fourth arm waveguide 3414 is set to be 1.57 μm, and the sum of widths in the divided grooves 3416 separating the third arm waveguide 3413 is set to be 31.0 μm. By this configuration, the whole temperature dependent type phase difference generation coupler 3407 operates as a coupler having a branching ratio of approximately 50:50%.

Figure 36:
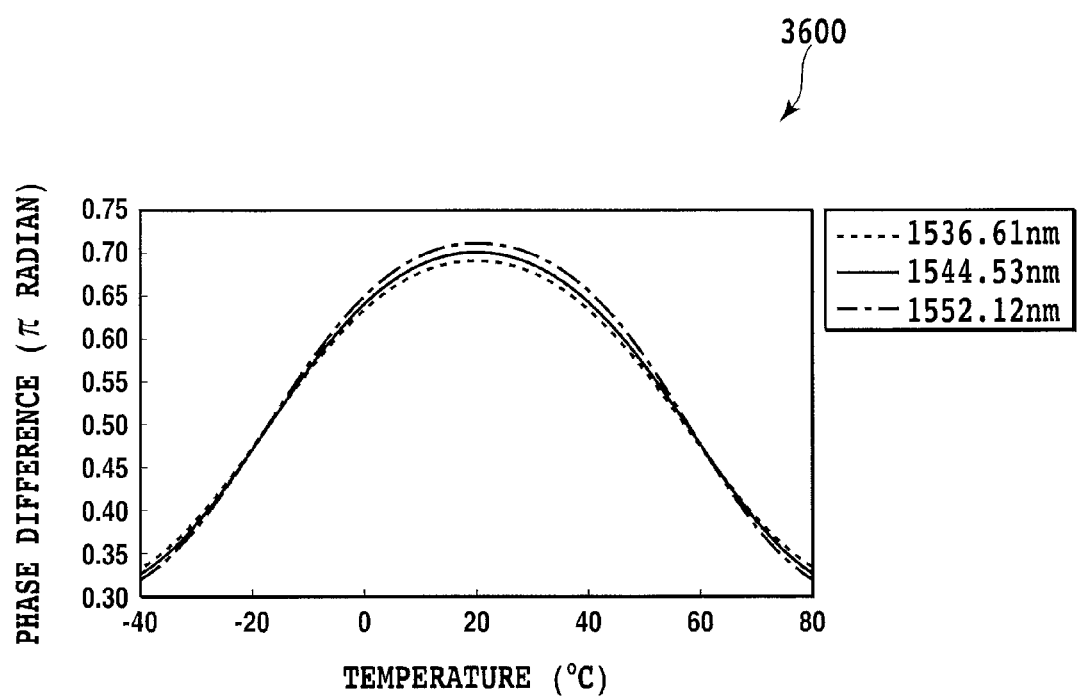
FIG. 36 is a diagram showing a temperature dependence of a phase difference generated by a temperature dependent type phase difference generation coupler 3407 in an optical wavelength multiplexing/de-multiplexing circuit according to a fourth embodiment of the present invention.

FIG. 36 shows a temperature dependence of the phase difference provided between the two outputs of the second optical coupler 3415 across −40 to 80° C., when a light wave having a wavelength of 1528.77 nm (wavelength of the first wavelength channel), 1544.53 nm (wavelength of the center 21st wavelength channel), 1559.79 nm (wavelength of the 40th wavelength channel) is input from the first input/output waveguide 3406 into the temperature dependent type phase difference generation coupler 3407. Here, the phase difference is defined to be a phase difference between the output connected to the first arm waveguide 3408 and the output connected to the second arm waveguide 3409. From FIG. 36, the phase difference changes between 0.33π and 0.7π in a temperature range of −40 to 805° C., and the phase difference depends little on the wavelength in a wavelength range of the wavelength channel to be used.

Figure 37:
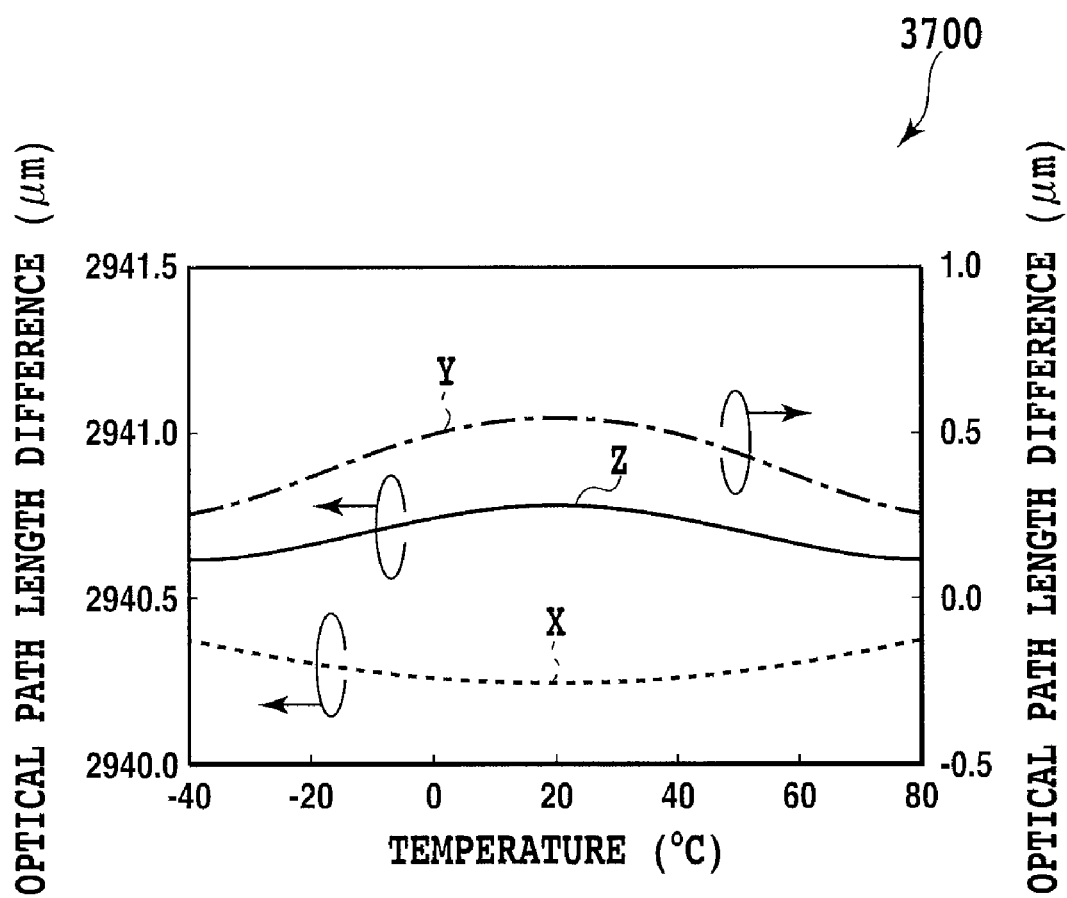
FIG. 37 is a diagram showing a temperature dependence of an optical path length difference in an MZI of an optical wavelength multiplexing/de-multiplexing circuit according to a fourth embodiment of the present invention.

FIG. 37 is a diagram showing a temperature dependence (line Z) of the optical path length difference across −40 to 80° C. in the MZI configured with the temperature dependent type phase difference generation coupler 3407 to the directional coupler 3410 in the optical wavelength multiplexing/de-multiplexing circuit 3400 of the present embodiment. Here, the optical path length difference is defined to be a difference between the optical path length via the first arm waveguide 3408 and the optical path length via the second arm waveguide 3409, and the wavelength of the light wave is set to be 1544.53 nm. For comparison, a temperature dependence (line X) of the optical path length difference between the first and second arm waveguides 3408 and 3409 and a temperature dependence (line Y) of the optical path length difference generated between the two outputs of the temperature dependent type phase difference generation coupler 3407 are shown together at the same wavelength. From FIG. 37, while a second order temperature dependence remains in the line X, the optical path length difference (line Z) of the whole MZI becomes the sum of the optical path length difference of the line X and the optical path length difference (line Y) provided by the temperature dependent type phase difference generation coupler 3407, and thus, in this case, has a second order temperature dependence having a sign opposite to that of the line X.

Figure 38:
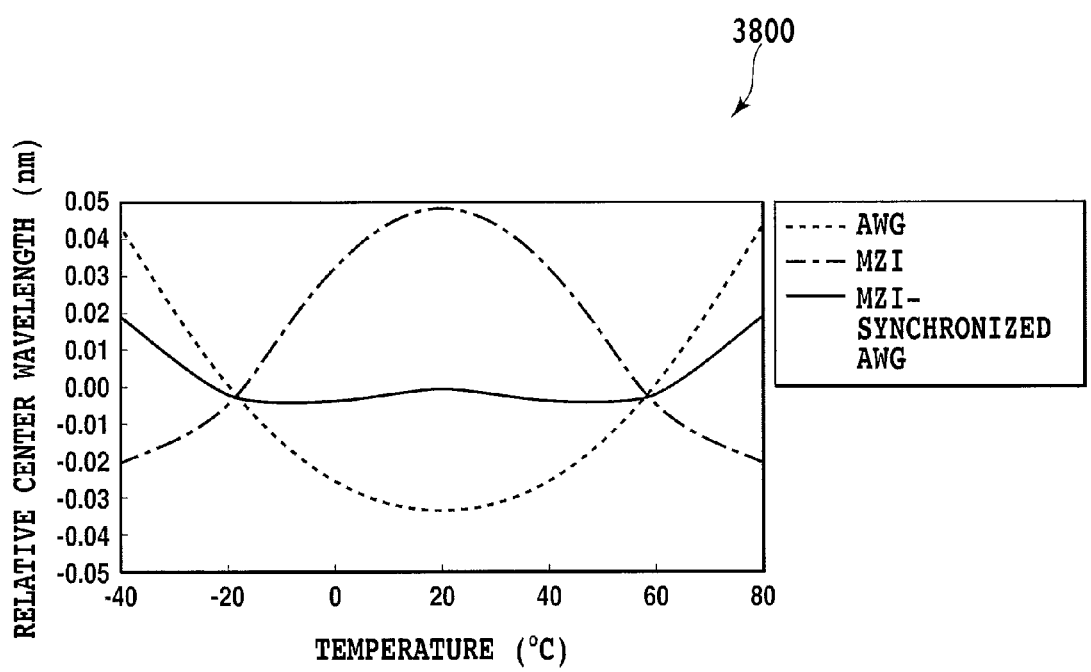
FIG. 38 is a diagram showing a temperature dependence of a center transmission wavelength in an optical wavelength multiplexing/de-multiplexing circuit according to a fourth embodiment of the present invention.
Figure 39:
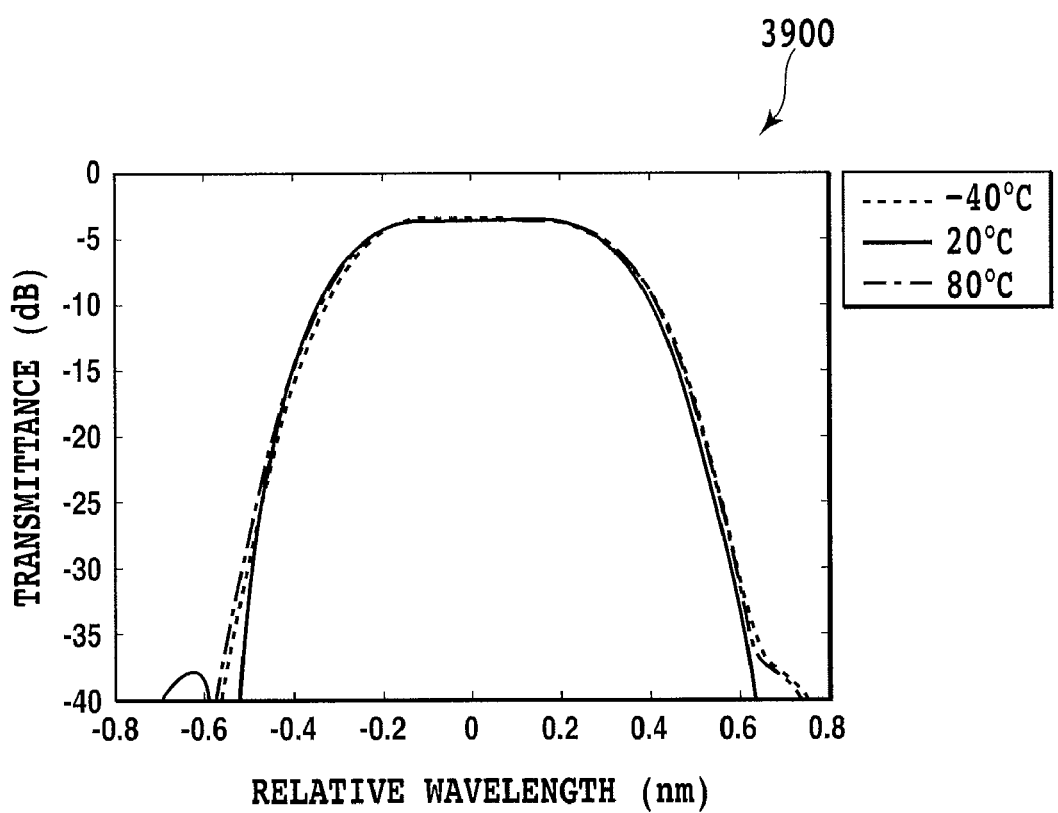
FIG. 39 is a diagram showing a temperature dependence of a transmission spectrum in an optical wavelength multiplexing/de-multiplexing circuit according to a fourth embodiment of the present invention.
Figure 40:
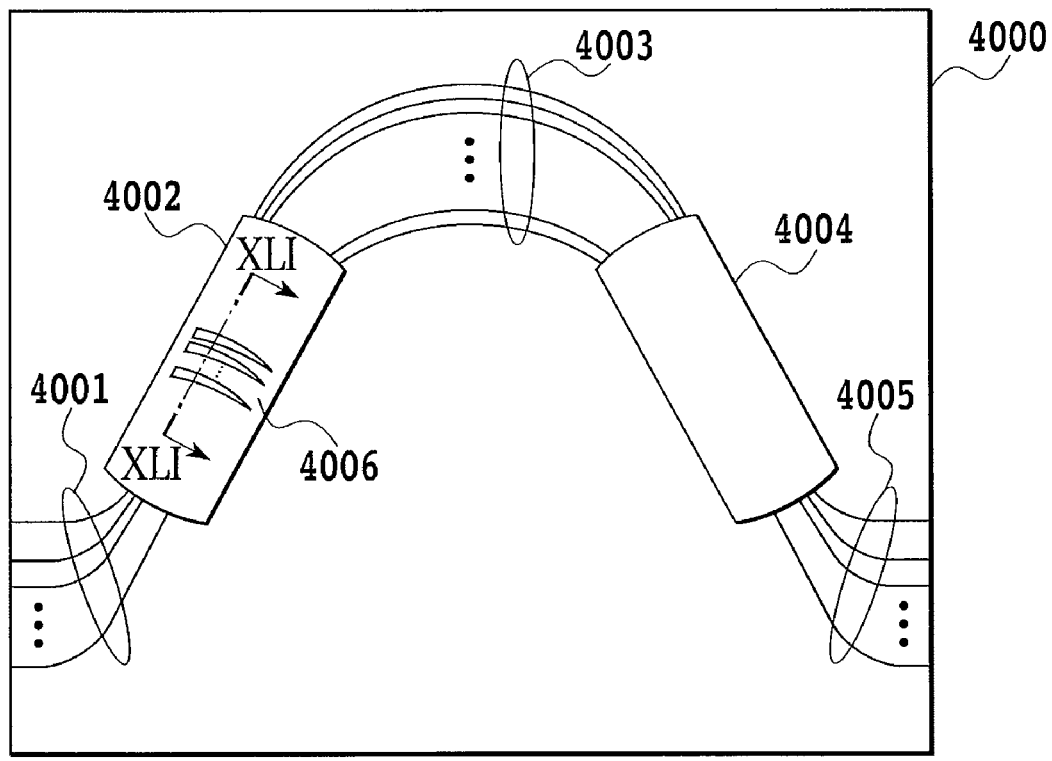
FIG. 40 is a plan view showing a type of athermal AWG in which a groove is formed in a slab waveguide of a conventional art.
Figure 41:
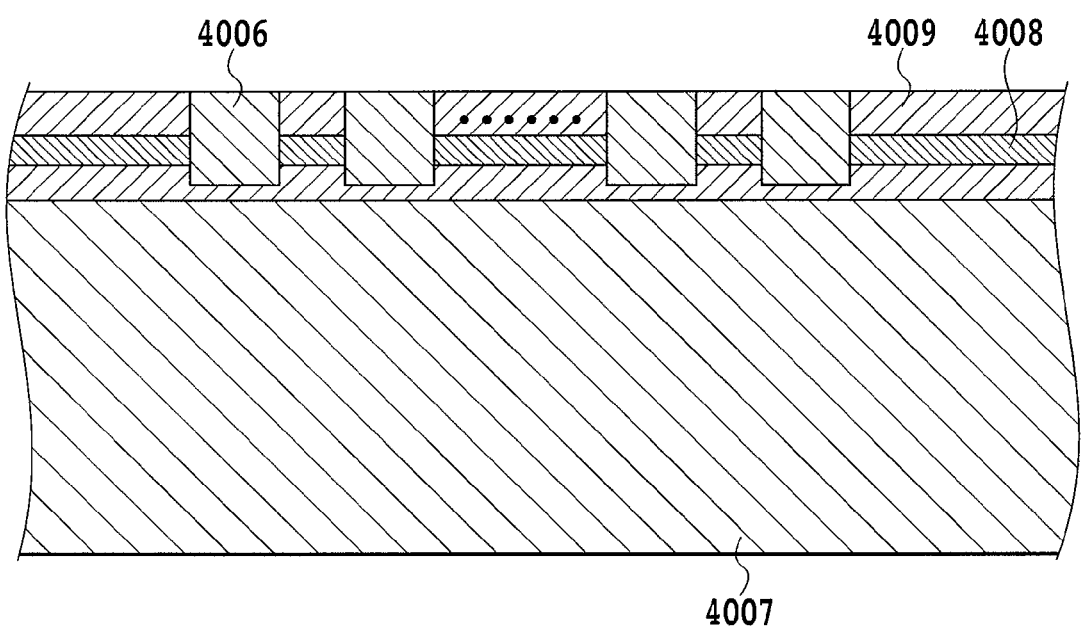
FIG. 41 is a diagram showing a cross-sectional structure of a part along the line XLI-XLI in the athermal AWG of FIG. 40.

FIG. 38 is a diagram showing a relative temperature dependence of the transmission wavelength in the MZI part, a relative temperature dependence of the center transmission wavelength in the center wavelength channel of the AWG part, and a relative temperature dependence of the center transmission wavelength in the center wavelength channel of the whole MZI-synchronized AWG, in the optical wavelength multiplexing/de-multiplexing circuit 3400 of the present embodiment. Further, FIG. 39 is a diagram showing transmission waveforms of the center wavelength channel at temperatures of −40, 20, and 80° C. in the optical wavelength multiplexing/de-multiplexing circuit 3400. From FIGS. 38 and 39, it is apparent that a transmission waveform having a low loss and also a high spectrum flatness is realized and the second order temperature dependence remaining in the AWG part is compensated by the second order temperature dependence having an opposite sign in the MZI part. The temperature dependence of the center transmission wavelength remaining in 0.07 nm across an operating temperature range, T=−40 to 80° C., in the athermal MZI-synchronized AWG of the conventional art can be reduced to a variation amount of 0.02 nm, that is, 3% of the wavelength channel spacing.

Fifth Embodiment

An optical wavelength multiplexing/de-multiplexing circuit according to a fifth embodiment of the present invention will be explained. In the present embodiment, the problem solution means of the present invention is applied to the AWG which is disclosed in Patent document 6 and has a low loss and a flat transmission spectrum, that is, the athermal AWG in which the main temperature dependences is compensated for the transmission wavelength.

Figure 45:
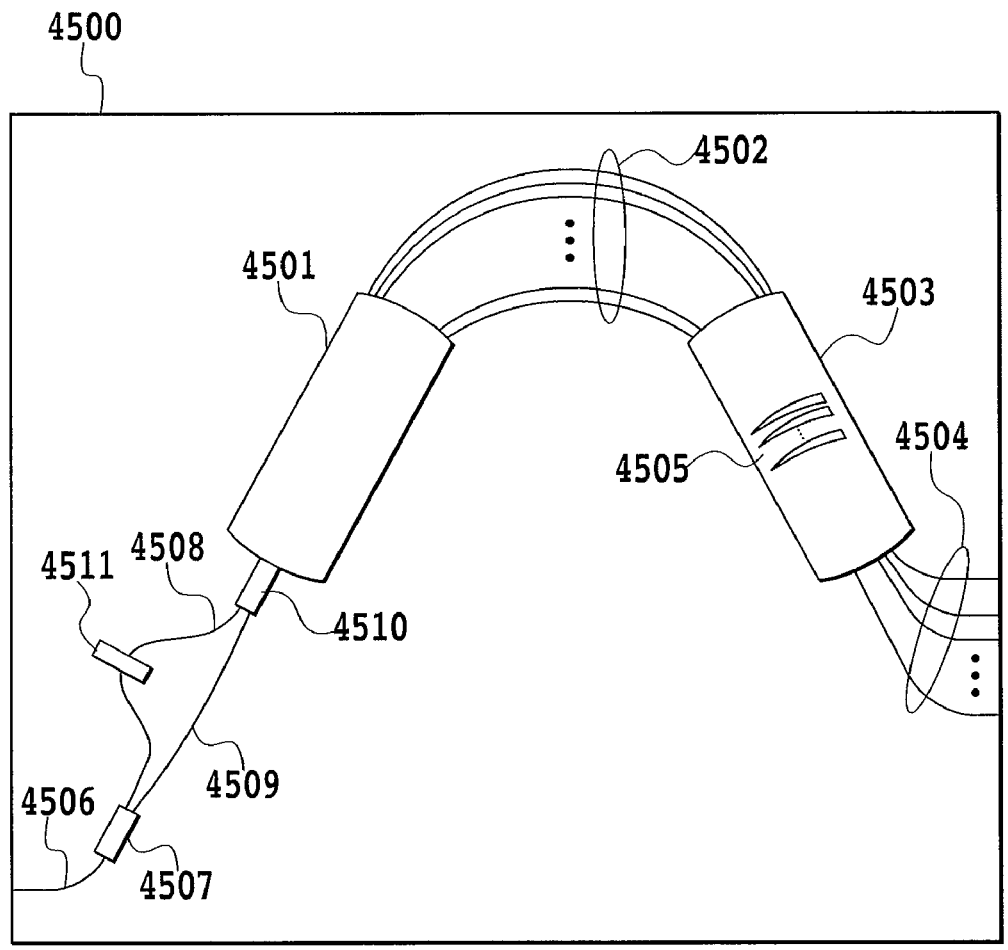
FIG. 45 is a configuration diagram of an optical wavelength multiplexing/de-multiplexing circuit according to a fifth embodiment of the present invention.

FIG. 45 is a plan view showing a configuration of an optical wavelength multiplexing/de-multiplexing circuit 4500 of the present embodiment. The optical wavelength multiplexing/de-multiplexing circuit 4500 is provided with a first slab waveguide 4501, an arrayed waveguide 4502, a second slab waveguide 4503, a second input/output waveguide 4504, a groove 4505 which is formed in the second slab waveguide 4503 and which is filled with the temperature compensation material, a first input/output waveguide 4506, a temperature dependent type phase difference generation coupler 4507, a first arm waveguide 4508, a second arm waveguide 4509, an optical mode mixing coupler 4510, and a groove 4511 which is formed in the first arm waveguide 4508 and which is filled with the temperature compensation material. In FIG. 45, the length of the i-th arrayed waveguide Li is expressed as $L_i = L_1 + (i-1) \cdot \Delta L$, and designed so as to become sequentially longer by a certain amount $\Delta L$. In correspondence with this design, a length Li' in which a light wave passing through a center wavelength channel is divided by the groove 4505 in the second slab waveguide 4503, after having passed through each of the arrayed waveguides, is expressed as $L_i' = L_1' + (i-1) \cdot \Delta L'$, and formed so as to become sequentially longer by an amount $\Delta L'$ proportional to $\Delta L$. Further, the length difference between the first arm waveguide 4508 and the second arm waveguide 4509 is designed so as to be $\Delta I$, and a length divided by the groove 4511 in the first arm waveguide is designed so as to be $\Delta I'$ proportional to $\Delta I$.

In the optical wavelength multiplexing/de-multiplexing circuit 4500, $\Delta$ of the waveguide is 1.5%, a core thickness is 4.5 μm, an effective refractive index temperature coefficient α is $1.0 \times 10^{-8} + 1.9 \times 10^{-8} \times T$, a core width in the arrayed waveguide 4502, the second input/output waveguide 4504, the first input/output waveguide 4506, the first arm waveguide 4508, and the second arm waveguide 4509 is 4.5 μm, and a length in the first slab waveguide 4501 and the second slab waveguide 4503 is 8200 μm. The second input/output waveguides 4504 are disposed at a part connected to the second slab waveguide 4503 in the number of the wavelength channels with a spacing of 15 μm, and a linearly tapered waveguide is provided to each terminal thereof having an opening width of 11.0 μm. The temperature compensation material is silicone resin (refractive index temperature coefficient $\alpha' = -3.5 \times 10^{-4} + 1.5 \times 10^{-7} \times T$). Further, the optical wavelength multiplexing/de-multiplexing circuit 4500 is designed as follows; the number of the wavelength channels is 40, a wavelength channel spacing is 0.4 nm (50 GHz), and a transmission wavelength of the center wavelength channel (21st wavelength channel) is 1544.53 nm (194.1 THz). At this time, the number of the arrayed waveguides 4502 is 250, $\Delta L$ is 62.6 μm, and $\Delta I$ is 4040 μm. Here, $\Delta L'$ and $\Delta I'$ to be provided by the temperature compensation material filled in the grooves 4505 and 4511 become, respectively, $\Delta L' = \Delta L/(1-\alpha'/\alpha) = \Delta L/(1-(\alpha'_1+\alpha'_2 T)/(\alpha_1+\alpha_2 T))$, and $\Delta I' = \Delta I/(1-\alpha'/\alpha) = I/(1-(\alpha'_1+\alpha'_2 T)/(\alpha_1+\alpha_2 T))$. Here, the operating temperature range of the optical wavelength multiplexing/de-multiplexing circuit 4500 is set to be T=−5 to 65° C. At this time, the design is done so as to satisfy the above condition at the center temperature T of 30° C., and $\Delta L'$ and $\Delta I'$ become $\Delta L' = 1.79$ μm and $\Delta I' = 115.4$ μm. This design compensates the first order temperature dependence of the optical path length difference between the neighboring waveguides in the arrayed waveguides 4502 and the first order temperature dependence of the optical path length difference between the first and second arm waveguides 4508 and 4509.

Figure 46:
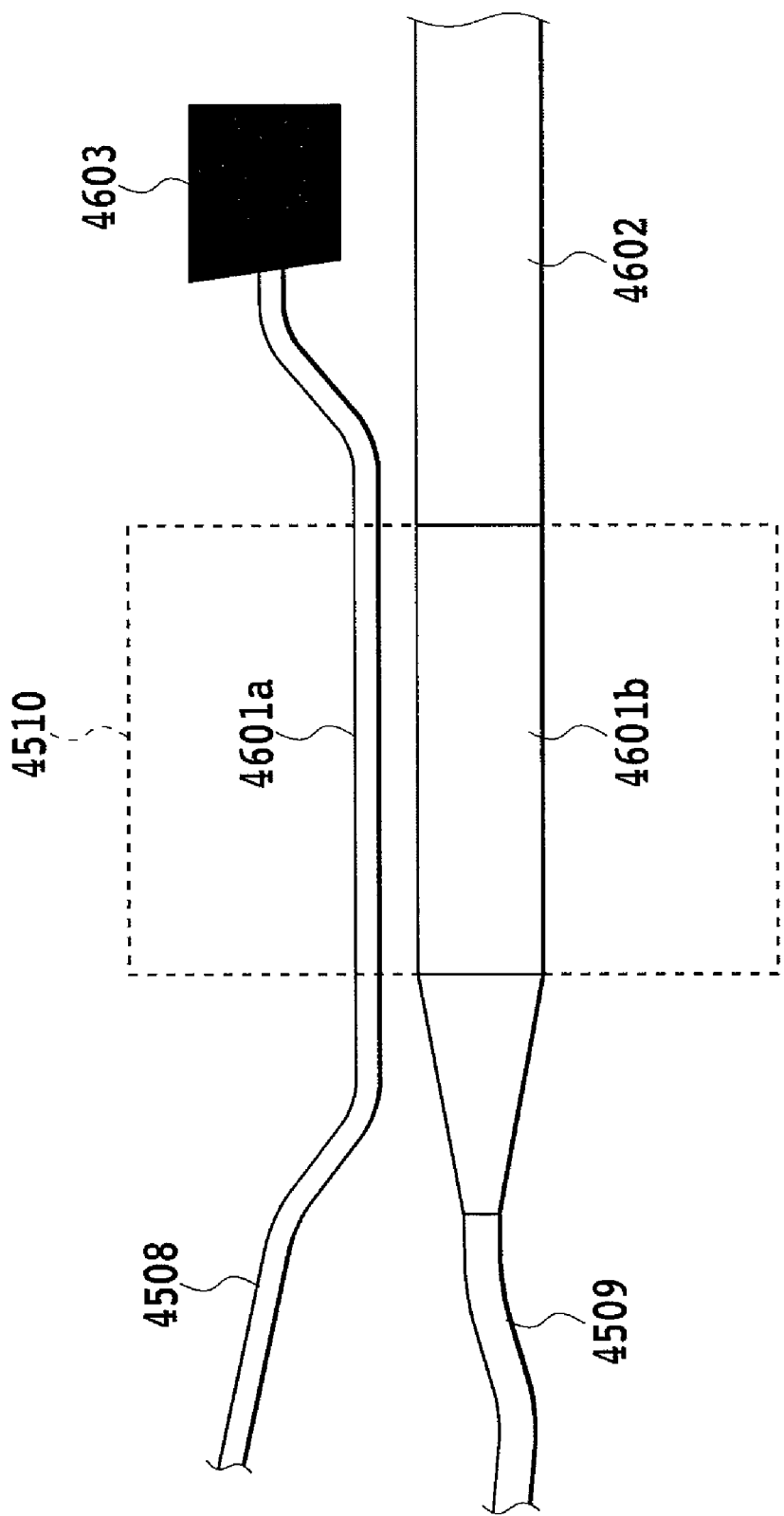
FIG. 46 is a diagram showing a configuration example of an optical mode mixing coupler 4510 in an optical wavelength multiplexing/de-multiplexing circuit according to a fifth embodiment of the present invention.

FIG. 46 shows an example of a configuration realizing the optical mode mixing coupler 4510. In the present embodiment, the optical mode mixing coupler is a coupler which couples base mode light input from one input waveguide to a base mode of an output waveguide and couples base mode light input from the other input waveguide to the first mode of the output waveguide after conversion. Here, the optical mode mixing coupler 4510 is a directional coupler having asymmetric waveguide widths, and a width of a waveguide 4601a connected to the first arm waveguide 4508 is set to be 2.5 μm, a width of a waveguide 4601b connected to the second arm waveguide 4509 is set to be 8 μm, and a length in the waveguides 4601a and 4601b is set to be 500 μm. Further, the waveguide width is converted smoothly with a linear taper from the second arm waveguide 4509 to the waveguide 4601b. At this time, the effective refractive index of the base mode in the waveguide 4601a is approximately equal to the effective refractive index of the first order mode in the waveguide 4601b, and the base mode light input from the first arm waveguide 4508 to the waveguide 4601a is coupled to the first order mode in the waveguide 4601b. Further, the base mode light input from the second arm waveguide 4509 propagates in the waveguide 4601b in the base mode without being changed, and thus the base mode and the first order mode are mixed and propagate to a multi-mode waveguide 4602 which is the output waveguide, to be input into the first slab waveguide 4501. It is to be noted that the multi-mode waveguide 4602 is not always necessary, and the waveguide 4601b may be directly connected to the first slab waveguide 4501. Further, for preventing the light wave which could not be mixed perfectly in the optical mode mixing coupler 4510, from degrading the characteristic of the optical wavelength multiplexing/de-multiplexing circuit as leaked light, it is preferable to terminate the waveguide connected to the waveguide 4601a with a groove 4603 in which light shield material is filled, or the like. At this time, it is preferable that the end surface of the groove is not perpendicular to the waveguide but slanted in approximately 8 degrees, to further suppress the reflection of the light wave.

A mixed field of the base mode light and the first order mode light to be input into the first slab waveguide 4501 oscillates periodically when the phase difference between the modes changes periodically according to the light wavelength. The oscillation period wavelength is 0.4 nm in the present embodiment. Here, by the change of the mixed field, the input position of the light wave to the first slab waveguide 4501 changes and the optical path length to each of the arrayed waveguides changes. Then, the optical path length difference of the whole optical wavelength multiplexing/de-multiplexing circuit changes and the position of the light collected at the terminal of the second slab waveguide 4503 changes. Here, the period wavelength of the light wave input position change is 0.4 nm and this value is the same as the wavelength channel spacing in the AWG. That is, in a certain wavelength region, the position change of the light entering the first slab waveguide 4501 in the AWG and the position change of the light collected in the terminal of the second slab waveguide 4503 in the single AWG are almost synchronized with each other. Therefore, for the whole optical wavelength multiplexing/de-multiplexing circuit, the position of the light collected at the terminal of the second slab waveguide 4503 changes little in the wavelength region, and accordingly it is possible to obtain a flat transmission spectrum characteristic.

Figure 47:
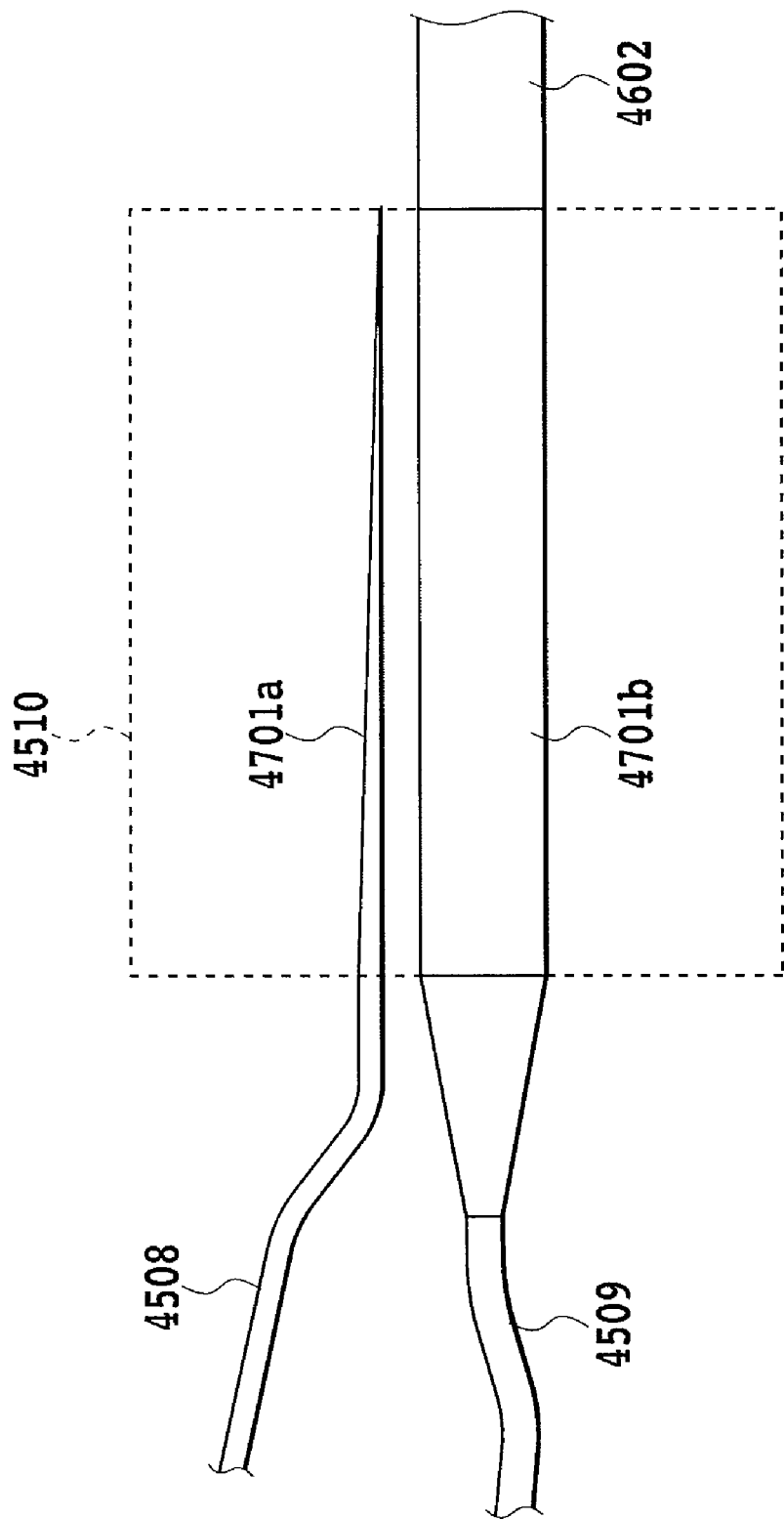
FIG. 47 is a diagram showing another configuration example of an optical mode mixing coupler 4510 in an optical wavelength multiplexing/de-multiplexing circuit according to a fifth embodiment of the present invention.
Figure 48:
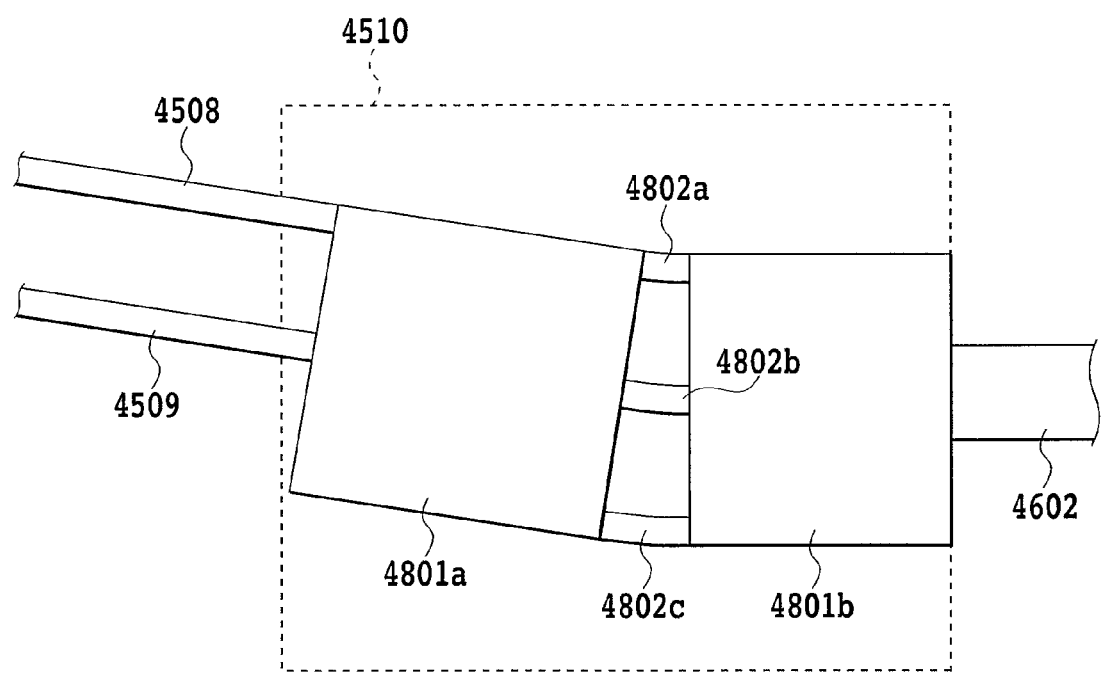
FIG. 48 is a diagram showing still another configuration example of an optical mode mixing coupler 4510 in an optical wavelength multiplexing/de-multiplexing circuit according to a fifth embodiment of the present invention.

FIG. 47 shows another configuration example realizing the optical mode mixing coupler 4510. The configuration of FIG. 47 is a configuration of an asymmetric directional coupler as in FIG. 46 and has a structure in which the width of a waveguide 4701a is reduced gradually and becomes zero to be terminated. At this time, the length in the waveguides 4701a and 4601b is designed to be 1500 µm. The configuration of FIG. 47 can realize an almost 100% coupling rate for the light wave from the waveguide 4701a to the waveguide 4701b compared to the configuration of FIG. 46 and thus, has an advantage in the aspect of a loss characteristic. Further, FIG. 48 shows still another configuration example realizing the optical mode mixing coupler 4510. In the configuration of FIG. 48, the optical mode mixing coupler 4510 is configured with two multi-mode couplers (MMI). Details of this configuration are described in Non-patent document 5. Here, the optical mode mixing coupler 4510 shown in FIG. 48 is provided with a first MMI 4801a, a second MMI 4801b, and intermediate waveguides 4802a, 4802b, and 4802c. The first MMI 4801a has a width of 20 µm, and a length of 754 µm, the second MMI 4801b has a width of 20 µm and a length of 377 µm, the intermediate waveguide 4802a has a width of 4.5 µm and a length of 50 µm, the intermediate waveguide 4802b has a width of 4.5 µm and a length of 51.5 µm, and the intermediate waveguide 4802c has a width of 4.5 µm and a length of 53 µm. Generally, the MMI has a small change of a branching characteristic against a change in the waveguide width compared to the directional coupler. Accordingly, the configuration of FIG. 48 can realize an optical wavelength multiplexing/de-multiplexing circuit having a better fabrication tolerance than the configuration of FIG. 46.

Figure 49:
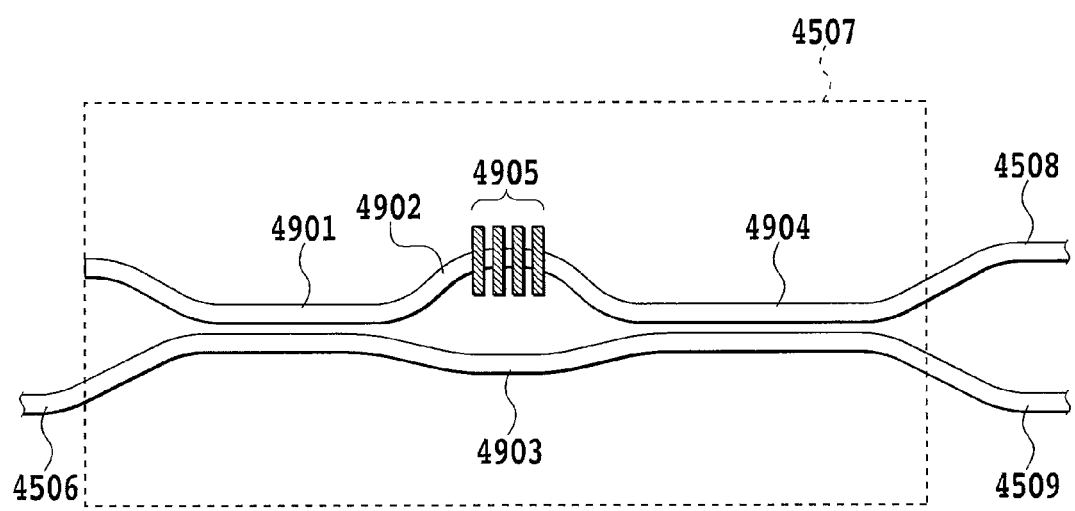
FIG. 49 is a diagram showing a configuration example of a temperature dependent type phase difference generation coupler 4507 in an optical wavelength multiplexing/de-multiplexing circuit according to a fifth embodiment of the present invention.

FIG. 49 is a plan view showing a configuration of the temperature dependent type phase difference generation coupler 4507 in the optical wavelength multiplexing/de-multiplexing circuit 4500 of the present embodiment. Here, the temperature dependent type phase difference generation coupler 4507 is provided with a first optical coupler 4901 formed with a directional coupler, a third arm waveguide 4902, a fourth arm waveguide 4903, a second optical coupler 4904 formed with a directional coupler, and a groove 4905 which is divided into four parts and formed in the third arm waveguide 4902 and in which silicone resin of the temperature compensation material is inserted. Here, a core width in the third and fourth arm waveguides 4902 and 4903 is set to be 4.5 µm, an optical power branching ratio from the first optical coupler 4901 to the third and fourth arm waveguides 4902 and 4903 is set to be 6:94%, a branching ratio of the second optical coupler 4905 is set to be 15:85%, a length difference between the third arm waveguide 4902 and the fourth arm waveguide 4903 is set to be 2.5 µm, and a width of the groove 4905 dividing the third arm waveguide 4902 is set to be 52.5 µm. By this configuration, the whole temperature dependent type phase difference generation coupler 4507 operates as a coupler having a branching ratio of approximately 15:85.

Figure 50:
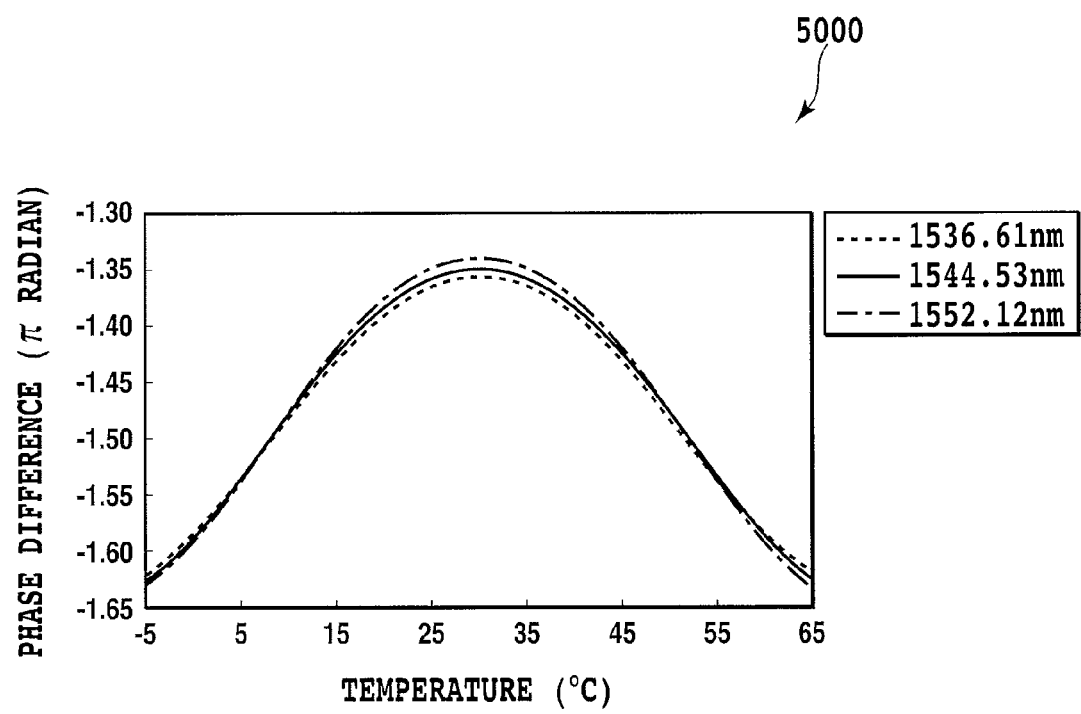
FIG. 50 is a diagram showing a temperature dependence of a phase difference generated by a temperature dependent type phase difference generation coupler 4507 in an optical wavelength multiplexing/de-multiplexing circuit according to a fifth embodiment of the present invention.

FIG. 50 shows a temperature dependence of the phase difference provided between the two outputs of the second optical coupler 4504 across −5 to 65° C., when a light wave having a wavelength of 1536.61 nm (wavelength of the first wavelength channel), 1544.53 nm (wavelength of the center 21st wavelength channel), 1552.12 nm (wavelength of the 40th wavelength channel) is input from the first input/output waveguide 4506 into the temperature dependent type phase difference generation coupler 4507. Here, the phase difference is defined to be a phase difference between the output connected to the first arm waveguide 4508 and the output connected to the second arm waveguide 4509. From the drawing, the phase difference changes between $-1.62\pi$ and $-1.35\pi$ in a temperature range of −5 to 65° C., and the phase difference depends little on the wavelength in a wavelength range of the wavelength channel to be used.

Figure 51:
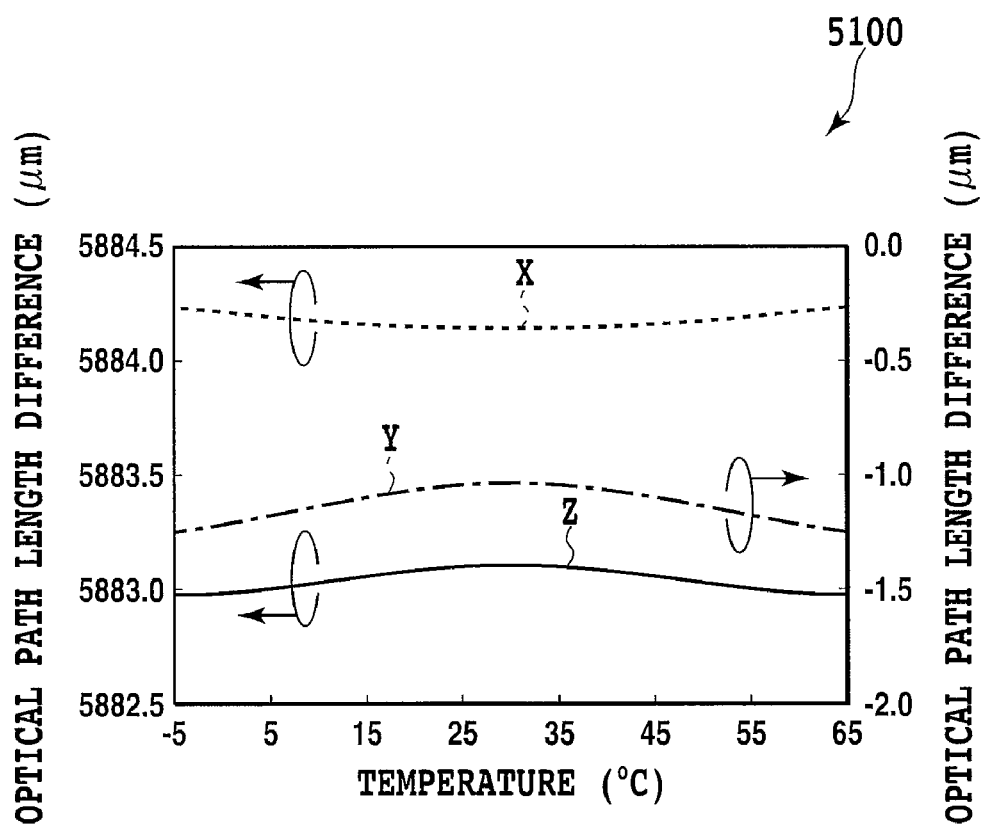
FIG. 51 is a diagram showing a temperature dependence of an optical path length difference generated in a path from a temperature dependent type phase difference generation coupler 4507 to an input of an optical mode mixing coupler 4510 in an optical wavelength multiplexing/de-multiplexing circuit according to a fifth embodiment of the present invention.

FIG. 51 is a diagram showing a temperature dependence (line Z) of the optical path length difference generated in a path from the temperature dependent type phase difference generation coupler 4507 to the input of the optical mode mixing coupler 4510 across −5 to 65° C. in the optical wavelength multiplexing/de-multiplexing circuit 4500 of the present embodiment. Here, the optical path length difference is defined to be a difference between the optical path length via the first arm waveguide 4508 and the optical path length via the second arm waveguide 4509, and the wavelength of the light wave is set to be 1544.53 nm. For comparison, a temperature dependence (line X) of the optical path length difference between the first and second arm waveguides 4508 and 4509 and a temperature dependence (line Y) of the optical path length difference generated between the two outputs of the temperature dependent type phase difference generation coupler 4507 are shown together at the same wavelength. From the drawing, while a second order temperature dependence remains in the line X, the optical path length difference (line Z) of the whole MZI becomes the sum of the optical path length difference of the line X and the optical path length difference (line Y) provided by the temperature dependent type phase difference generation coupler 4444507, and thus, in this case, comes to have a second order temperature dependence having a sign opposite to that of the line X.

Figure 52:
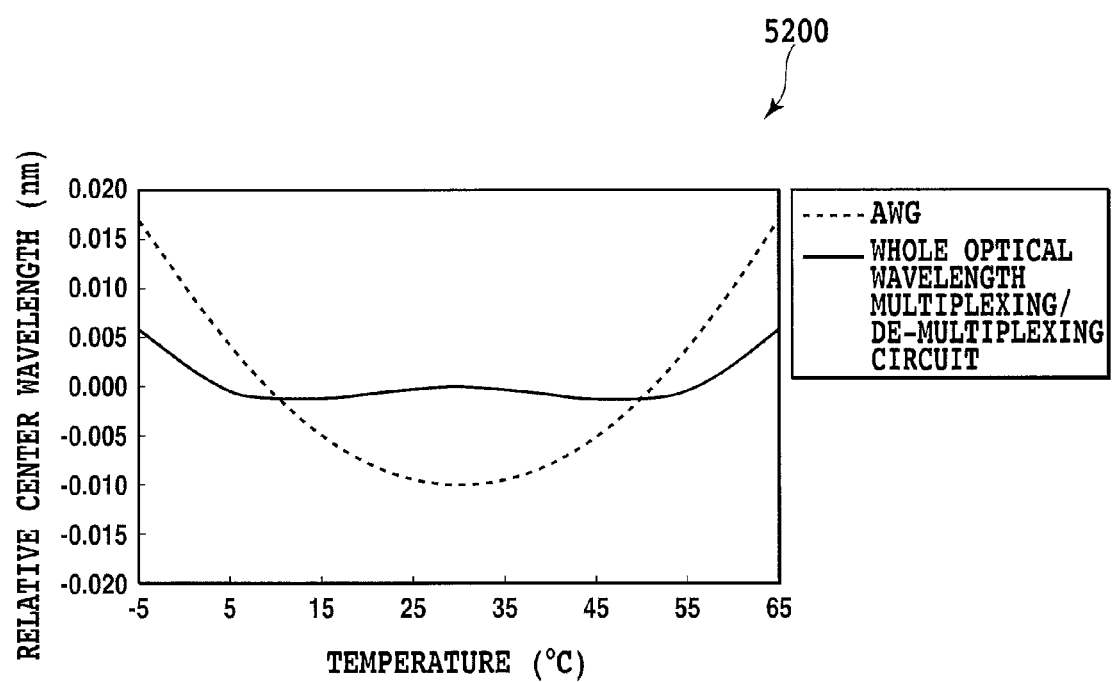
FIG. 52 is a diagram showing a temperature dependence of a center transmission wavelength in an optical wavelength multiplexing/de-multiplexing circuit according to a fifth embodiment of the present invention.
Figure 53:
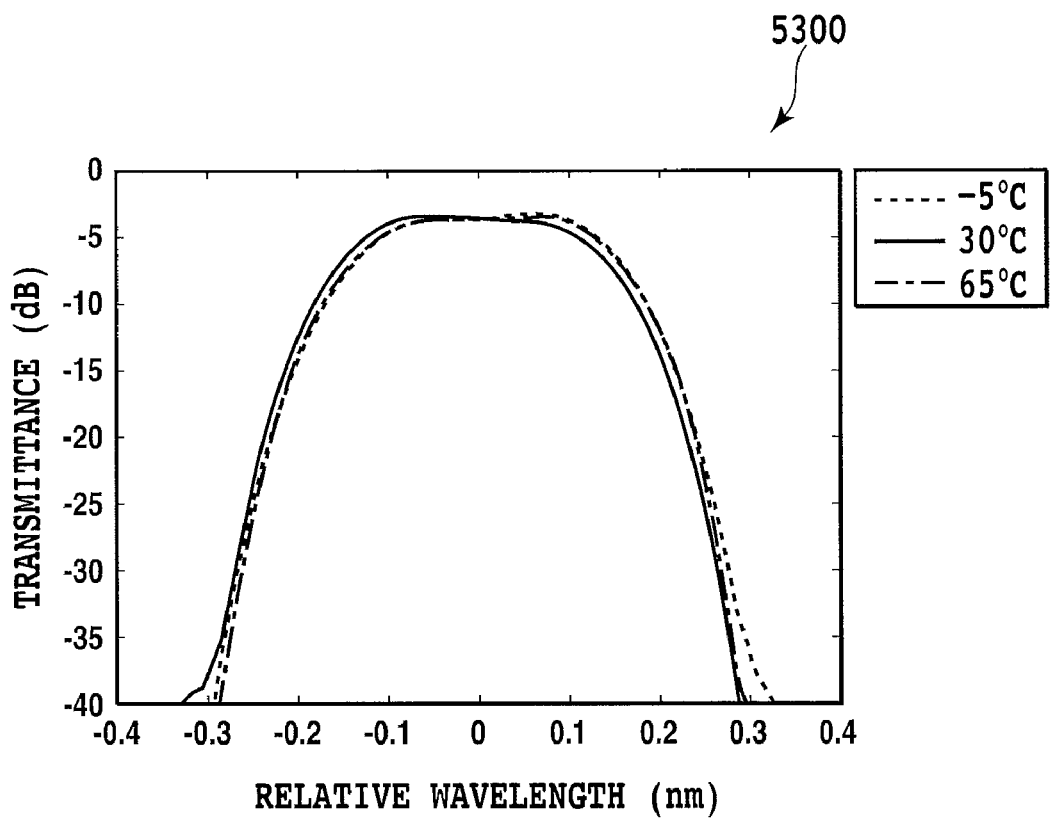
FIG. 53 is a diagram showing a temperature dependence of a transmission spectrum in an optical wavelength multiplexing/de-multiplexing circuit according to a fifth embodiment of the present invention.

FIG. 52 is a diagram showing a relative temperature dependence of the center transmission wavelength in the center wavelength channel of the AWG part and a relative temperature dependence of the center transmission wavelength in the center wavelength channel of the whole optical wavelength multiplexing/de-multiplexing circuit in the optical wavelength multiplexing/de-multiplexing circuit 4500 of the present embodiment. Further, FIG. 53 is a diagram showing transmission waveforms of the center wavelength channel at temperatures of −5, 30, and 65° C. in the optical wavelength multiplexing/de-multiplexing circuit 4500. From FIGS. 52 and 53, it is apparent that a transmission waveform having a low loss and also a high spectrum flatness is realized and the second order temperature dependence remaining in the AWG part is compensated by the second order temperature dependence having an opposite sign in the optical path length difference generated in the path from the temperature dependent type phase difference generation coupler 4507 to the input of the optical mode mixing coupler 4510. The temperature dependence of center transmission wavelength remaining in 0.03 nm across an operating temperature range, T=−5 to 65° C., in the athermal MZI-synchronized AWG of the conventional art can be reduced to have a variation amount of 0.007 nm, that is, 2% of the wavelength channel spacing.

As explained above, by the optical wavelength multiplexing/de-multiplexing circuits according to the five embodiments of the present invention, the second order temperature dependence of the center transmission wavelength remaining in the athermal AWG and MZI-synchronized athermal AWG of the conventional art can be compensated and it is possible to obtain an optical wavelength multiplexing/de-multiplexing circuit having an excellent center transmission wavelength accuracy compared to the conventional one.

Meanwhile, while all the above embodiments are explained to limit the relative refractive index difference of the waveguide, the core width, and the core thickness to specific values, the scope of the present invention is not limited by these values.

In addition, while all the above embodiments are explained to limit the design parameter of the MZI-synchronized AWG to a specific value, the scope of the present invention is not limited by this parameter.

Furthermore, while all the above embodiments are explained to limit the operating temperature range to a specific value, the scope of the present invention is not limited by this value.

Moreover, while in all the above embodiments, the configuration in which the groove is formed in the arm waveguide or the vicinity thereof and the temperature compensation material is inserted therein is applied as a mechanism providing the temperature dependence to the optical path length difference in the temperature dependent phase difference generation coupler, the scope of the present invention is not limited by this configuration and any configuration providing a certain temperature dependence to the optical path length difference can be applied. For example, it is possible to apply a configuration such as one in which a part of the arm waveguide is replaced by a waveguide formed with a medium different from that of the waveguide configuring the arm waveguide.

Further, while all the above embodiments are explained to limit the number of the divided grooves to a specific value, the scope of the present invention is not limited by this number.

Further, although all the above embodiments use the silicone resin as the temperature compensation material, the scope of the present invention is not limited by this material and any material having a refractive index temperature coefficient different from the effective refractive index temperature coefficient of the waveguide, such as optical resin of silicone resin, epoxy resin, fluorine resin, or the like.

Further, while, in the first, fourth, and fifth embodiments, the groove is formed in the second slab waveguide and the temperature compensation material is inserted therein in the configuration compensating the first order temperature dependence, the scope of the present invention is not limited by this position and the first order temperature dependence can be compensated even when the groove is disposed at any position on the optical path from the first slab waveguide to the second slab waveguide via the arrayed waveguide, or is disposed dispersedly at a plurality of different positions.

The invention claimed is:

1. An optical wavelength multiplexing/de-multiplexing circuit which is configured with an arrayed waveguide grating and a Mach-Zehnder interferometer circuit,
said arrayed waveguide grating comprising:
an arrayed waveguide including a waveguide having a length sequentially increased by a certain optical path length difference;
first and second slab waveguides connected to both end parts of said arrayed waveguide, respectively; and
temperature compensation means for compensating a main temperature dependence at a transmission wavelength, and
said Mach-Zehnder interferometer circuit comprising:
first and second arm waveguides having a certain optical path length difference therebetween;
a latter stage optical coupler connected between one end in each of said first and second arm waveguides and an end part of said first slab waveguide;
a former stage optical coupler connected to the other end in each of said first and second arm waveguides; and
temperature compensation means for compensating a main temperature dependence at a transmission wavelength,
wherein
said former stage optical coupler is a phase difference generation coupler configured with:
a first optical coupler causing light to branch in a specific intensity ratio;
a third arm waveguide and a fourth arm waveguide further connected to said first optical coupler and having a certain optical path length difference therebetween; and
a second coupler further connected to each of said third and fourth arm waveguides,
the former stage optical coupler including a mechanism which changes the optical path length difference between said third arm waveguide and said fourth arm waveguide by temperature and is configured so as to cause a temperature dependence of the transmission wavelength in said Mach-Zehnder interferometer circuit, the temperature dependence being modulated by a temperature-induced change of a phase difference between two outputs of said phase difference generation coupler, to compensate a remaining temperature dependence of the transmission wavelength in said arrayed waveguide grating.

2. The optical wavelength multiplexing/de-multiplexing circuit according to claim 1, wherein
said mechanism is a groove which is formed so as to divide at least one of said third and fourth arm waveguides and in which material having a refractive index temperature coefficient different from a temperature coefficient of an effective refractive index of said third and fourth arm waveguides is inserted.

3. The optical wavelength multiplexing/de-multiplexing circuit according to claim 2, wherein
said groove is configured with plural grooves.

4. The optical wavelength multiplexing/de-multiplexing circuit according to claim 2, wherein
said mechanism is a groove formed by removal of a clad on a side surface, an upper surface, or both the surfaces of a waveguide core at a part of at least one of said third and fourth arm waveguides.

5. The optical wavelength multiplexing/de-multiplexing circuit according to claim 2, wherein
a light intensity branching ratio to said third arm waveguide is smaller than 50% in said first optical coupler, and also the groove formed in at least one of said third and fourth arm waveguides is formed only in said third arm waveguide.

6. The optical wavelength multiplexing/de-multiplexing circuit according to claim 2, wherein
said second optical coupler is a directional coupler.

7. The optical wavelength multiplexing/de-multiplexing circuit according to claim 2, wherein
said second optical coupler is a multimode coupler.

8. The optical wavelength multiplexing/de-multiplexing circuit according to claim 2, wherein
said first optical coupler is a directional coupler.

9. The optical wavelength multiplexing/de-multiplexing circuit according to claim 2, wherein
said first optical coupler is a wavelength independent coupler (WINC) configured with two arm waveguides and optical couplers connected to both ends thereof.

10. The optical wavelength multiplexing/de-multiplexing circuit according to claim 2, wherein
said arrayed waveguide grating and Mach-Zehnder interferometer circuit are made of silica-based glass, and the material to be inserted in said groove is optical resin such as silicone resin, epoxy resin, or fluorine resin.

11. The optical wavelength multiplexing/de-multiplexing circuit according to claim 10, wherein
the temperature compensation means in said arrayed waveguide grating is means formed by a method of forming a groove which divides the waveguide so as to intersect with a light wave propagation direction in at least one of said arrayed waveguide and said first and second slab waveguides and inserting material which has a refractive index temperature coefficient different from a temperature coefficient of an effective refractive index of said waveguides in said groove, and
the temperature compensation means in said Mach-Zehnder interferometer circuit is means formed by a method of forming a groove which divides at least one of said first and second arm waveguides and inserting material which has a refractive index temperature coefficient different from a temperature coefficient of an effective refractive index of said first and second arm waveguides.

12. The optical wavelength multiplexing/de-multiplexing circuit according to claim 11, wherein
the material to be inserted in the groove formed in at least one of said arrayed waveguide and said first and second slab waveguides, the material to be inserted in the groove formed in at least one of said first and second arm waveguides, and the material to be inserted in the groove formed in at least one of said third and fourth arm waveguides are the same.

13. The optical wavelength multiplexing/de-multiplexing circuit according to claim 10, wherein
the temperature compensation means in said arrayed waveguide grating is means for bonding a metal rod for connecting both ends of a chip which is cut in an arc along a circuit, and for causing the chip to be deformed by thermal expansion or contraction of the metal rod to cancel a temperature-induced change of the optical path length difference in said arrayed waveguide, and
the temperature compensation means in said Mach-Zehnder interferometer circuit is means formed by a method of forming a groove which divides at least one of said first and second arm waveguides and inserting material which has a refractive index temperature coefficient different from a temperature coefficient of an effective refractive index of said first and second arm waveguides.

14. The optical wavelength multiplexing/de-multiplexing circuit according to claim 10, wherein
the temperature compensation means in said arrayed waveguide grating is means for dividing said first or the second slab waveguide, bonding the divided chips and a metal plate, and canceling an optical path change caused by a temperature-induced change of the optical path length difference in the arrayed waveguide by changing a relative position between the divided slab waveguides by thermal expansion or contraction of the metal plate, and
the temperature compensation means in said Mach-Zehnder interferometer circuit is means formed by a method of forming the groove which divides at least one of said first and second arm waveguides and inserting material which has a refractive index temperature coefficient different from a temperature coefficient of an effective refractive index in said first and second arm waveguides.

15. The optical wavelength multiplexing/de-multiplexing circuit according to claim 13, wherein
the material to be inserted in the groove formed in at least one of said first and second arm waveguides and the material to be inserted in the groove formed in at least one of said third and fourth arm waveguides is the same.

16. The optical wavelength multiplexing/de-multiplexing circuit according to claim 14, wherein
the material to be inserted in the groove formed in at least one of said first and second arm waveguides and the material to be inserted in the groove formed in at least one of said third and fourth arm waveguides is the same.

* * * * *